(12) United States Patent
Sato et al.

(10) Patent No.: US 9,924,049 B2
(45) Date of Patent: Mar. 20, 2018

(54) PULL PRINT SYSTEM

(71) Applicant: Kyocera Document Solutions Inc., Osaka (JP)

(72) Inventors: Masafumi Sato, Osaka (JP); Toyoaki Oku, Osaka (JP); Koji Kubono, Osaka (JP); Zhenyu Sun, Osaka (JP); Ryosuke Mondo, Osaka (JP); Yoshio Inoue, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/361,478

(22) Filed: Nov. 27, 2016

(65) Prior Publication Data

US 2017/0155773 A1 Jun. 1, 2017

(30) Foreign Application Priority Data

| Nov. 27, 2015 | (JP) | 2015-231761 |
| Nov. 27, 2015 | (JP) | 2015-231763 |
| Nov. 27, 2015 | (JP) | 2015-231766 |
| Nov. 27, 2015 | (JP) | 2015-231768 |

(51) Int. Cl.
*H04N 1/00* (2006.01)
*G06F 3/12* (2006.01)

(52) U.S. Cl.
CPC ......... *H04N 1/0023* (2013.01); *G06F 3/1222* (2013.01); *G06F 3/1238* (2013.01); *G06F 3/1256* (2013.01); *G06F 3/1267* (2013.01); *G06F 3/1288* (2013.01); *H04N 1/00344* (2013.01); *H04N 2201/0094* (2013.01)

(58) Field of Classification Search
CPC .................................................. H04N 1/00726
USPC ......................................................... 358/1.15
See application file for complete search history.

(56) References Cited

U.S. PATENT DOCUMENTS

| 2004/0174556 A1* | 9/2004 | Lapstun | A63F 9/183 |
| | | | 358/1.14 |
| 2008/0212131 A1* | 9/2008 | Osada | G06F 3/1207 |
| | | | 358/1.15 |
| 2010/0157363 A1* | 6/2010 | Ishikawa | G06F 3/1203 |
| | | | 358/1.15 |
| 2011/0096359 A1* | 4/2011 | Taniuchi | G06F 3/1204 |
| | | | 358/1.15 |

FOREIGN PATENT DOCUMENTS

JP 2015-138495 A 7/2015

\* cited by examiner

*Primary Examiner* — Jacky X Zheng
(74) *Attorney, Agent, or Firm* — James Judge

(57) ABSTRACT

A pull print system includes a print server and a print apparatus. The print server performs a raster-image processor (RIP) process based on print data received as job data from an external apparatus to generate printing image data as raster image data. The RIP process performed by the data generating unit is same as the RIP process performed by the print apparatus. The print apparatus requests to the print server the job data for the user whose login is accepted. The print server transmits to the print apparatus the printing image data of the job data as raster image data.

1 Claim, 56 Drawing Sheets

```
!R! SEM 9;EXIT;
@PJL SET JOBNAME="Test job"

Job Data of Page 1
Job Data of Page 2
Job Data of Page 3
Job Data of Page 4
Job Data of Page 5
Job Data of Page 6
Job Data of Page 7
Job Data of Page 8
```

```
!R! SEM 9;EXIT;
@PJL SET JOBNAME="Test job"

Job Data of Page 1
Job Data of Page 3
Job Data of Page 7
Job Data of Page 8
```

PULL PRINT SYSTEM

INCORPORATION BY REFERENCE

This application is based upon, and claims the benefit of priority from, corresponding Japanese Patent Application Nos. 2015-231761, 2015-231763, 2015-231766, and 2015-231768, each filed in the Japan Patent Office on Nov. 27, 2015, and the entire contents of which are incorporated herein by reference.

BACKGROUND

Unless otherwise indicated herein, the description in this section is not prior art to the claims in this application and is not admitted to be prior art by inclusion in this section.

As an image output system, an image output system that downloads job data of a print job from a print server to a print apparatus to print the job data at the print apparatus, what is called, executes a pull print is known. That is, the typical image output system downloads print data as the job data of the print job from the print server to the print apparatus, and then generates data of a raster image based on this print data at the print apparatus to print.

SUMMARY

A pull print system according to one aspect of the disclosure includes a print server; and a print apparatus. The print server includes a first storage device as a semiconductor memory or a hard disk drive (HDD) that includes a print server program; and a first central processing unit (CPU) that executes the print server program to function as a data generating unit that generates data, and a data transmitter that transmits the data. The data generating unit performs a raster-image processor (RIP) process based on print data received as job data from an external apparatus to generate printing image data as raster image data. The RIP process performed by the data generating unit is same as the RIP process performed by the print apparatus. The print apparatus includes a second storage device as the semiconductor memory or the HDD that includes an MFP program; and a second CPU that executes the MFP program to function as a login accepting unit that accepts a login of a user, and a data requesting unit that requests data from the print server. The data requesting unit requests to the print server the job data for the user whose login is accepted by the login accepting unit. The data transmitter transmits to the print apparatus the printing image data of the job data generated by the data generating unit and requested by the data requesting unit.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 36 illustrates exemplary print data generated by a data generating unit according to the third embodiment.

DETAILED DESCRIPTION

Figure 1:
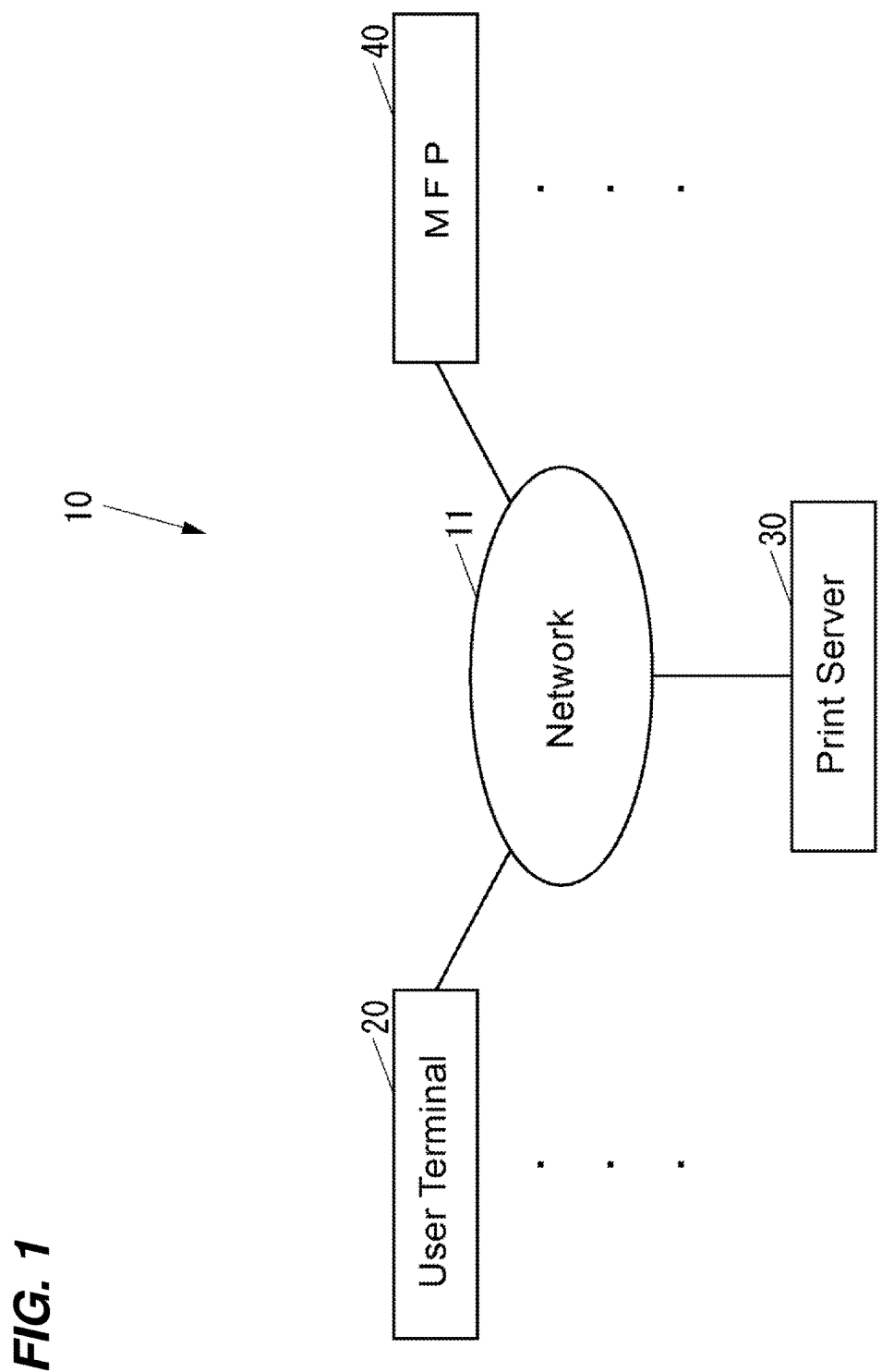
FIG. 1 illustrates a pull print system according to a first embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of the disclosure with reference to drawings.

First Embodiment

First, a description will be given of a configuration of a pull print system according to a first embodiment.

FIG. 1 illustrates a pull print system 10 according to the embodiment.

As illustrated in FIG. 1, the pull print system 10 includes a user terminal 20, a print server 30, and a multifunction peripheral (MFP) 40. The user terminal 20 generates print data. The MFP 40 is a print apparatus that prints based on job data as data of a print job. The user terminal 20, the print server 30, and the MFP 40 are communicative one another via a network 11 such as a local area network (LAN) and the Internet.

The print data generated by the user terminal 20 is data described in page description language (PDL) such as Printer Command Language (PCL) and Kyocera Page Description Language (KPDL).

The print server 30 is higher-performance than the MFP 40 for specifications of the machines. The print server 30 has a high data processing capacity.

The pull print system 10 can include a plurality of user terminals similar to the user terminal 20. However, the following describes the user terminal 20 as a representative of the user terminals included in the pull print system 10.

Similarly, the pull print system 10 can include a plurality of MFPs similar to the MFP 40. However, the following describes the MFP 40 as a representative of the MFPs included in the pull print system 10.

Figure 2:
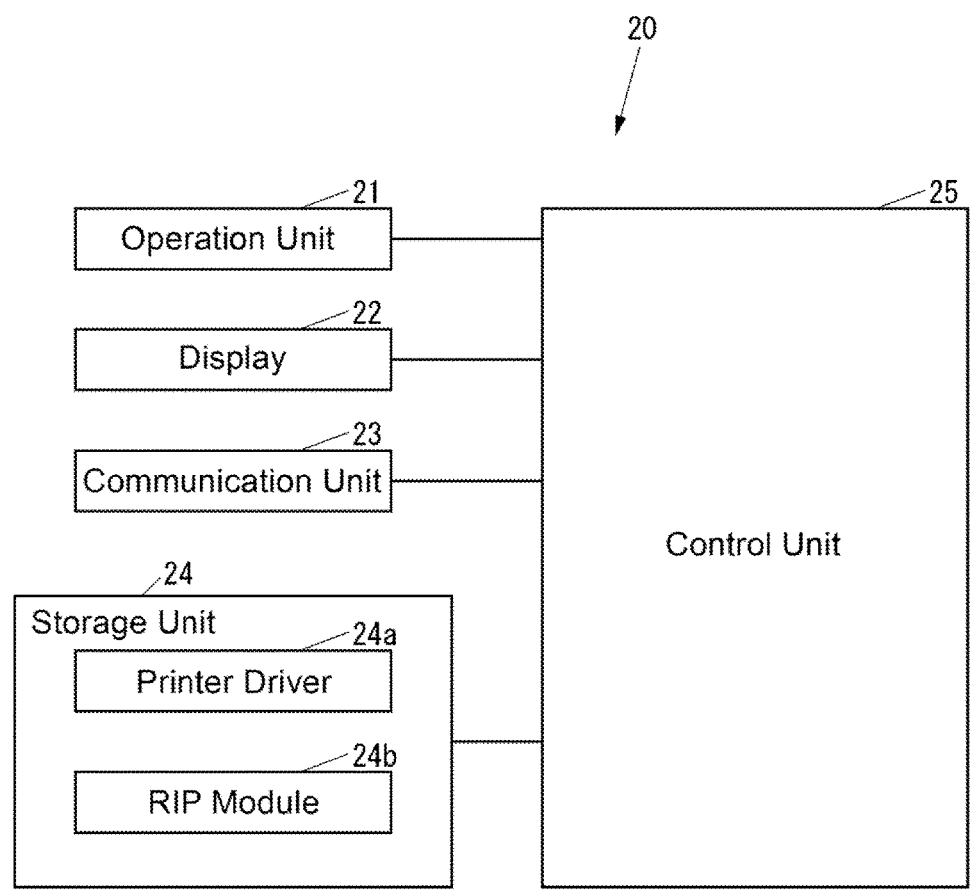
FIG. 2 illustrates a user terminal according to the first embodiment.

FIG. 2 illustrates the user terminal 20.

As illustrated in FIG. 2, the user terminal 20 includes an operation unit 21, a display 22, a communication unit 23, a storage unit 24, and a control unit 25. The operation unit 21 is an input device where various operations by a user are input. The display 22 is a display device such as a liquid crystal display (LCD) that displays various information. The communication unit 23 is a communication device that communicates with an external device via the network 11 (see FIG. 1). The storage unit 24 is a storage device, such as a semiconductor memory and a hard disk drive (HDD), that stores various data. The control unit 25 controls the entire user terminal 20. The user terminal 20 is configured of a portable terminal such as a smart phone or a computer such as a personal computer (PC).

The storage unit 24 stores a printer driver 24a and a RIP module 24b. The printer driver 24a controls an operation of the print apparatus. The RIP module 24b executes a raster image processor (RIP) process based on the print data to generate raster image data. The printer driver 24a and the RIP module 24b each may be installed in the user terminal 20 at production stage of the user terminal 20, may be additionally installed in the user terminal 20 from an external storage medium such as a universal serial bus (USB) flash drive, or may be additionally installed in the user terminal 20 from the network 11.

The control unit 25, for example, includes a central processing unit (CPU), a read only memory (ROM), which stores programs and various data, and a random access memory (RAM), which is used as a work area of the CPU. The CPU executes programs stored in the ROM or the storage unit 24.

Figure 3:
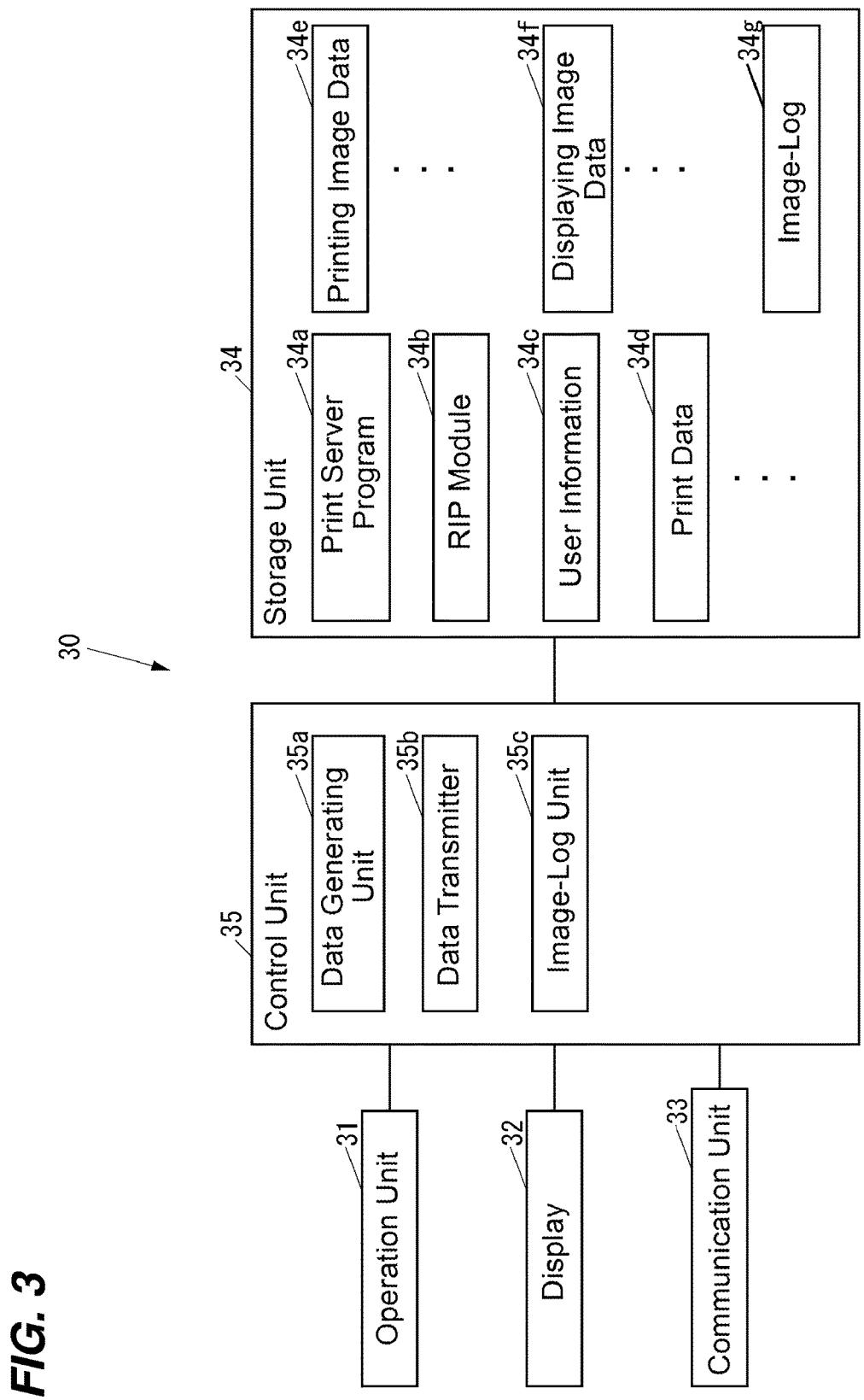
FIG. 3 illustrates a print server according to the first embodiment.

FIG. 3 illustrates the print server 30.

As illustrated in FIG. 3, the print server 30 includes an operation unit 31, a display 32, a communication unit 33, a storage unit 34, and a control unit 35. The operation unit 31 is an input device such as a computer mouse and a keyboard where various operations by the user are input. The display 32 is a display device such as a LCD that displays various information. The communication unit 33 is a communication device that communicates with an external device via the network 11 (see FIG. 1). The storage unit 34 is a storage device, such as a semiconductor memory and an HDD, that stores various data. The control unit 35 controls the entire print server 30. The print server 30 is configured of a computer such as a PC.

The storage unit 34 stores a print server program 34a and a RIP module 34b. The print server program 34a controls an operation of the print server 30. The RIP module 34b executes the RIP process based on the print data to generate raster image data. The print server program 34a and the RIP module 34b each may be installed in the print server 30 at production stage of the print server 30, may be additionally installed in the print server 30 from an external storage medium such as a USB flash drive, or may be additionally installed in the print server 30 from the network 11.

The RIP module 34b is a module having a content identical to that of a RIP module 47b (see FIG. 4) described later of the MFP 40 (see FIG. 1). That is, the RIP module 34b executes the RIP process identical to that of the RIP module 47b of the MFP 40.

The storage unit 34 stores user information 34c. The user information 34c includes various information for each user, such as user identification information and user password.

The storage unit 34 can store a plurality of pieces of print data 34d. The storage unit 34 stores the print data 34d each associated with the user identification information.

The storage unit 34 can store a plurality of pieces of printing image data 34e as printing raster image data. The printing image data 34e is a printable file that does not cause the print apparatus to execute the RIP process, such as a printer command language mobile (PCLm) file, a printer working group (PWG) raster file, and a universal raster format (URF) file. The storage unit 34 stores the printing image data 34e each associated with the corresponding print data 34d.

The storage unit 34 can store a plurality of pieces of displaying image data 34f as displaying raster image data. The displaying image data 34f is a file previewable at the PC and the print apparatus, such as a portable network graphics (PNG) file. The displaying image data 34f includes original data and thumbnail data. The original data is original image data generated such that the RIP module 34b executes the RIP process based on the print data 34d. The thumbnail data is data having a reduced thumbnail data size in a reduced image size compared with its original image. The storage unit stores the displaying image data 34f each associated with the corresponding print data 34d. When the printing image data 34e is used as the original data, the displaying image data 34f may include only the thumbnail data among the original data and the thumbnail data.

The storage unit 34 stores an image-log 34g. The image-log 34g includes the displaying image data 34f of the job data obtained by the MFP 40. The image-log 34g is information that stores a printing log including the user, time, and contents of the image. The image-log 34g may include only any one of the original data and the thumbnail data of the displaying image data 34f.

The control unit 35, for example, includes a CPU, a ROM, which stores programs and various data, and a RAM, which is used as a work area of the CPU. The CPU executes programs stored in the ROM or the storage unit 34.

The control unit 35 executes the print server program 34a stored in the storage unit 34 to function as a data generating unit 35a, a data transmitter 35b, and an image-log unit 35c. The data generating unit 35a generates data. The data transmitter 35b transmits the data. The image-log unit 35c stores the displaying image data 34f of the job data obtained by the MFP 40 as a log.

Figure 4:
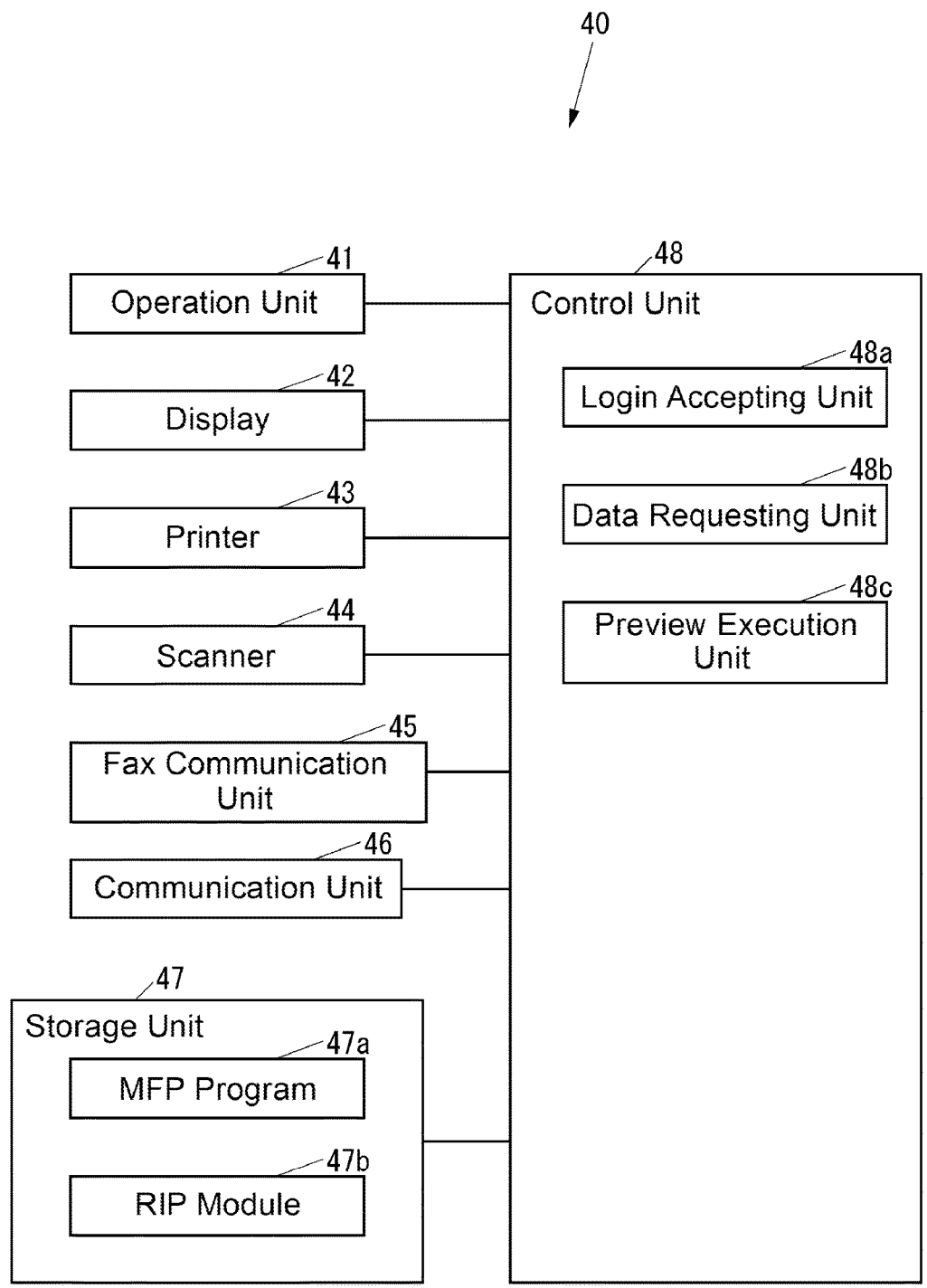
FIG. 4 illustrates an MFP according to the first embodiment.

FIG. 4 illustrates the MFP 40.

As illustrated in FIG. 4, the MFP 40 includes an operation unit 41, a display 42, a printer 43, a scanner 44, a fax communication unit 45, a communication unit 46, a storage unit 47, and a control unit 48. The operation unit 41 is an input device such as a button where various operations by the user are input. The display 42 is a display device such as an LCD that displays various information. The printer 43 is a print device that prints on a recording medium such as a paper sheet. The scanner 44 is a reading device that reads image data from an original document. The fax communication unit 45 is a fax device that executes fax communication via a communication line such as a dial-up line with an external facsimile device (not illustrated). The communication unit 46 is a network communication device that communicates with an external device via the network 11 (see FIG. 1). The storage unit 47 is a storage device, such as a semiconductor memory and an HDD, that stores various data. The control unit 48 controls the entire MFP 40.

The storage unit 47 stores an MFP program 47a and the RIP module 47b. The MFP program 47a controls an operation of the MFP 40. The RIP module 47b executes the RIP process based on the print data to generate raster image data. The MFP program 47*a* and the RIP module 47*b* each may be installed in the MFP 40 at production stage of the MFP 40, may be additionally installed in the MFP 40 from an external storage medium such as a USB flash drive, or may be additionally installed in the MFP 40 from the network 11.

The control unit 48, for example, includes a CPU, a ROM, which stores programs and various data, and a RAM, which is used as a work area of the CPU. The CPU executes programs stored in the ROM or the storage unit 47.

The control unit 48 executes the MFP program 47*a* stored in the storage unit 47 to function as a login accepting unit 48*a*, a data requesting unit 48*b*, and a preview execution unit 48*c*. The login accepting unit 48*a* accepts a login of the user. The data requesting unit 48*b* requests the data from the print server 30 (see FIG. 1). The preview execution unit 48*c* executes the preview of the print job.

The following describes an operation of the pull print system 10.

First, a description will be given of the operation of the pull print system 10 when the user logs in the print server 30 from the user terminal 20.

Figure 5:
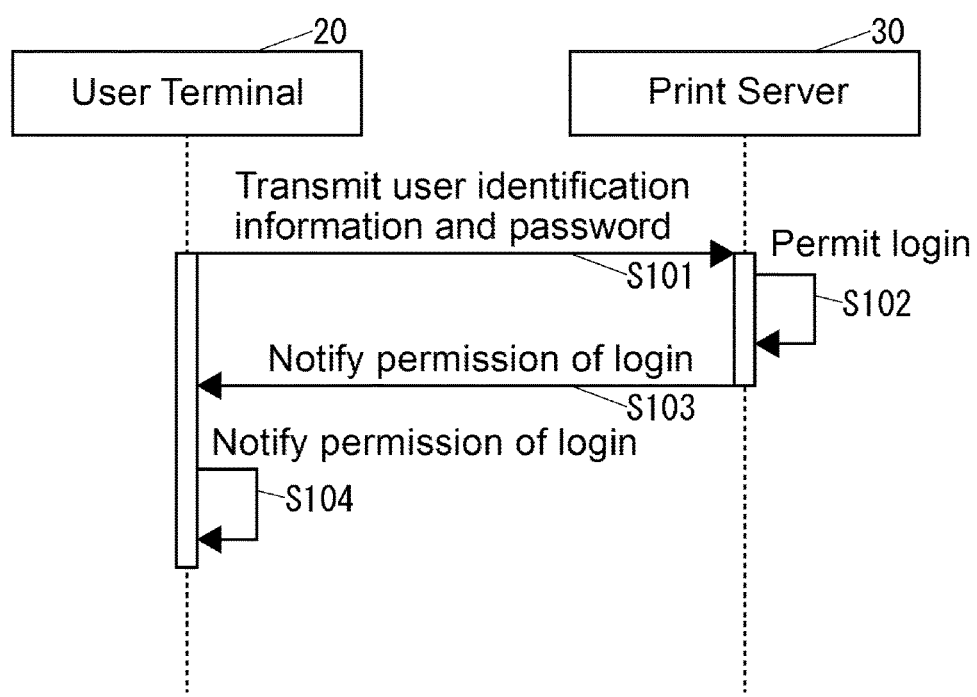
FIG. 5 illustrates an operation of the pull print system according to the first embodiment when a user logs in the print server from the user terminal.

FIG. 5 illustrates the operation of the pull print system 10 when the user logs in the print server 30 from the user terminal 20.

The user can log in the print server 30 via the operation unit 21 of the user terminal 20.

As illustrated in FIG. 5, after a login instruction is input via the operation unit 21, the control unit 25 of the user terminal 20 transmits a combination of user identification information and password input via the operation unit 21 to the print server 30 (Step S101).

Then, when the combination of the user identification information and password transmitted from the user terminal 20 is included in the user information 34*c*, the control unit 35 of the print server 30 permits the user to log in (Step S102) to notify this to the user terminal 20 (Step S103).

After the print server 30 notifies the control unit 25 of the user terminal 20 that the user login has been permitted, the control unit 25 notifies the user that the user login has been permitted via the display 22 (Step S104) to terminate the operation illustrated in FIG. 5.

The following describes an operation of the user terminal 20 when executing the preview based on the print data.

The user can instruct the user terminal 20 via the operation unit 21 of the user terminal 20 to execute the preview based on the print data to be transmitted by the user terminal 20. The instruction of executing the preview causes the control unit 25 of the user terminal 20 to execute the printer driver 24*a* to execute the operation illustrated in FIG. 6.

Figure 6:
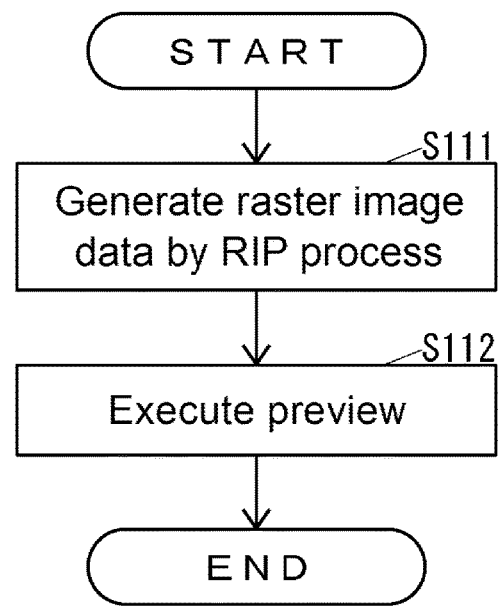
FIG. 6 illustrates an operation of the user terminal according to the first embodiment when executing a preview based on print data.

FIG. 6 illustrates the operation of the user terminal 20 when executing the preview based on the print data.

As illustrated in FIG. 6, after the RIP module 24*b* executes the RIP process based on the print data to generate the raster image data such as a PNG file (Step S111), the control unit 25 executes the preview on the display 22 based on the generated raster image data (Step S112) to terminate the operation illustrated in FIG. 6.

The following describes the operation of the user terminal 20 when transmitting the print data.

After the user determines the transmission of the print data by the user terminal 20 by, for example, confirming the executed preview on the display 22, the user can instruct the user terminal 20 via the operation unit 21 of the user terminal 20 to transmit the print data by the user terminal 20 itself. After the control unit 25 of the user terminal 20 is instructed to transmit the print data, the control unit 25 executes the printer driver 24*a* to execute the operation illustrated in FIG. 7.

Figure 7:
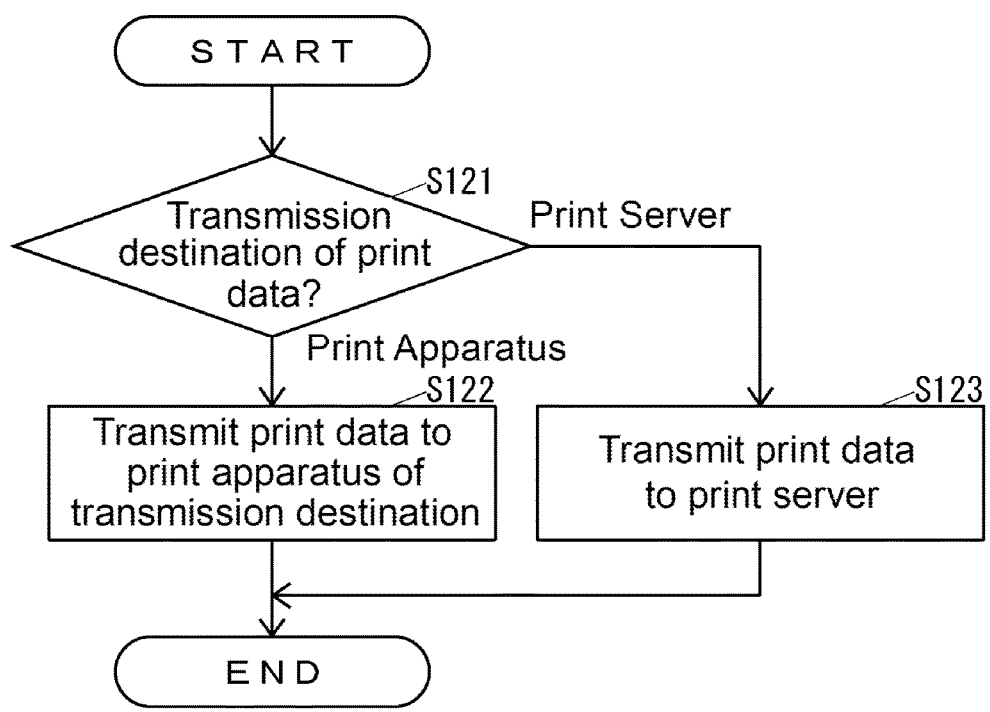
FIG. 7 illustrates an operation of the user terminal according to the first embodiment when transmitting the print data.

FIG. 7 illustrates the operation of the user terminal 20 when transmitting the print data.

As illustrated in FIG. 7, the control unit 25 determines a transmission destination of the print data (Step S121). Here, the user can set the transmission destination of the print data in advance in the printer driver 24*a* via the operation unit 21. As the transmission destination of the print data, a specific print apparatus such as the MFP 40, and the print server 30 are settable.

When the control unit 25 determines at Step S121 that the set transmission destination is the print apparatus, the control unit 25 transmits the print data via the communication unit 23 to the print apparatus set as the transmission destination (Step S122) to terminate the operation illustrated in FIG. 7.

When the control unit 25 determines at Step S121 that the set transmission destination is the print server 30, the control unit 25 transmits the print data to the print server 30 via the communication unit 23 (Step S123) to terminate the operation illustrated in FIG. 7. Here, when transmitting the print data to the print server 30, the control unit 25 transmits the identification information of the logged-in user in addition to the print data.

The following describes the operation of the MFP 40 when printing based on the print data directly received from the user terminal 20.

Figure 8:
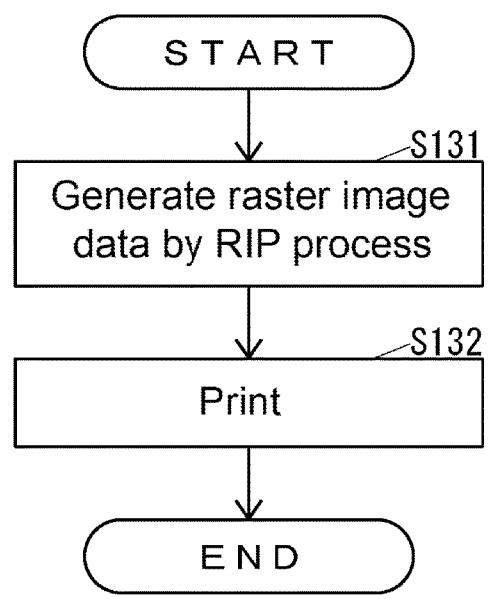
FIG. 8 illustrates an operation of the MFP according to the first embodiment when printing based on the print data directly received from the user terminal.

The control unit 48 of the MFP 40 receives the print data as the job data from the user terminal 20 to execute the operation illustrated in FIG. 8.

FIG. 8 illustrates the operation of the MFP 40 when printing based on the print data directly received from the user terminal 20.

As illustrated in FIG. 8, after the RIP module 47*b* executes the RIP process based on the received print data to generate the raster image data such as a PCLm file, a PWG raster file, and a URF file (Step S131), the control unit 48 causes the printer 43 to print based on the generated raster image data (Step S132) to terminate the operation illustrated in FIG. 8.

The following describes the operation of the print server 30 when receiving the print data from the user terminal 20.

Figure 9:
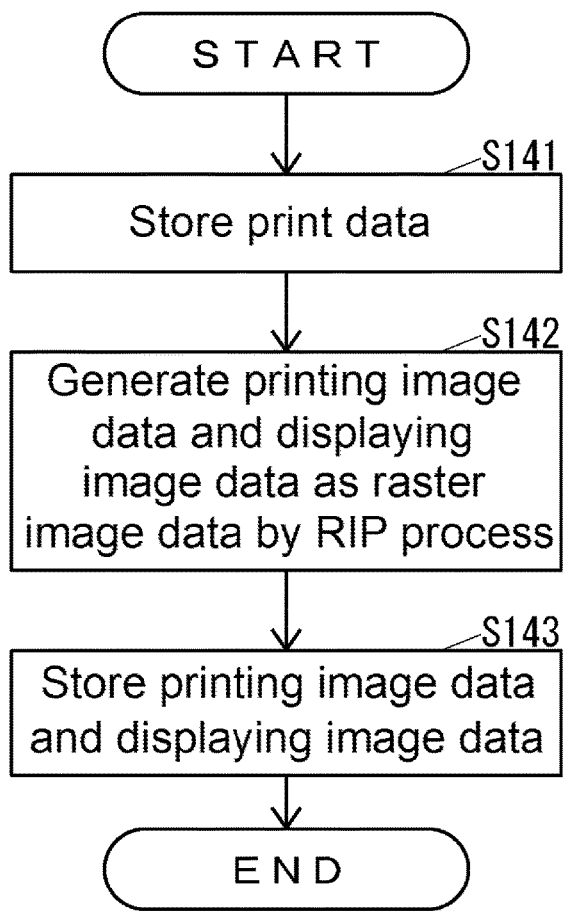
FIG. 9 illustrates an operation of the print server according to the first embodiment when receiving the print data from the user terminal.

The control unit 35 of the print server 30 receives the print data from the user terminal 20 to execute the operation illustrated in FIG. 9.

FIG. 9 illustrates the operation of the print server 30 when receiving the print data from the user terminal 20.

As illustrated in FIG. 9, the data generating unit 35*a* of the control unit 35 stores the received print data as the print data 34*d* in the storage unit 34 (Step S141). Here, the data generating unit 35*a* stores the print data 34*d* being associated with the user identification information added to the received print data.

Next, after the RIP module 34*b* executes the RIP process based on the print data 34*d* stored in the storage unit 34 at Step S141 to generate printing image data such as a PCLm file, a PWG raster file, and a URF file, and displaying image data such as a PNG file, as the raster image data (Step S142), the data generating unit 35*a* stores the generated printing image data and displaying image data as the printing image data 34*e* and the displaying image data 34*f* respectively in the storage unit 34 (Step S143) to terminate the operation illustrated in FIG. 9. Here, the data generating unit 35*a* stores the printing image data 34e and the displaying image data 34f being associated with the print data 34d stored at Step S141.

The following describes the operation of the pull print system 10 when the user logs in the print server 30 from the MFP 40.

Figure 10:
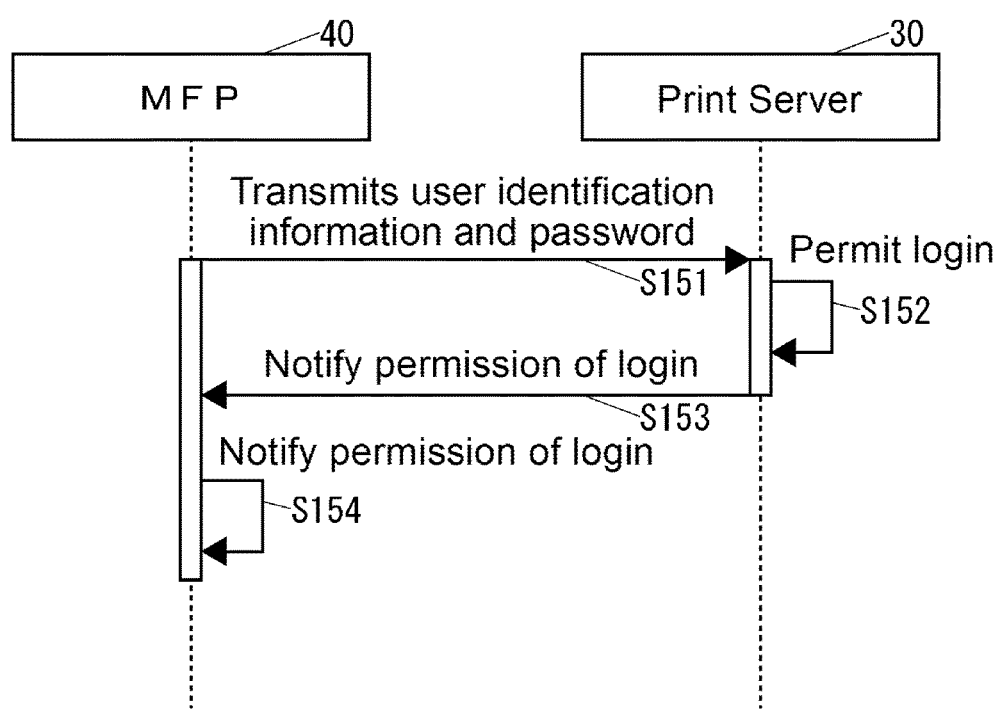
FIG. 10 illustrates an operation of the pull print system according to the first embodiment when the user logs in the print server from the MFP.

FIG. 10 illustrates the operation of the pull print system 10 when the user logs in the print server 30 from the MFP 40.

The user can log in the print server 30 via the operation unit 41 of the MFP 40.

As illustrated in FIG. 10, after the login instruction is input via the operation unit 41, the login accepting unit 48a of the MFP 40 transmits the combination of the user identification information and password input via the operation unit 41 to the print server 30 (Step S151).

Then, when the combination of the user identification information and password transmitted from the MFP 40 is included in the user information 34c, the control unit 35 of the print server 30 permits the user login (Step S152) to notify the MFP 40 of this (Step S153).

After the print server 30 notifies the login accepting unit 48a of the MFP 40 that the user login has been permitted, the login accepting unit 48a notifies the user via the display 42 that the user login has been permitted (Step S154) to terminate the operation illustrated in FIG. 10.

The following describes the operation of the pull print system 10 when executing the preview of the print job for a pull print at the MFP 40.

Figure 11:
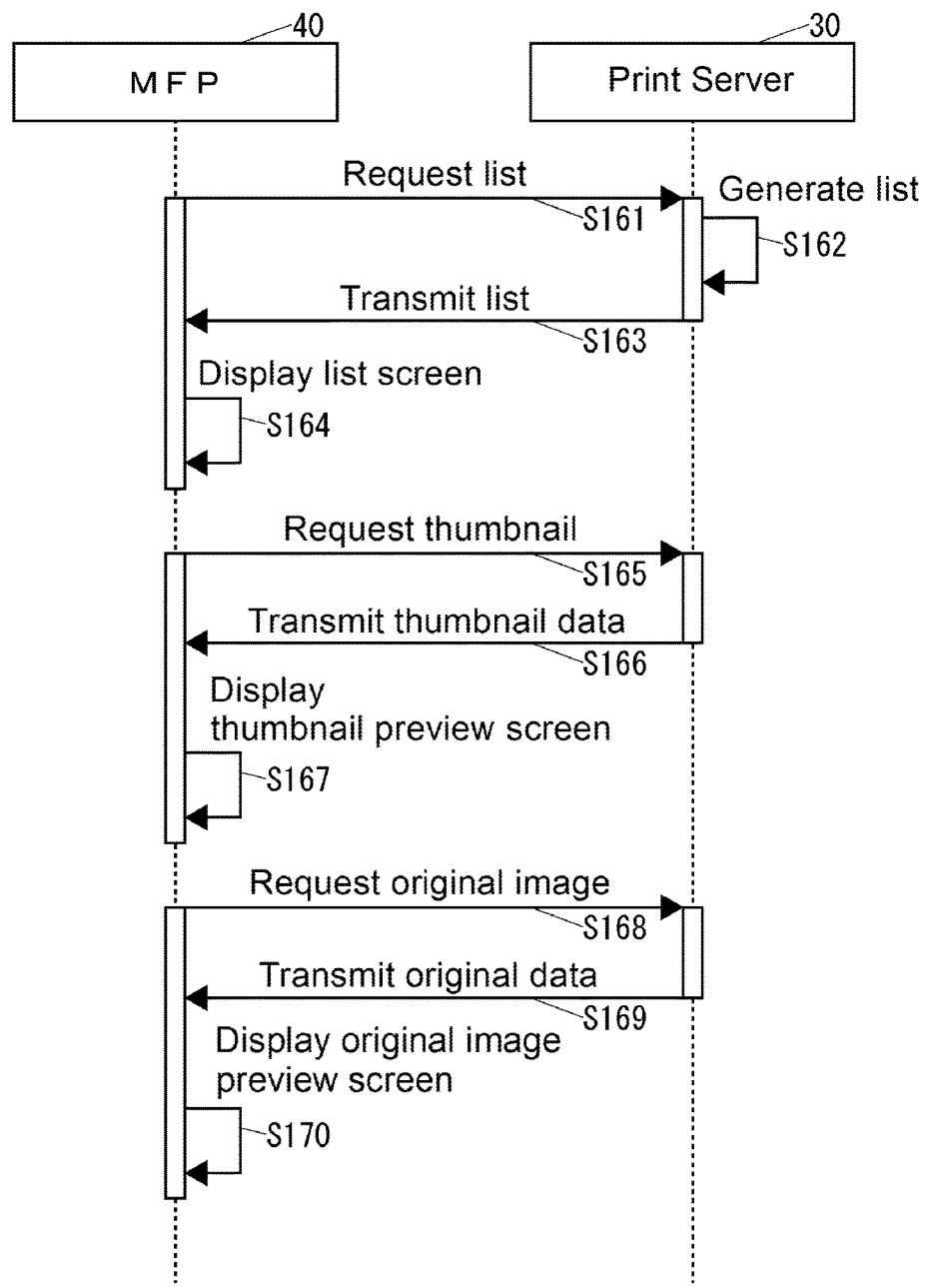
FIG. 11 illustrates an operation of the pull print system according to the first embodiment when executing the preview of the print job for a pull print at the MFP.

FIG. 11 illustrates the operation of the pull print system 10 when executing the preview of the print job for the pull print at the MFP 40.

The user can instruct the MFP 40 via the operation unit 41 of the MFP 40 to confirm the print job for the pull print.

As illustrated in FIG. 11, after the confirmation instruction of the print job for the pull print is input via the operation unit 41, the data requesting unit 48b of the MFP 40 requests a list of the print job for the pull print of the logged-in user from the print server 30 (Step S161). Here, the data requesting unit 48b includes the identification information of the logged-in user in the request at Step S161.

After receiving the request at Step S161, the data transmitter 35b of the print server 30 generates a list of the print data 34d associated with the user identification information included in the request at Step S161 (Step S162) to transmit this list to the MFP 40 (Step S163).

After receiving the list from the print server 30, the data requesting unit 48b of the MFP 40 displays a list screen that displays the received list on the display 42 (Step S164).

Figure 12:
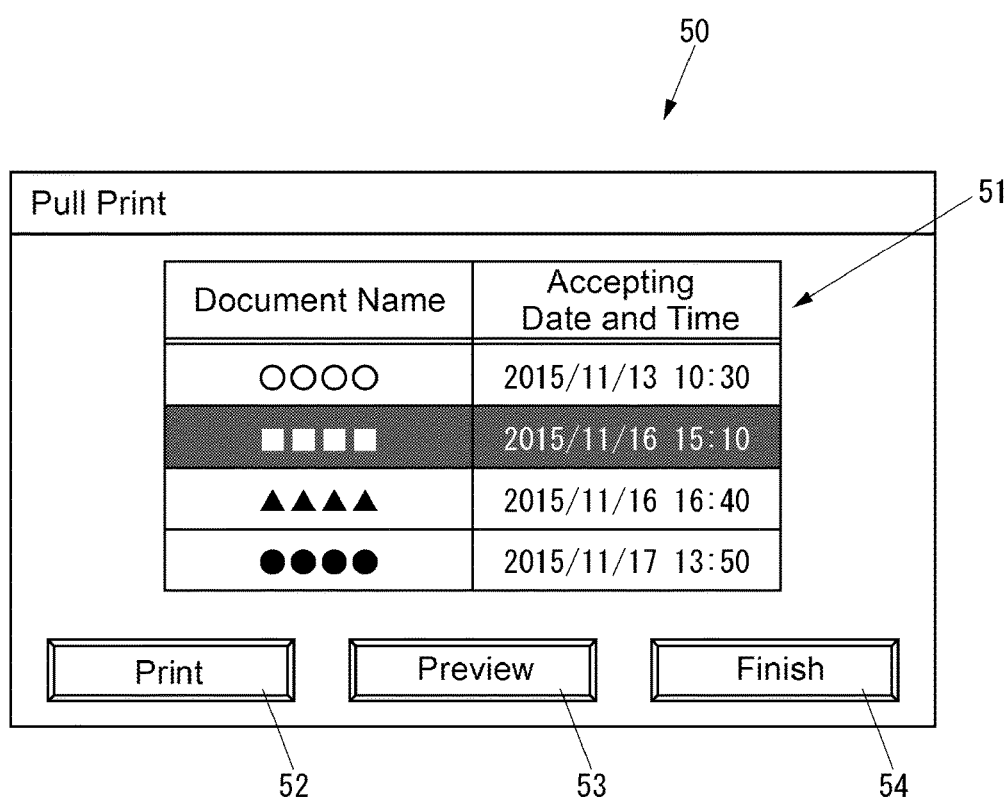
FIG. 12 illustrates an exemplary list screen displayed in an operation according to the first embodiment.

FIG. 12 illustrates an exemplary list screen 50 displayed at Step S164.

The list screen 50 illustrated in FIG. 12 includes a list display area 51, a print button 52, a preview button 53, and a finish button 54. The list display area 51 displays the list of the print job for the pull print of the logged-in user. The print button 52 is a button for instructing the execution of the print job selected on the list display area 51. The preview button 53 is a button for instructing the execution of the preview of the print job selected on the list display area 51. The finish button 54 is a button for terminating the operation illustrated in FIG. 11.

The list display area 51 can display all the print jobs for the pull print of the logged-in user. When all the print jobs for the pull print of the logged-in user cannot be simultaneously displayed on the list display area 51, they can be displayed by scrolling. On the list display area 51, any one print job or the plurality of print jobs can be selected. The selected print job is displayed on the list display area 51 in a state where its color is inverted.

The print button 52 and the preview button 53 are operable only when any print job is selected on the list display area 51.

After the user presses the preview button 53 via the operation unit 41 of the MFP 40, the data requesting unit 48b of the MFP 40, as illustrated in FIG. 11, requests the thumbnail of the print job selected on the list display area 51 when the preview button 53 is pressed from the print server 30 (Step S165).

After receiving the request at Step S165, the data transmitter 35b of the print server 30 transmits the thumbnail data of the thumbnail requested at Step S165 in the displaying image data 34f to the MFP 40 (Step S166).

After receiving the thumbnail data from the print server 30, the preview execution unit 48c of the MFP 40 displays a thumbnail preview screen that displays the thumbnail based on the received thumbnail data on the display 42 (Step S167).

Figure 13:
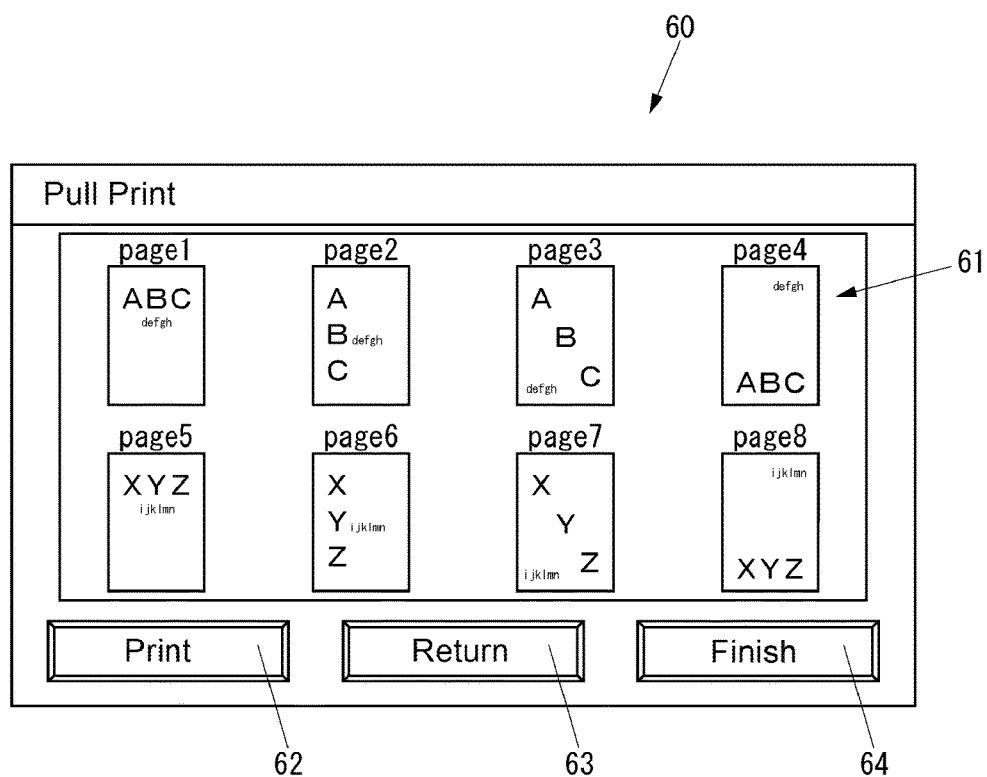
FIG. 13 illustrates an exemplary thumbnail preview screen displayed in the operation according to the first embodiment.

FIG. 13 illustrates an exemplary thumbnail preview screen 60 displayed at Step S167.

The thumbnail preview screen 60 illustrated in FIG. 13 includes a thumbnail area 61, a print button 62, a return button 63, and a finish button 64. The thumbnail area 61 displays the thumbnails of respective pages of a target print job. The print button 62 is a button for instructing the execution of the target print job. The return button 63 is a button for returning to the list screen 50 (see FIG. 12). The finish button 64 is a button for terminating the operation illustrated in FIG. 11.

The thumbnail area 61 can display the thumbnails of all the pages of the target print job. When the thumbnails of all the pages of the target print job cannot be simultaneously displayed on the thumbnail area 61, they can be displayed by scrolling.

After the user selects any thumbnail on the thumbnail area 61 via the operation unit 41 of the MFP 40, the data requesting unit 48b of the MFP 40, as illustrated in FIG. 11, requests the original image of the selected thumbnail from the print server 30 (Step S168).

After receiving the request at Step S168, the data transmitter 35b of the print server 30 transmits original data of the original image requested at Step S168 in the displaying image data 34f to the MFP 40 (Step S169).

After receiving the original data from the print server 30, the preview execution unit 48c of the MFP 40 displays an original image preview screen that displays the original image based on the received original data on the display 42 (Step S170).

Figure 14:
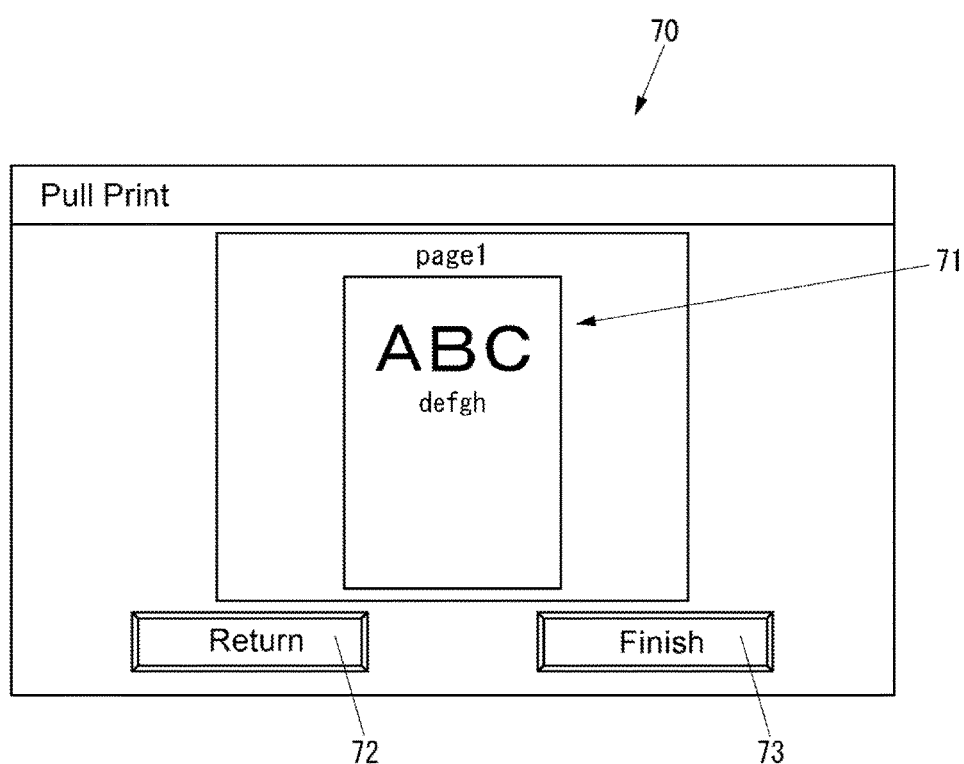
FIG. 14 illustrates an exemplary original image preview screen displayed in the operation according to the first embodiment.

FIG. 14 illustrates an exemplary original image preview screen 70 displayed at Step S170.

The original image preview screen 70 illustrated in FIG. 14 includes a preview area 71, a return button 72, and a finish button 73. The preview area 71 displays the original image. The return button 72 is a button for returning to the thumbnail preview screen 60 (see FIG. 13). The finish button 73 is a button for terminating the operation illustrated in FIG. 11.

The image displayed on the preview area 71 can be enlarged corresponding to the operation via the operation unit 41 to be displayed.

In the above, the data requesting unit 48b requests the original image page by page. However, the data requesting unit 48b may request the original images of all the pages at once.

The following describes the operation of the pull print system 10 when executing the print job for the pull print at the MFP 40.

The user can press the print button 52 (see FIG. 12) of the list screen 50 (see FIG. 12), or the print button 62 (see FIG. 13) of the thumbnail preview screen 60 (see FIG. 13) via the operation unit 41 of the MFP 40 to instruct the MFP 40 to execute the target print job. Here, the target print job is the print job selected on the list display area 51 (see FIG. 12) when the print button 52 is pressed, or the target print job of the thumbnail preview screen 60.

Figure 15:
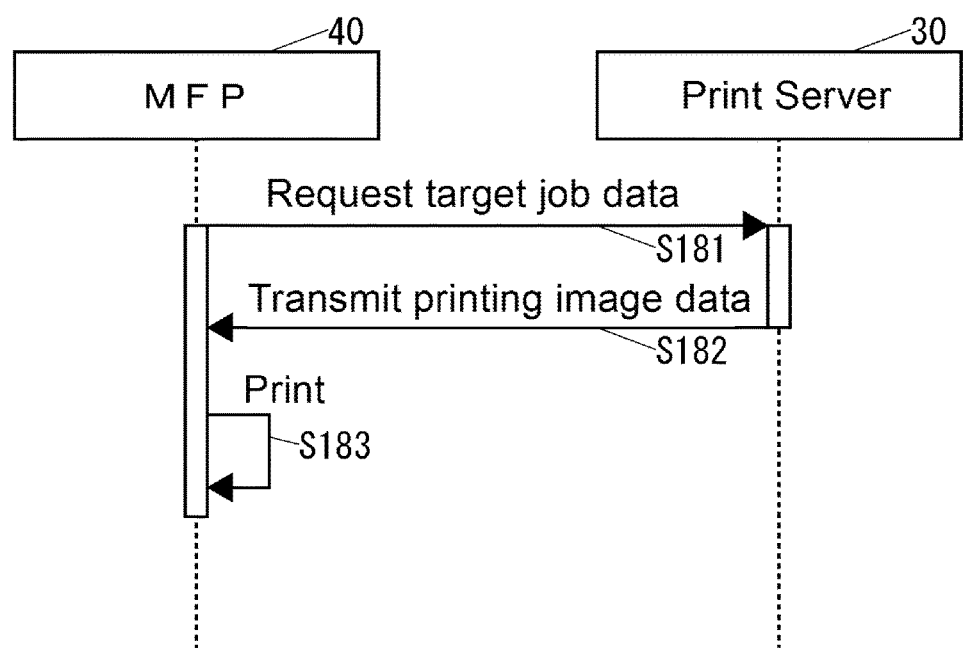
FIG. 15 illustrates an operation of the pull print system according to the first embodiment when executing the print job for the pull print at the MFP.

FIG. 15 illustrates the operation of the pull print system 10 when executing the print job for the pull print at the MFP 40.

After the user presses the print button 52 of the list screen 50 or the print button 62 of the thumbnail preview screen 60 via the operation unit 41 of the MFP 40, the data requesting unit 48b of the MFP 40, as illustrated in FIG. 15, requests the job data of the target print job from the print server 30 (Step S181).

After receiving the request at Step S181, the data transmitter 35b of the print server 30 transmits the printing image data 34e as the requested job data to the MFP 40 (Step S182).

After receiving the printing image data from the print server 30, the control unit 48 of the MFP 40 causes the printer 43 to print based on the received printing image data (Step S183) to terminate the operation illustrated in FIG. 15.

The following describes the operation of the print server 30 when updating the image-log 34g.

Figure 16:
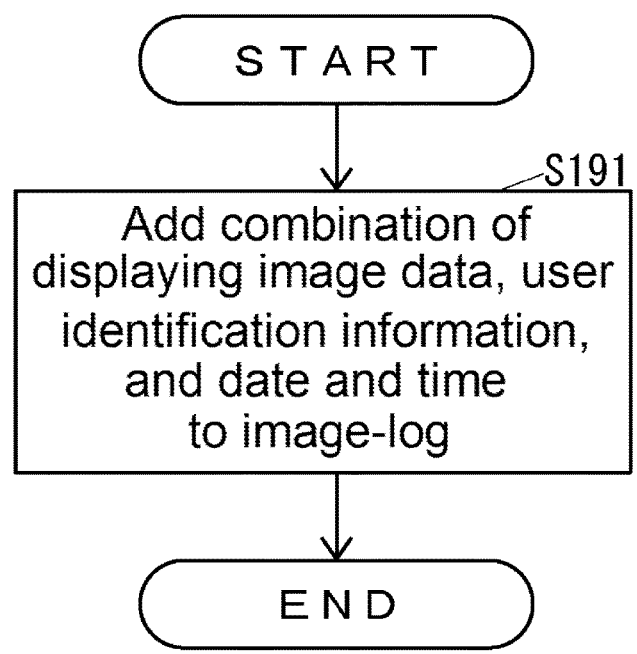
FIG. 16 illustrates an operation of the print server according to the first embodiment when updating an image-log.

FIG. 16 illustrates the operation of the print server 30 when updating the image-log 34g.

After the printing image data 34e is transmitted from the print server 30 to the MFP 40 at Step S182 in the operation illustrated in FIG. 15, the control unit 35 of the print server 30 executes the operation illustrated in FIG. 16.

As illustrated in FIG. 16, the image-log unit 35c of the print server 30 adds a combination of the displaying image data 34f of the job data corresponding to the printing image data 34e transmitted to the MFP 40, the identification information of the user that has requested this printing image data 34e, and the date and time when this printing image data 34e has been transmitted to the MFP 40, as a log to the image-log 34g (Step S191) to terminate the operation illustrated in FIG. 16.

As described above, after the pull print system 10 generates the printing image data as the raster image data not at the MFP 40, but at the print server 30 based on the print data at Step S142, the pull print system 10 prints at the MFP 40 based on this printing image data (Step S183). Accordingly, it is not necessary to generate the raster image data at the MFP 40 based on the print data when executing the pull print, thus ensuring reduction of burden on the MFP 40. Accordingly, the pull print system 10 can complete the pull print at high speed.

Especially, since the RIP process executed at the print server 30 is identical to the RIP process executed at the MFP 40, even when the raster image data is generated at the print server 30 based on the print data at Step S142 to be printed at the MFP 40 at Step S183, the pull print system 10 can obtain a printed matter with a quality identical to a quality when the raster image data is generated at the MFP 40 based on the print data at Step S131 to be printed at Step S132.

After the pull print system 10 generates the displaying image data as the raster image data at the print server 30 based on the print data at Step S142, the pull print system 10 executes the preview at the MFP 40 based on this displaying image data (Step S167 or Step S170), then ensuring the execution of the preview at the MFP 40 when executing the pull print. Accordingly, the user can confirm the preview to determine whether the pull print is executed or aborted.

The displaying image data 34f stored in the print server 30 not only can be obtained by the MFP 40 to be confirmed at the MFP 40 but also can be obtained by a computer such as a PC to be confirmed at this computer and printed by a print apparatus connected to this computer.

The pull print system 10 stores the printing log including the user, time, and contents of the image in the image-log 34g, thus ensuring improvement of security performance.

In the embodiment, when receiving the print data from outside, the print server 30 executes the RIP process based on the print data received from outside to generate the printing image data 34e and the displaying image data 34f. However, the print server 30 may generate the printing image data 34e until when the printing image data 34e is transmitted outside, and may generate the displaying image data 34f until when the displaying image data 34f is transmitted outside. For example, the print server 30 may generate the printing image data 34e when receiving the request at Step S181, and may generate the displaying image data 34f when receiving the request at Step S165.

In the embodiment, when receiving the print data from outside, the print server 30 executes the RIP process based on the print data received from outside. However, the print server 30 may be configured whether or not to execute the RIP process based on the print data received from outside. For example, the print server 30 may be configured to constantly execute the RIP process similarly to the embodiment when receiving the print data from outside, may be configured to execute the RIP process when the burden of the RIP process execution is expected to be equal to or less than a specific degree, or may be configured not to execute the RIP process. When not executing the RIP process, the print server 30 transmits the print data as the job data to the MFP 40 if the job data is requested from the MFP 40.

Second Embodiment

The following describes a configuration of a pull print system according to a second embodiment.

The pull print system according to the embodiment is similar to the pull print system 10 (see FIG. 1) according to the first embodiment except for a configuration describe later. Accordingly, in the configuration of the pull print system according to the embodiment, like reference numerals are designated to the configuration similar to that of the pull print system 10 and will not be further elaborated here.

Figure 17:
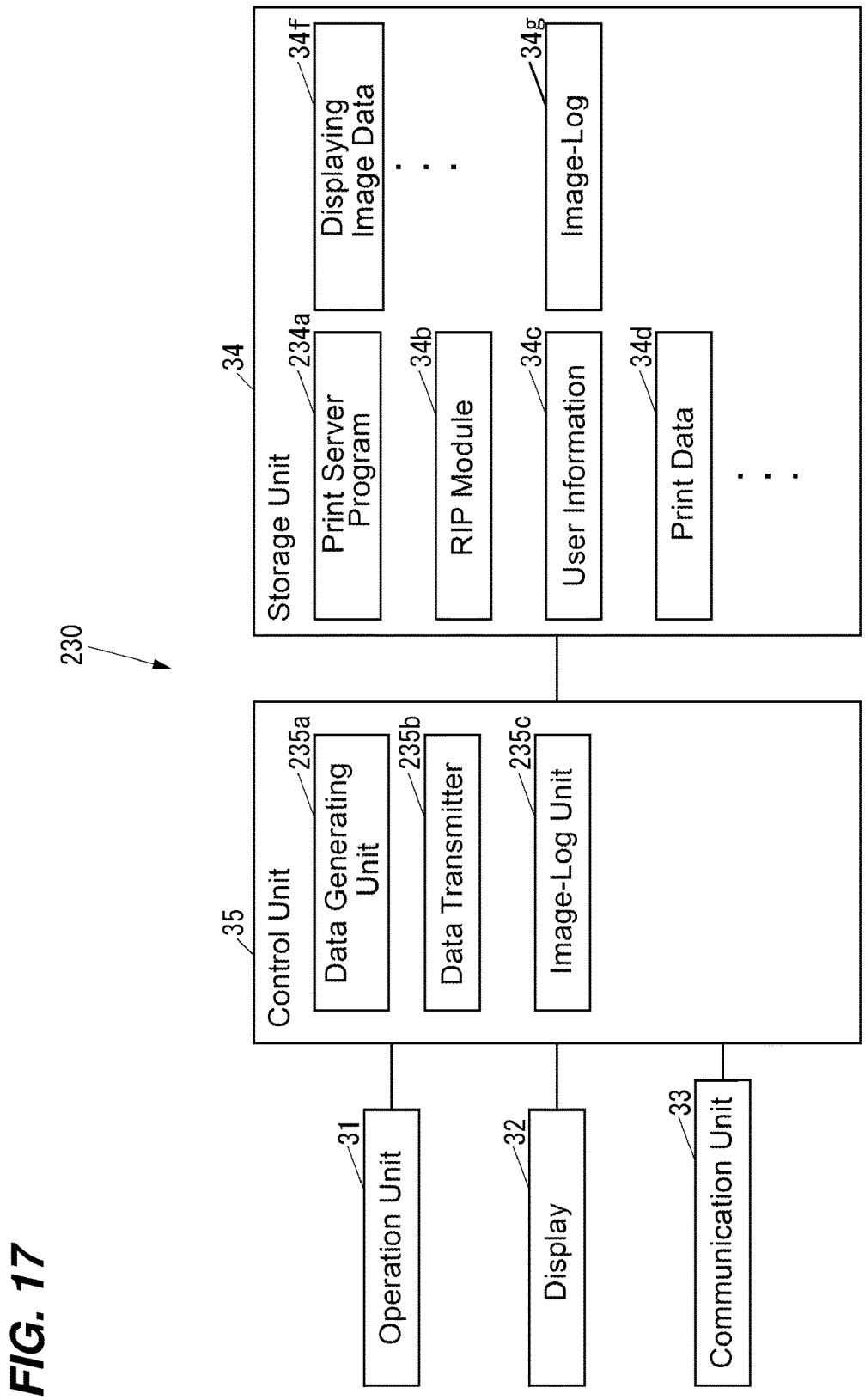
FIG. 17 illustrates a print server of a pull print system according to a second embodiment of the disclosure.

The configuration of the pull print system according to the embodiment is similar to the configuration where the pull print system 10 includes a print server 230 illustrated in FIG. 17 instead of the print server 30 illustrated in FIG. 3.

As illustrated in FIG. 17, a configuration of the print server 230 is similar to a configuration where the print server 30 includes a print server program 234a, a data generating unit 235a, a data transmitter 235b, and an image-log unit 235c instead of the print server program 34a, the data generating unit 35a, the data transmitter 35b, and the image-log unit 35c, and does not include the printing image data 34e.

The following describes an operation of the pull print system according to the embodiment.

In the operation of the pull print system according to the embodiment, the operation similar to that of the pull print system 10 will not be further elaborated here.

Figure 18:
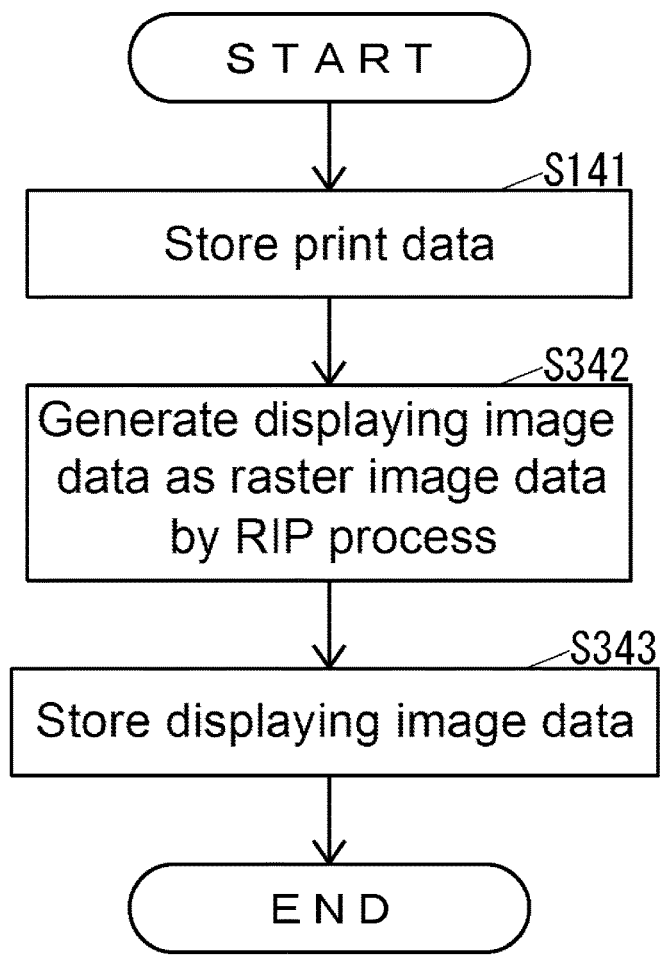
FIG. 18 illustrates an operation of the print server according to the second embodiment when receiving print data from a user terminal.

The control unit 35 of the print server 30 of the pull print system according to the embodiment executes the operation illustrated in FIG. 18 instead of the operation illustrated in FIG. 9.

The operation illustrated in FIG. 18 is different from the operation illustrated in FIG. 9 in the following process.

As illustrated in FIG. 18, after the RIP module 34b executes the RIP process based on the print data 34d stored in the storage unit 34 at Step S141 to generate the displaying image data as the raster image data (Step S342), the data generating unit 235a stores the generated displaying image data as the displaying image data 34f in the storage unit 34 (Step S343) to terminate the operation illustrated in FIG. 18.

Figure 19:
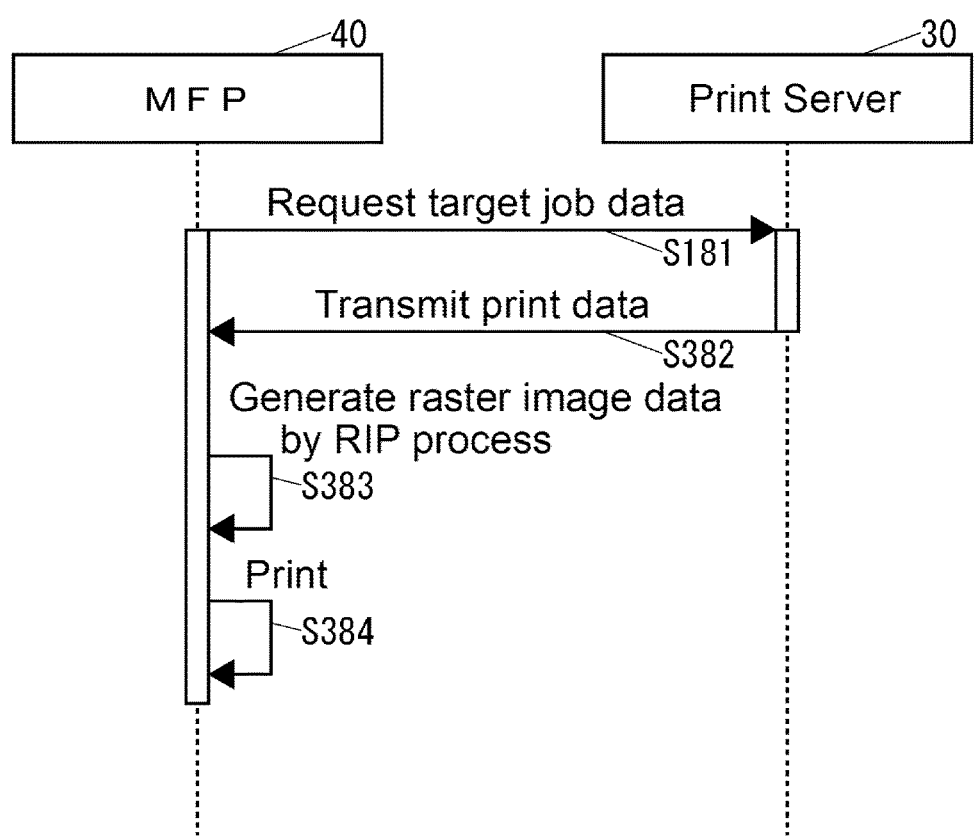
FIG. 19 illustrates an operation of the pull print system according to the second embodiment when executing a print job for a pull print at an MFP.

The control unit 35 of the print server 30 of the pull print system according to the embodiment executes the operation illustrated in FIG. 19 instead of the operation illustrated in FIG. 15.

The operation illustrated in FIG. 19 is different from the operation illustrated in FIG. 15 in the following process.

As illustrated in FIG. 19, after receiving the request at Step S181, the data transmitter 235b of the print server 230 transmits the print data 34d as the requested job data to the MFP 40 (Step S382).

After receiving the print data from the print server 30, the RIP module 47b executes the RIP process based on the received print data to generate the raster image data (Step S383). Then, the control unit 48 of the MFP 40 causes the printer 43 to print based on the generated raster image data (Step S384) to terminate the operation illustrated in FIG. 19.

The image-log unit 235c of the print server 30 adds a combination of the displaying image data 34f of the job data corresponding to the print data 34d transmitted to the MFP 40, the identification information of the user that has requested this print data 34d, and the date and time when this print data 34d has been transmitted to the MFP 40, as a log to the image-log 34g.

As described above, after the pull print system according to the embodiment downloads the print data as the job data of the print job from the print server 230 to the MFP 40 at Step S382, the pull print system generates the raster image data at the MFP 40 based on this print data at Step S383 to print this raster image data at Step S384. The RIP process executed at the print server 230 is identical to the RIP process executed at the MFP 40, thus ensuring the execution of the accurate preview, similar to the pull print system 10 according to the first embodiment.

Third Embodiment

The following describes a third embodiment of the disclosure with reference to drawings.

First, a description will be given of a configuration of a pull print system according to the embodiment.

Figure 20:
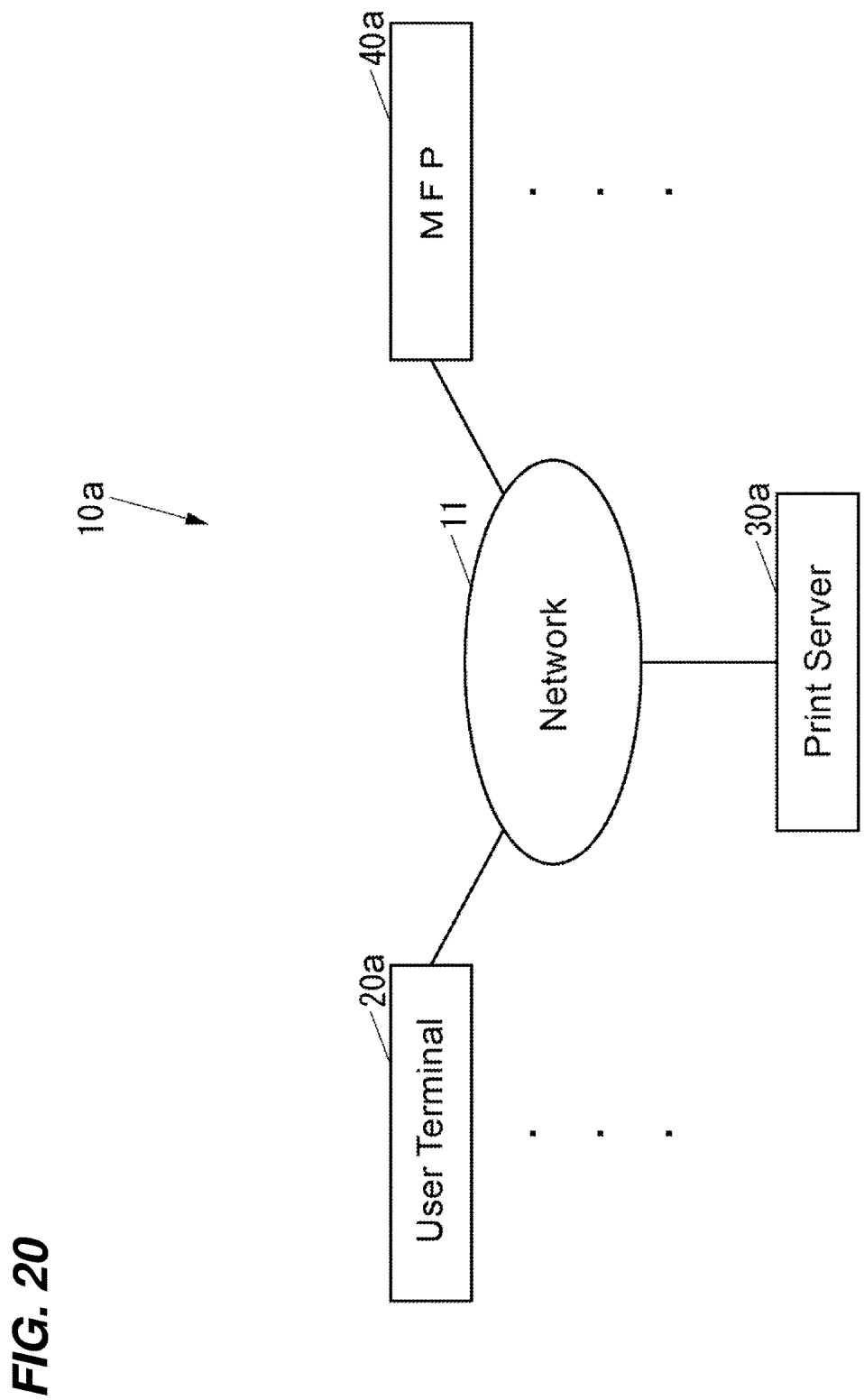
FIG. 20 illustrates a pull print system according to a third embodiment of the disclosure.

FIG. 20 illustrates a pull print system 10a according to the embodiment.

As illustrated in FIG. 20, the pull print system 10a includes a user terminal 20a, a print server 30a, and a multifunction peripheral (MFP) 40a. The user terminal 20a generates print data. The MFP 40a is a print apparatus that prints based on job data as data of a print job. The user terminal 20a, the print server 30a, and the MFP 40a are communicative one another via a network 11 such as a local area network (LAN) and the Internet.

The print data generated by the user terminal 20a is data described in page description language (PDL) such as Printer Command Language (PCL) and Kyocera Page Description Language (KPDL).

The print server 30a is higher-performance than the MFP 40a for specifications of the machines. The print server 30a has a high data processing capacity.

The pull print system 10a can include a plurality of user terminals similar to the user terminal 20a. However, the following describes the user terminal 20a as a representative of the user terminals included in the pull print system 10a.

Similarly, the pull print system 10a can include a plurality of MFPs similar to the MFP 40a. However, the following describes the MFP 40a as a representative of the MFPs included in the pull print system 10a.

Figure 21:
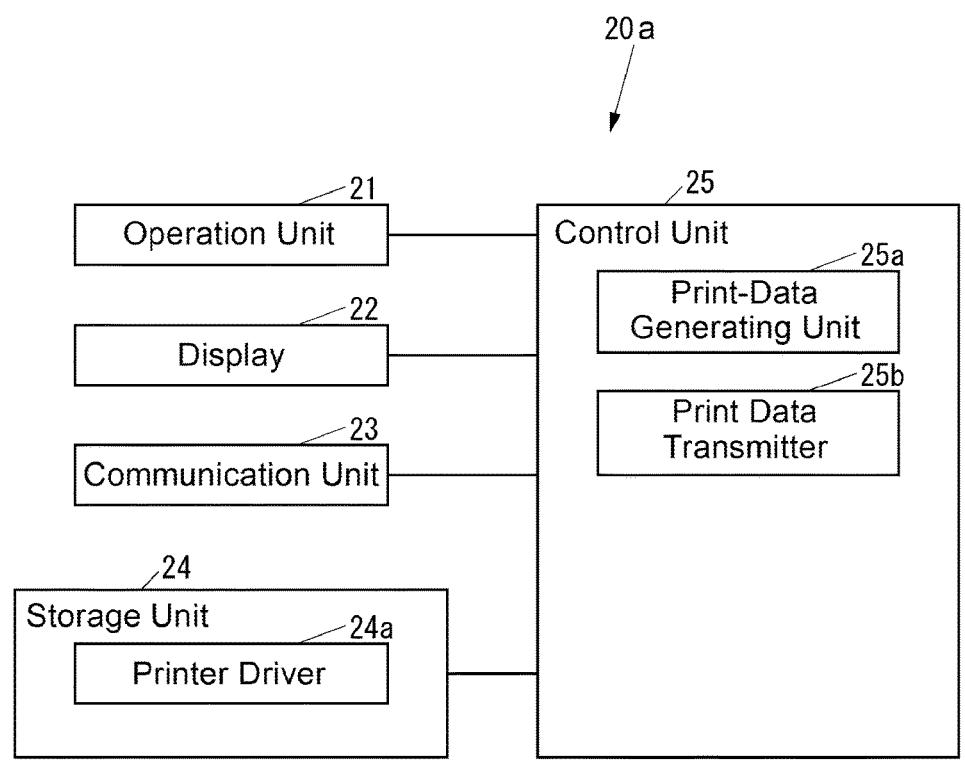
FIG. 21 illustrates a user terminal according to the third embodiment.

FIG. 21 illustrates the user terminal 20a according to the third embodiment.

As illustrated in FIG. 21, the user terminal 20a includes an operation unit 21, a display 22, a communication unit 23, a storage unit 24, and a control unit 25. The operation unit 21 is an input device where various operations by a user are input. The display 22 is a display device such as a liquid crystal display (LCD) that displays various information. The communication unit 23 is a communication device that communicates with an external device via the network 11 (see FIG. 20). The storage unit 24 is a storage device, such as a semiconductor memory and a hard disk drive (HDD), that stores various data. The control unit 25 controls the entire user terminal 20a. The user terminal 20a is configured of a portable terminal such as a smart phone or a computer such as a personal computer (PC).

The storage unit 24 stores a printer driver 24a. The printer driver 24a controls an operation of the print apparatus. The printer driver 24a may be installed in the user terminal 20a at production stage of the user terminal 20a, may be additionally installed in the user terminal 20a from an external storage medium such as a universal serial bus (USB) flash drive, or may be additionally installed in the user terminal 20a from the network 11.

The control unit 25, for example, includes a central processing unit (CPU), a read only memory (ROM), which stores programs and various data, and a random access memory (RAM), which is used as a work area of the CPU. The CPU executes programs stored in the ROM or the storage unit 24.

The control unit 25 executes the printer driver 24a stored in the storage unit 24 to function as a print-data generating unit 25a and a print data transmitter 25b. The print-data generating unit 25a generates the print data per page that constitutes the job data as data of the print job. The print data transmitter 25b transmits the print data generated by the print-data generating unit 25a to the print server 30a (see FIG. 20).

Figure 22:
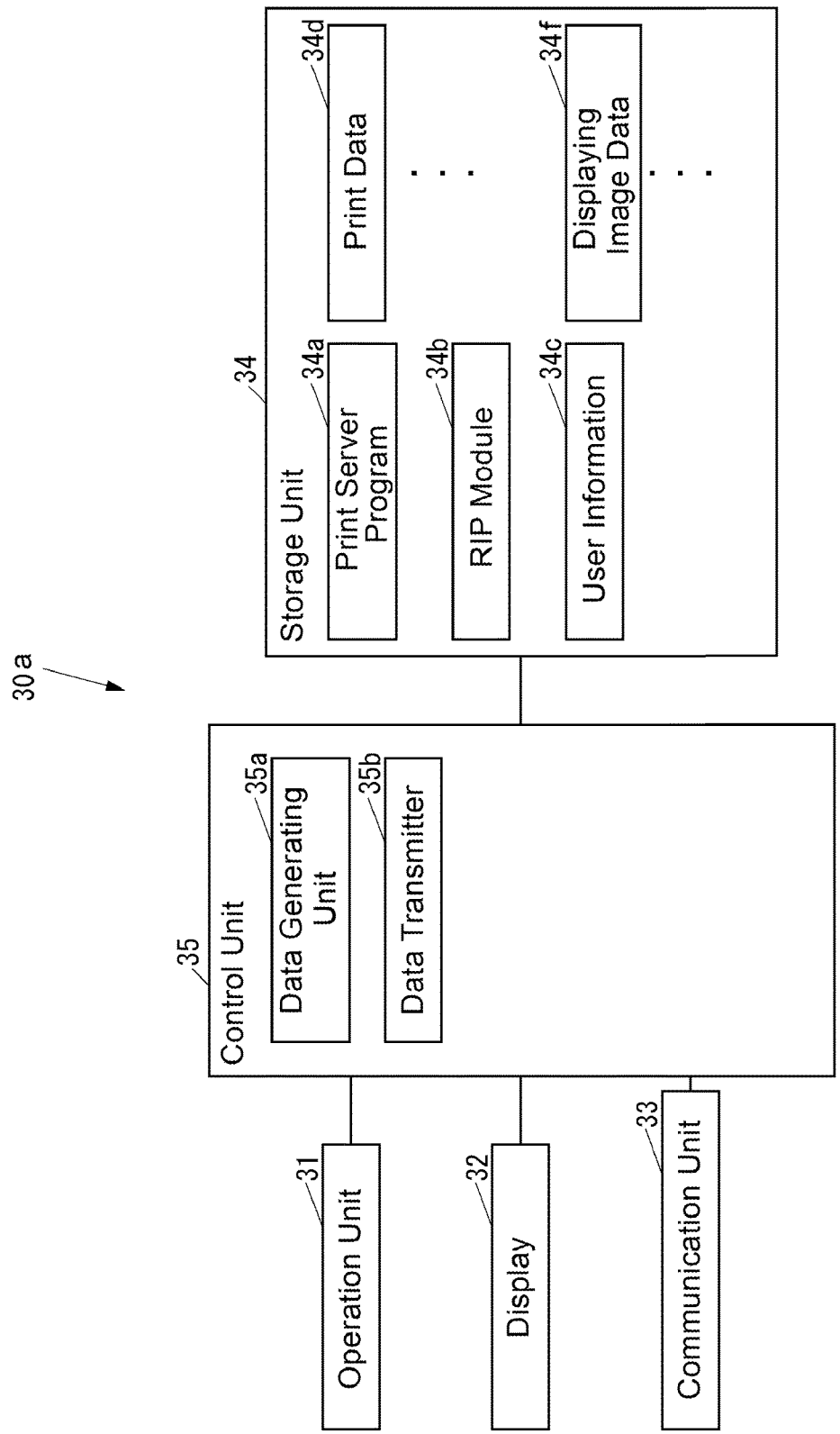
FIG. 22 illustrates a print server according to the third embodiment.

FIG. 22 illustrates the print server 30a.

As illustrated in FIG. 22, the print server 30a includes an operation unit 31, a display 32, a communication unit 33, a storage unit 34, and a control unit 35. The operation unit 31 is an input device such as a computer mouse and a keyboard where various operations by the user are input. The display 32 is a display device such as an LCD that displays various information. The communication unit 33 is a communication device that communicates with an external device via the network 11 (see FIG. 20). The storage unit 34 is a storage device, such as a semiconductor memory and an HDD, that stores various data. The control unit 35 controls the entire print server 30a. The print server 30a is configured of a computer such as a PC.

The storage unit 34 stores a print server program 34a and a RIP module 34b. The print server program 34a controls an operation of the print server 30a. The RIP module 34b executes the raster image processor (RIP) process based on the print data to generate raster image data. The print server program 34a and the RIP module 34b each may be installed in the print server 30a at production stage of the print server 30a, may be additionally installed in the print server 30a from an external storage medium such as a USB flash drive, or may be additionally installed in the print server 30a from the network 11.

The RIP module 34b is a module having a content identical to that of a RIP module 47b (see FIG. 23) described later of the MFP 40a (see FIG. 20). That is, the RIP module 34b executes the RIP process identical to that of the RIP module 47b of the MFP 40a.

The storage unit 34 stores user information 34c. The user information 34c includes various information for each user, such as user identification information and user password.

The storage unit 34 can store a plurality of pieces of print data 34d. The storage unit 34 stores the print data 34d each associated with the user identification information.

The storage unit 34 can store a plurality of pieces of displaying image data 34f as displaying raster image data. The displaying image data 34f is a file previewable at the PC and the print apparatus, such as a portable network graphics (PNG) file. The displaying image data 34f includes original data and thumbnail data. The original data is original image data generated such that the RIP module 34b executes the RIP process based on the print data 34d. The thumbnail data is data having a reduced thumbnail data size in a reduced image size compared with its original image. The storage unit stores the displaying image data 34f each associated with the corresponding print data 34d.

The control unit 35, for example, includes a CPU, a ROM, which stores programs and various data, and a RAM, which is used as a work area of the CPU. The CPU executes programs stored in the ROM or the storage unit 34.

The control unit 35 executes the print server program 34a stored in the storage unit 34 to function as a data generating unit 35a, and a data transmitter 35b. The data generating unit 35a generates data. The data transmitter 35b transmits the data.

Figure 23:
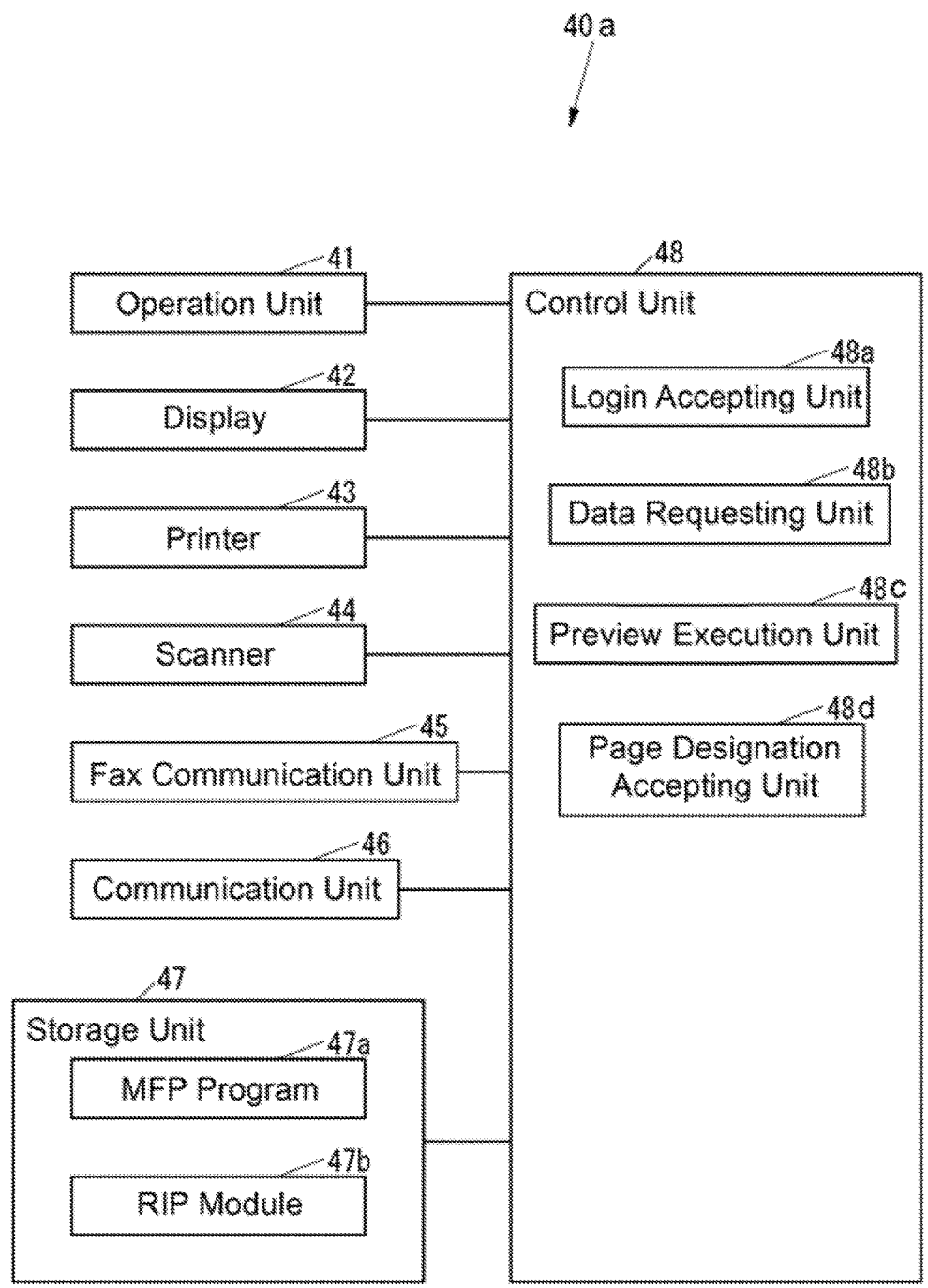
FIG. 23 illustrates an MFP according to the third embodiment.

FIG. 23 illustrates the MFP 40a.

As illustrated in FIG. 23, the MFP 40a includes an operation unit 41, a display 42, a printer 43, a scanner 44, a fax communication unit 45, a communication unit 46, a storage unit 47, and a control unit 48. The operation unit 41 is an input device such as a button where various operations by the user are input. The display 42 is a display device such as an LCD that displays various information. The printer 43 is a print device that prints on a recording medium such as a paper sheet. The scanner 44 is a reading device that reads image data from an original document. The fax communication unit 45 is a fax device that executes fax communication via a communication line such as a dial-up line with an external facsimile device (not illustrated). The communication unit 46 is a network communication device that communicates with an external device via the network 11 (see FIG. 20). The storage unit 47 is a storage device, such as a semiconductor memory and an HDD, that stores various data. The control unit 48 controls the entire MFP 40a.

The storage unit 47 stores an MFP program 47a and the RIP module 47b. The MFP program 47a controls an operation of the MFP 40a. The RIP module 47b executes the RIP process based on the print data to generate raster image data. The MFP program 47a and the RIP module 47b each may be installed in the MFP 40a at production stage of the MFP 40a, may be additionally installed in the MFP 40a from an external storage medium such as a USB flash drive, or may be additionally installed in the MFP 40a from the network 11.

The control unit 48, for example, includes a CPU, a ROM, which stores programs and various data, and a RAM, which is used as a work area of the CPU. The CPU executes programs stored in the ROM or the storage unit 47.

The control unit 48 executes the MFP program 47a stored in the storage unit 47 to function as a login accepting unit 48a, a data requesting unit 48b, a preview execution unit 48c, and a page designation accepting unit 48d. The login accepting unit 48a accepts a login of the user. The data requesting unit 48b requests the data from the print server 30a (see FIG. 20). The preview execution unit 48c executes the preview of the print job. The page designation accepting unit 48d accepts designation of the page requested by the data requesting unit 48b to the print server 30a in the job data of the user whose login has been accepted by the login accepting unit 48a.

The following describes an operation of the pull print system 10a.

First, a description will be given of the operation of the pull print system 10a when the user logs in the print server 30a from the user terminal 20a.

Figure 24:
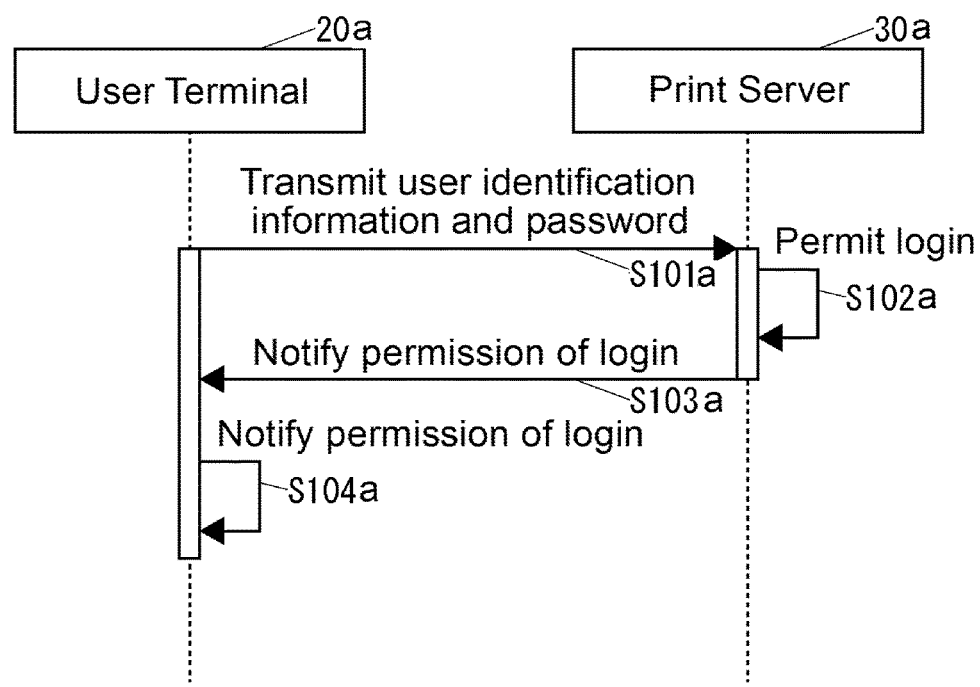
FIG. 24 illustrates an operation of the pull print system according to the third embodiment when the user logs in the print server from the user terminal.

FIG. 24 illustrates the operation of the pull print system 10a when the user logs in the print server 30a from the user terminal 20a.

The user can log in the print server 30a via the operation unit 21 of the user terminal 20a.

As illustrated in FIG. 24, after a login instruction is input via the operation unit 21, the control unit 25 of the user terminal 20a transmits a combination of user identification information and password input via the operation unit 21 to the print server 30a (Step S101a).

Then, when the combination of the user identification information and password transmitted from the user terminal 20a is included in the user information 34c, the control unit 35 of the print server 30a permits the user to log in (Step S102a) to notify the user terminal 20a of this (Step S103a).

After the print server 30a notifies the control unit 25 of the user terminal 20a that the user login has been permitted, the control unit 25 notifies the user that the user login has been permitted via the display 22 (Step S104a) to terminate the operation illustrated in FIG. 24.

The following describes the operation of the user terminal 20a when transmitting the print data.

The user can instruct the user terminal 20a via the operation unit 21 of the user terminal 20a to transmit the print data of a document. After the control unit 25 of the user terminal 20a is instructed to transmit the print data, the control unit 25 executes the printer driver 24a to execute the operation illustrated in FIG. 25.

Figure 25:
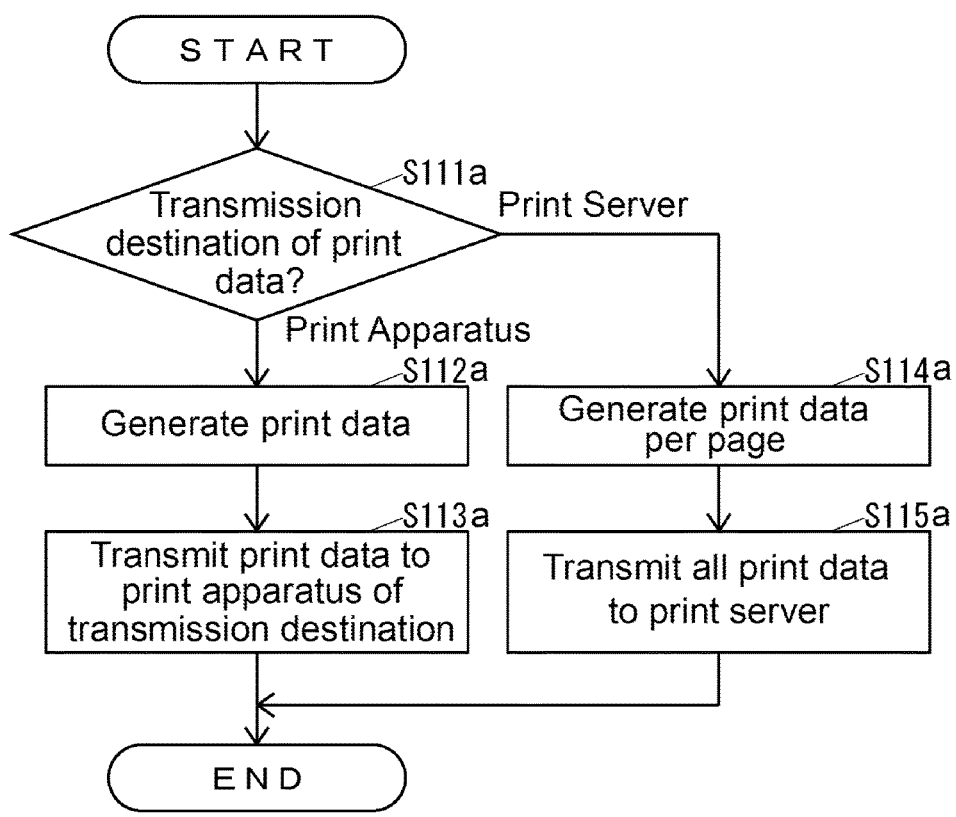
FIG. 25 illustrates an operation of the user terminal according to the third embodiment when transmitting print data.

FIG. 25 illustrates the operation of the user terminal 20a when transmitting the print data.

As illustrated in FIG. 25, the print-data generating unit 25a of the user terminal 20a determines a transmission destination of the print data (Step S111a). Here, the user can set the transmission destination of the print data in advance in the printer driver 24a via the operation unit 21. As the transmission destination of the print data, a specific print apparatus such as the MFP 40a, and the print server 30a are settable.

When the print-data generating unit 25a determines that the set transmission destination is the print apparatus at Step S111a, the print-data generating unit 25a generates the print data as the job data based on the document (Step S112a).

Figure 26:
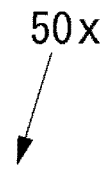
FIG. 26 illustrates exemplary print data generated by a print-data generating unit according to the third embodiment when a transmission destination is a print apparatus.

FIG. 26 illustrates exemplary print data 50x generated by the print-data generating unit 25a when the transmission destination is the print apparatus.

As illustrated in FIG. 26, the print-data generating unit 25a generates one piece of print data 50x when the transmission destination is the print apparatus.

In the print data 50x illustrated in FIG. 26, "@PJL SET JOBNAME" is a printer job language (PJL) command that indicates a name of the print job (hereinafter, referred to as a "job name"). That is, the job name of the print data 50x illustrated in FIG. 26 is "Test job."

In the print data 50x illustrated in FIG. 26, "Job Data of Page" indicates being the print data of the respective pages. For example, "Job Data of Page 1" indicates being the print data of the first page. The actual print data 50x includes not the character string "Job Data of Page 1" but the print data of the first page itself. That is, the print data 50x illustrated in FIG. 26 includes the print data of total eight pages from the first page to the eighth page.

As illustrated in FIG. 25, the print data transmitter 25b of the user terminal 20a transmits the print data generated at Step S112a to the print apparatus set as the transmission destination via the communication unit 23 (Step S113a) to terminate the operation illustrated in FIG. 25.

When the print-data generating unit 25a of the user terminal 20a determines that the set transmission destination is the print server 30a at Step S111a, the print-data generating unit 25a generates the print data per page that constituents the job data based on the document (Step S114a).

Figure 27:
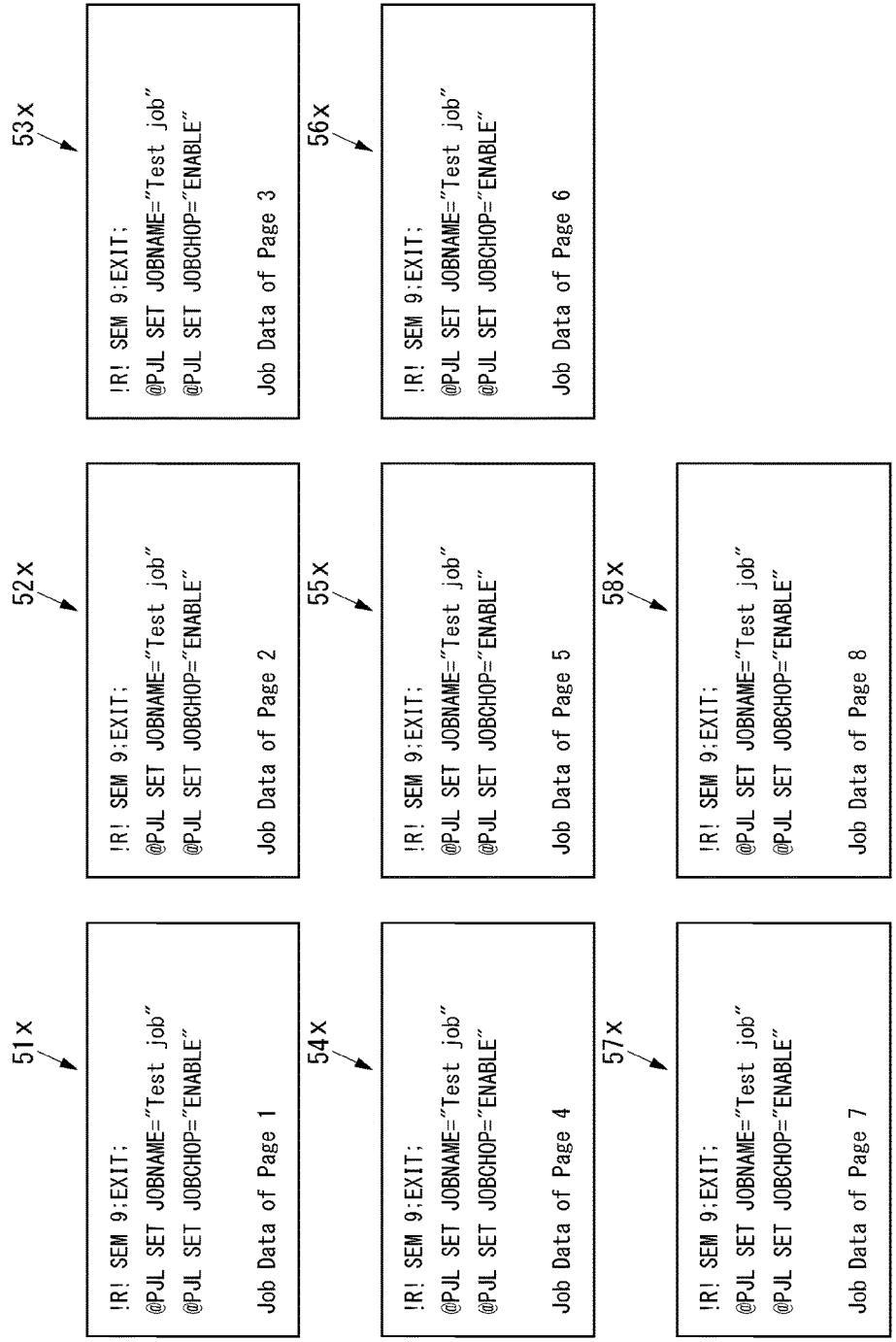
FIG. 27 illustrates exemplary print data generated by the print-data generating unit according to the third embodiment when the transmission destination is the print server.

FIG. 27 illustrates exemplary print data 51x to 58x generated by the print-data generating unit 25a when the transmission destination is the print server 30a.

As illustrated in FIG. 27, the print-data generating unit 25a generates the print data per page 51x to 58x when the transmission destination is the print server 30a. That is, the pieces print data 51x, 52x, 53x, 54x, 55x, 56x, 57x, and 58x are the pieces of print data of the first, second, third, fourth, fifth, sixth, seventh, and eighth page respectively.

In the print data 51x to 58x illustrated in FIG. 27, "@PJL SET JOBCHOP="ENABLE"" is a PJL command that indicates that the print job is enabled to be divided per page.

As illustrated in FIG. 25, the print data transmitter 25b of the user terminal 20a transmits all the print data generated at Step S114a to the print server 30a via the communication unit 23 (Step S115a) to terminate the operation illustrated in FIG. 25. Here, when transmitting the print data to the print server 30a, the control unit 25 transmits the identification information of the logged-in user in addition to the print data.

The following describes the operation of the MFP 40a when printing based on the print data directly received from the user terminal 20a.

Figure 28:
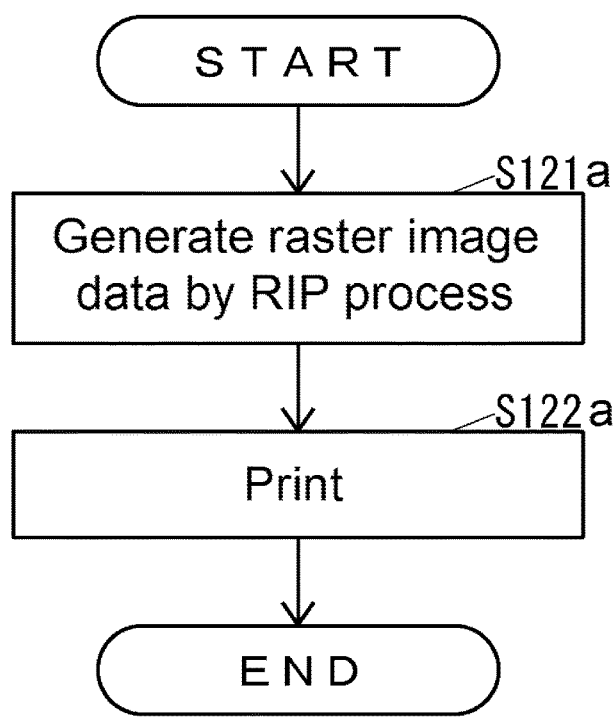
FIG. 28 illustrates an operation of the MFP according to the third embodiment when printing based on the print data directly received from the user terminal.

The control unit 48 of the MFP 40a receives the print data as the job data from the user terminal 20a to execute the operation illustrated in FIG. 28.

FIG. 28 illustrates the operation of the MFP 40a when printing based on the print data directly received from the user terminal 20a.

As illustrated in FIG. 28, after the RIP module 47b executes the RIP process based on the received print data to generate the raster image data such as a printer command language mobile (PCLm) file, a printer working group (PWG) raster file, and a universal raster format (URF) file (Step S121a), the control unit 48 causes the printer 43 to print based on the generated raster image data (Step S122a) to terminate the operation illustrated in FIG. 28.

The following describes the operation of the print server 30a when receiving the print data from the user terminal 20a.

Figure 29:
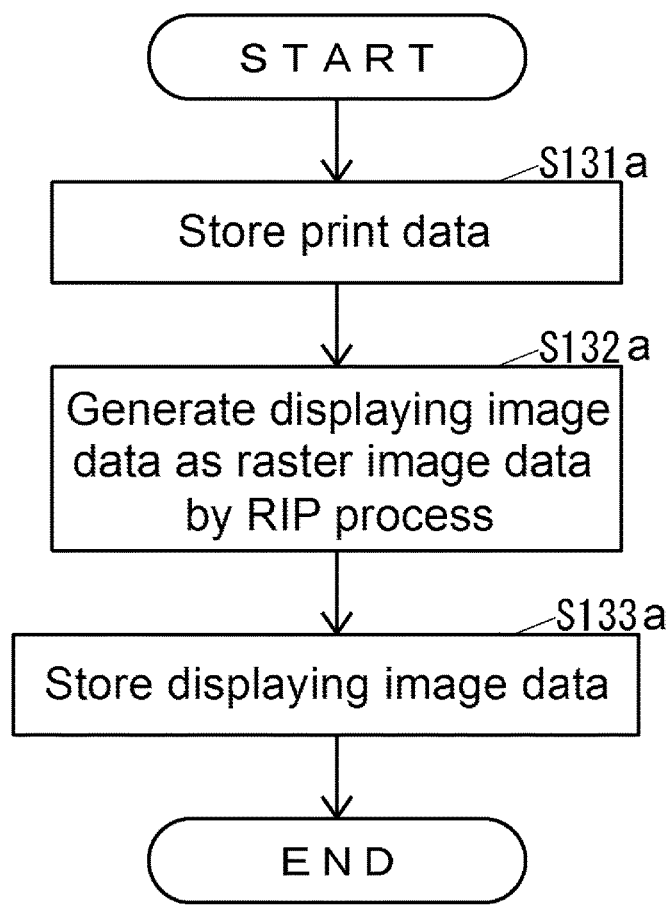
FIG. 29 illustrates an operation of the print server according to the third embodiment when receiving the print data from the user terminal.

The control unit 35 of the print server 30a receives the print data from the user terminal 20a to execute the operation illustrated in FIG. 29.

FIG. 29 illustrates the operation of the print server 30a when receiving the print data from the user terminal 20a.

As illustrated in FIG. 29, the data generating unit 35a of the control unit 35 stores the received print data as the print data 34d in the storage unit 34 (Step S131a). That is, the storage unit 34 stores the job data per page. Here, the data generating unit 35a stores the print data 34d being associated with the user identification information added to the received print data.

Next, after the RIP module 34b executes the RIP process based on the print data 34d stored in the storage unit 34 at Step S131a to generate displaying image data such as a PNG file as the raster image data (Step S132a), the data generating unit 35a stores the generated displaying image data as the displaying image data 34f in the storage unit 34 (Step S133a) to terminate the operation illustrated in FIG. 29. Here, the data generating unit 35a stores the displaying image data 34f being associated with the print data 34d stored at Step S131a.

The following describes the operation of the pull print system 10a when the user logs in the print server 30a from the MFP 40a.

Figure 30:
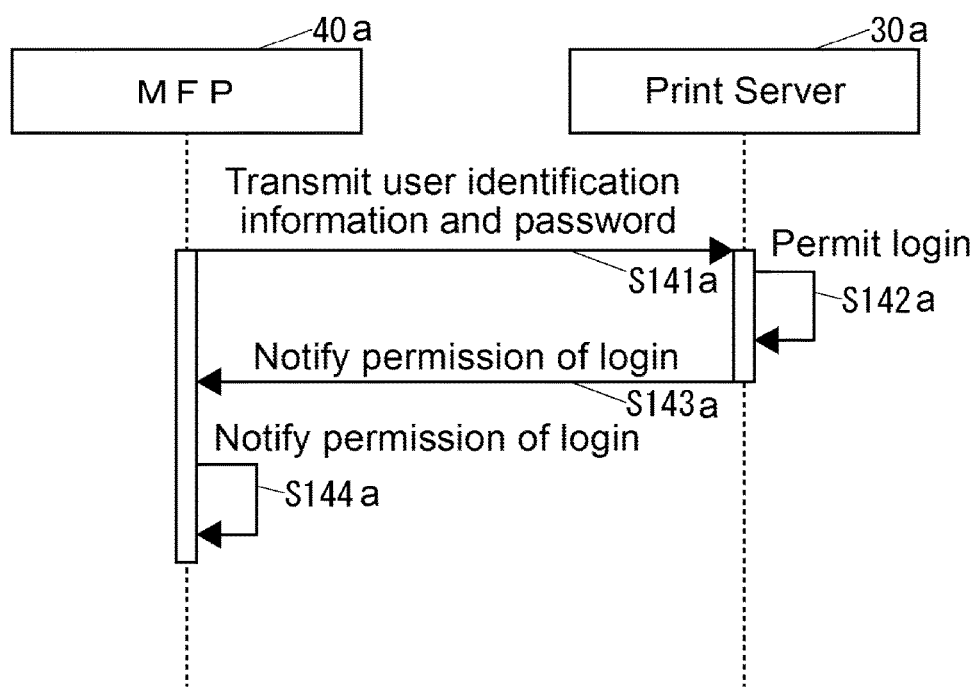
FIG. 30 illustrates an operation of the pull print system according to the third embodiment when the user logs in the print server from the MFP.

FIG. 30 illustrates the operation of the pull print system 10a when the user logs in the print server 30a from the MFP 40a.

The user can log in the print server 30a via the operation unit 41 of the MFP 40a.

As illustrated in FIG. 30, after the login instruction is input via the operation unit 41, the login accepting unit 48a of the MFP 40a transmits the combination of the user identification information and password input via the operation unit 41 to the print server 30a (Step S141a).

Then, when the combination of the user identification information and password transmitted from the MFP 40a is included in the user information 34c, the control unit 35 of the print server 30a permits the user login (Step S142a) to notify the MFP 40a of this (Step S143a).

After the print server 30a notifies that the user login has been permitted, the login accepting unit 48a of the MFP 40a notifies the user via the display 42 that the user login has been permitted (Step S144a) to terminate the operation illustrated in FIG. 30.

The following describes the operation of the pull print system 10a when executing the preview of the print job for a pull print at the MFP 40a.

Figure 31:
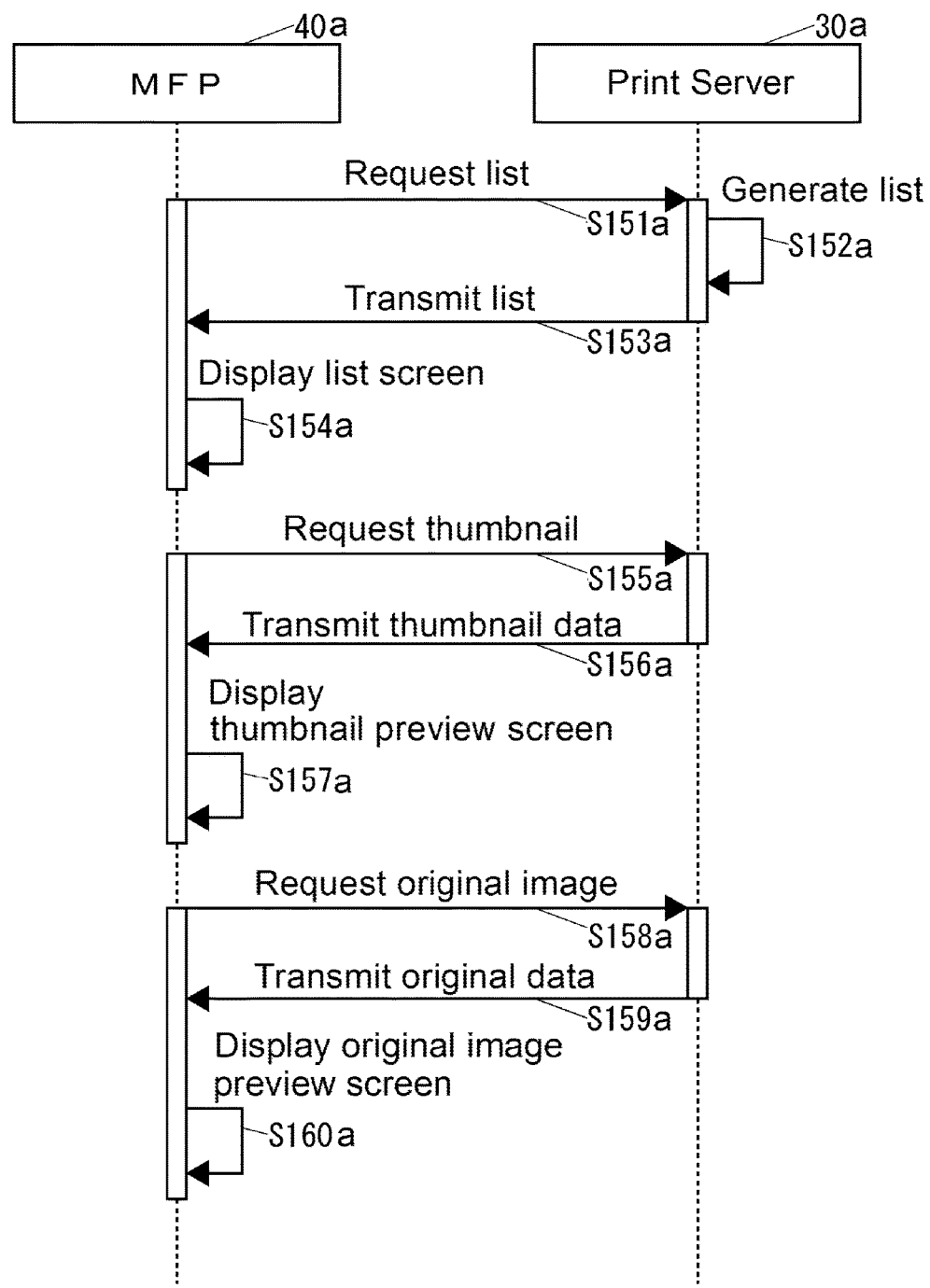
FIG. 31 illustrates an operation of the pull print system according to the third embodiment when executing a preview of a print job for a pull print at the MFP.

FIG. 31 illustrates the operation of the pull print system 10a when executing the preview of the print job for the pull print at the MFP 40a.

The user can instruct the MFP 40a via the operation unit 41 of the MFP 40a to confirm the print job for the pull print.

As illustrated in FIG. 31, after the confirmation instruction of the print job for the pull print is input via the operation unit 41, the data requesting unit 48b of the MFP 40a requests a list of the print job for the pull print of the logged-in user from the print server 30a (Step S151a). Here, the data requesting unit 48b includes the identification information of the logged-in user in the request at Step S151a.

After receiving the request at Step S151a, the data transmitter 35b of the print server 30a generates a list of the print job based on the print data 34d associated with the user identification information included in the request at Step S151*a* (Step S152*a*) to transmit this list to the MFP 40*a* (Step S153*a*). Here, when the job names included in the print data 34*d* are identical, the data transmitter 35*b* determines that the pieces of data are the print data 34*d* of the identical print job.

After receiving the list from the print server 30*a*, the data requesting unit 48*b* of the MFP 40*a* displays a list screen that displays the received list on the display 42 (Step S154*a*).

Figure 32:
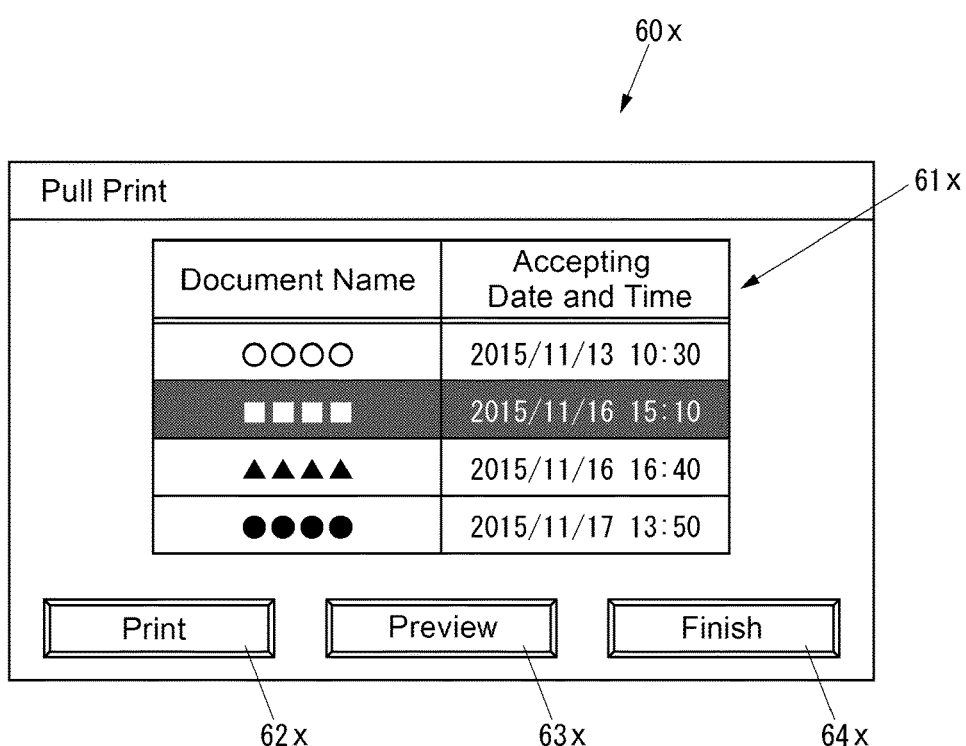
FIG. 32 illustrates an exemplary list screen displayed in an operation according to the third embodiment.

FIG. 32 illustrates an exemplary list screen 60*x* displayed at Step S154*a*.

The list screen 60*x* illustrated in FIG. 32 includes a list display area 61*x*, a print button 62*x*, a preview button 63*x*, and a finish button 64*x*. The list display area 61*x* displays the list of the print job for the pull print of the logged-in user. The print button 62*x* is a button for instructing the execution of the print job selected on the list display area 61*x*. The preview button 63*x* is a button for instructing the execution of the preview of the print job selected on the list display area 61*x*. The finish button 64*x* is a button for terminating the operation illustrated in FIG. 31.

The list display area 61*x* can display all the print jobs for the pull print of the logged-in user. When all the print jobs for the pull print of the logged-in user cannot be simultaneously displayed on the list display area 61*x*, they can be displayed by scrolling. On the list display area 61*x*, any one print job or the plurality of print jobs can be selected. The selected print job is displayed on the list display area 61*x* in a state where its color is inverted.

The print button 62*x* and the preview button 63*x* are operable only when any print job is selected on the list display area 61*x*.

After the user presses the preview button 63*x* via the operation unit 41 of the MFP 40*a*, the data requesting unit 48*b* of the MFP 40*a*, as illustrated in FIG. 31, requests the thumbnail of the print job selected on the list display area 61*x* when the preview button 63*x* is pressed from the print server 30*a* (Step S155*a*).

After receiving the request at Step S155*a*, the data transmitter 35*b* of the print server 30*a* transmits the thumbnail data of the thumbnail requested at Step S155*a* in the displaying image data 34*f* to the MFP 40*a* (Step S156*a*).

After receiving the thumbnail data from the print server 30*a*, the preview execution unit 48*c* of the MFP 40*a* displays a thumbnail preview screen that displays the thumbnail based on the received thumbnail data on the display 42 (Step S157*a*).

Figure 33:
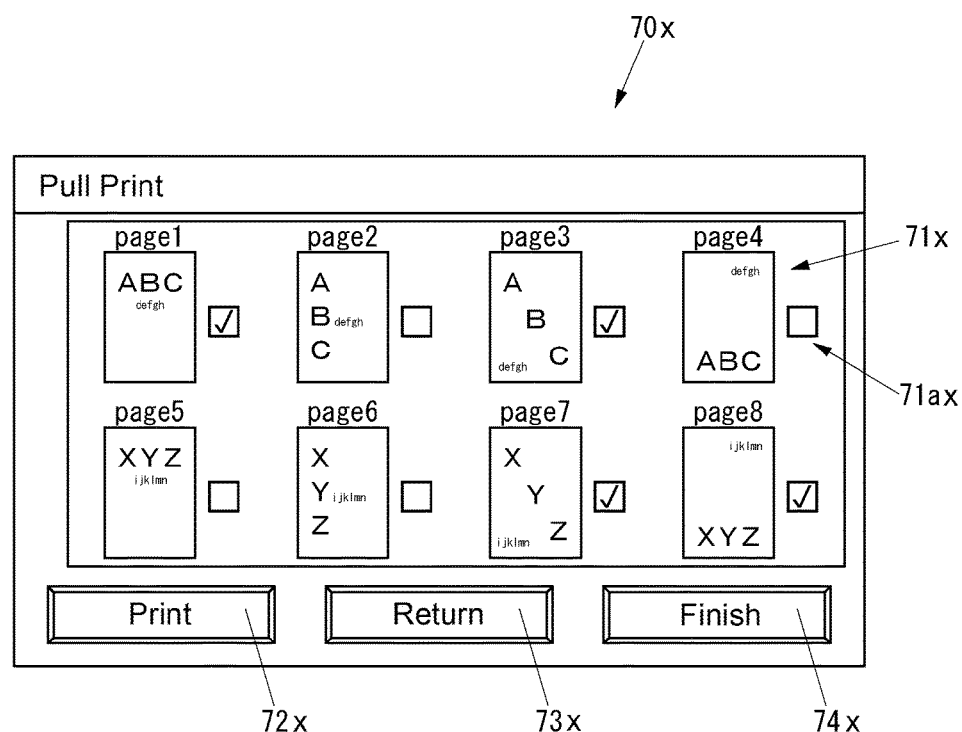
FIG. 33 illustrates an exemplary thumbnail preview screen displayed in the operation according to the third embodiment.

FIG. 33 illustrates an exemplary thumbnail preview screen 70*x* displayed at Step S157*a*.

The thumbnail preview screen 70*x* illustrated in FIG. 33 includes a thumbnail area 71*x*, a print button 72*x*, a return button 73*x*, and a finish button 74*x*. The thumbnail area 71*x* displays the thumbnails of respective pages of a target print job. The print button 72*x* is a button for instructing the execution of the target print job. The return button 73*x* is a button for returning to the list screen 60*x* (see FIG. 32). The finish button 74*x* is a button for terminating the operation illustrated in FIG. 31.

The thumbnail area 71*x* can display the thumbnails of all the pages of the target print job. When the thumbnails of all the pages of the target print job cannot be simultaneously displayed on the thumbnail area 71*x*, they can be displayed by scrolling.

At positions corresponding to the thumbnails of the respective pages displayed on the thumbnail area 71*x*, check boxes 71*ax* for selecting the thumbnails of the respective pages are arranged.

After the user selects any thumbnail by the check box 71*ax* on the thumbnail area 71*x* via the operation unit 41 of the MFP 40*a*, the data requesting unit 48*b* of the MFP 40*a*, as illustrated in FIG. 31, requests the original image of the selected thumbnail from the print server 30*a* (Step S158*a*).

After receiving the request at Step S158*a*, the data transmitter 35*b* of the print server 30*a* transmits the original data of the original image requested at Step S158*a* in the displaying image data 34*f* to the MFP 40*a* (Step S159*a*).

After receiving the original data from the print server 30*a*, the preview execution unit 48*c* of the MFP 40*a* displays an original image preview screen that displays the original image based on the received original data on the display 42 (Step S160*a*).

Figure 34:
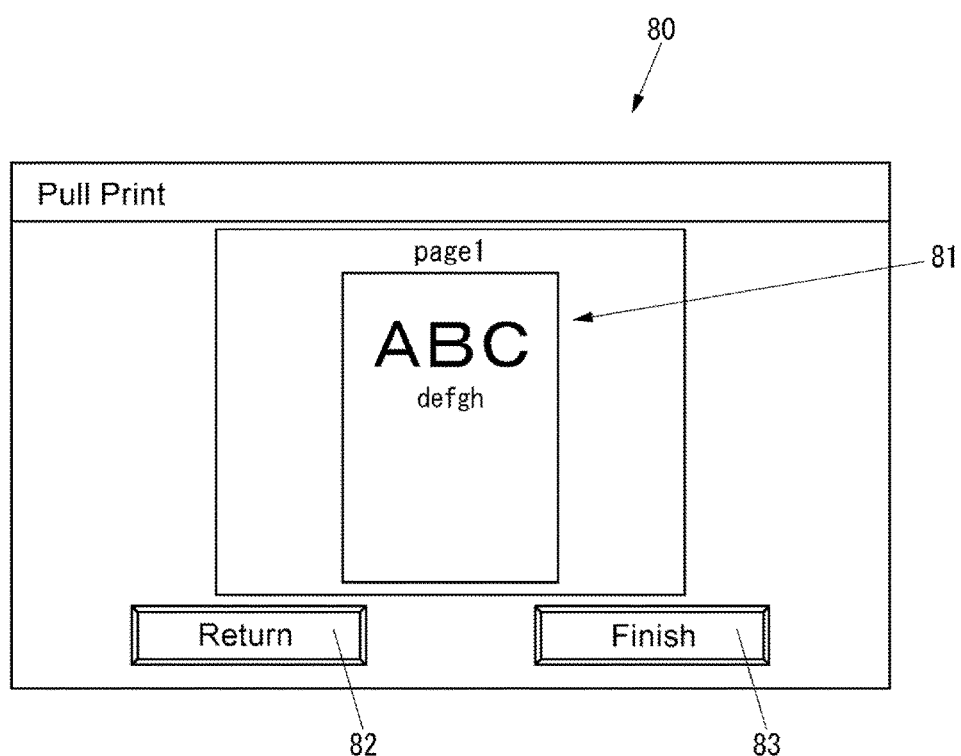
FIG. 34 illustrates an exemplary original image preview screen displayed in the operation according to the third embodiment.

FIG. 34 illustrates an exemplary original image preview screen 80 displayed at Step S160*a*.

The original image preview screen 80 illustrated in FIG. 34 includes a preview area 81, a return button 82, and a finish button 83. The preview area 81 displays the original image. The return button 82 is a button for returning to the thumbnail preview screen 70*x* (see FIG. 33). The finish button 83 is a button for terminating the operation illustrated in FIG. 31.

The image displayed on the preview area 81 can be enlarged corresponding to the operation via the operation unit 41 to be displayed.

In the above, the data requesting unit 48*b* requests the original image of the selected page. However, the data requesting unit 48*b* may request the original images of all the pages at once.

The following describes the operation of the pull print system 10*a* when executing the print job for the pull print at the MFP 40*a*.

The user can press the print button 62*x* (see FIG. 32) of the list screen 60*x* (see FIG. 32), or the print button 72*x* (see FIG. 33) of the thumbnail preview screen 70*x* (see FIG. 33) via the operation unit 41 of the MFP 40*a* to instruct the MFP 40*a* to execute the target print job. Here, the target print job is the print job selected on the list display area 61*x* (see FIG. 32) when the print button 62*x* is pressed, or the target print job of the thumbnail preview screen 70*x*.

Figure 35:
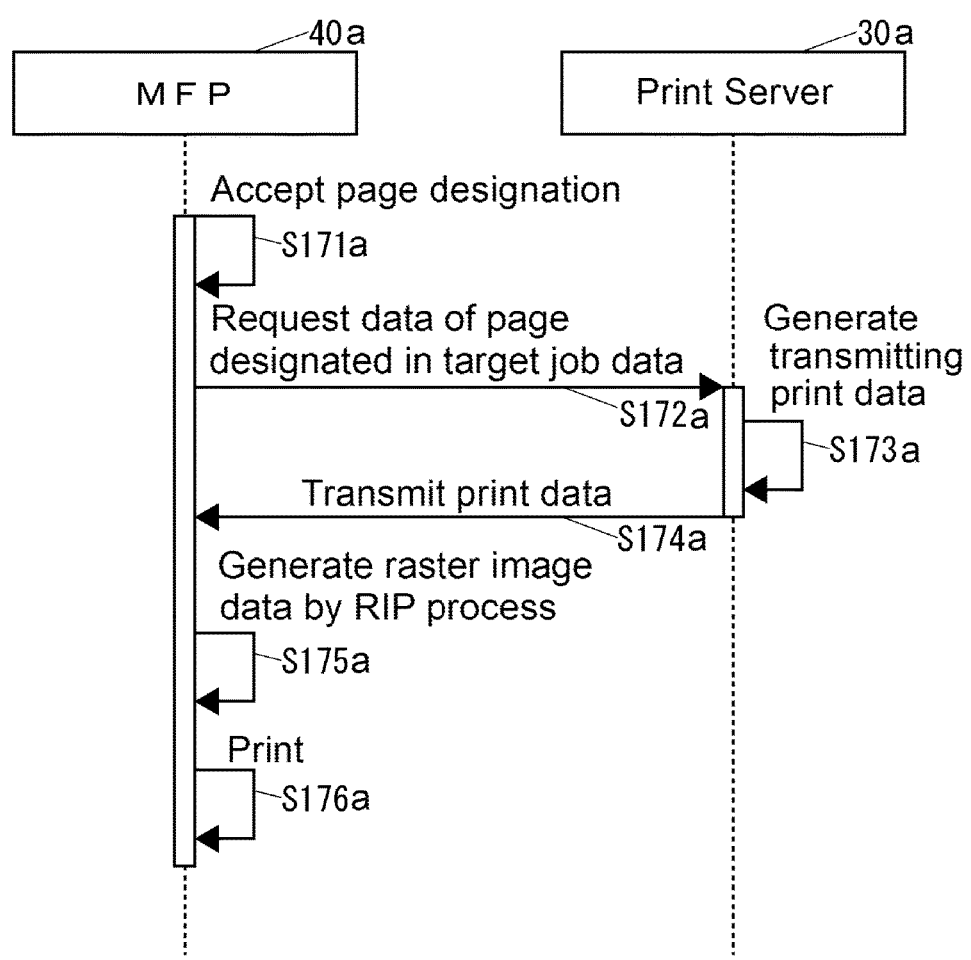
FIG. 35 illustrates an operation of the pull print system according to the third embodiment when executing the print job for the pull print at the MFP.

FIG. 35 illustrates the operation of the pull print system 10*a* when executing the print job for the pull print at the MFP 40*a*.

When the user presses the print button 62*x* of the list screen 60*x*, or the print button 72*x* of the thumbnail preview screen 70*x* via the operation unit 41 of the MFP 40*a*, the page designation accepting unit 48*d* of the MFP 40*a* accepts the page designation by the user (Step S171*a*). Here, when the print button 62*x* of the list screen 60*x* is pressed, the page designation accepting unit 48*d* accepts as all the pages of the job data of the target print job being designated. When the print button 72*x* of the thumbnail preview screen 70*x* is pressed, the page designation accepting unit 48*d* accepts as the page checked at the check box 71*ax* (see FIG. 33) when the print button 72*x* is pressed in the job data of the target print job being designated.

Next, as illustrated in FIG. 35, the data requesting unit 48*b* of the MFP 40*a* requests the job data of the page which designation has been accepted at Step S171*a* in the job data of the target print job from the print server 30*a* (Step S172*a*).

After receiving the request at Step S172*a*, the data generating unit 35*a* of the print server 30*a* generates transmitting print data constituted of the print data 34*d* of the page requested at Step S172*a* in the target print data 34*d* stored in the storage unit 34 (Step S173*a*). That is, the data generating unit 35*a* synthesizes the print data 34*d* of the page requested at Step S172a to generate the transmitting print data. Here, the data generating unit 35a determines the print data 34d of the target print job based on the job name included in the print data 34d.

For example, when the pages requested at Step S172a are the first, third, seventh, and eighth pages, the data generating unit 35a generates print data 59x as illustrated in FIG. 36 as the transmitting print data.

As illustrated in FIG. 35, after the process at Step S173a, the data transmitter 35b of the print server 30a transmits the transmitting print data generated at Step S173a to the MFP 40a (Step S174a).

After receiving the print data from the print server 30a, the RIP module 47b executes the RIP process based on the received print data to generate the raster image data (Step S175a). Then, the control unit 48 of the MFP 40a causes the printer 43 to print based on the generated raster image data (Step S176a) to terminate the operation illustrated in FIG. 35.

As described above, since the print server 30a transmits the print data of the page designated at the MFP 40a to the MFP 40a (Step S171a to Step S174a), the pull print system 10a ensures the page-designated pull print.

For example, during the pull print of the print job constituted of 100 pages at the pull print system 10a, the user can once terminate the print at the page in the middle of the print job, such as when the print of the $50^{th}$ page is terminated, in order to prioritize print of other users. Then, the user ensures the page-designated pull print such as a restart of the pull print from the $51^{st}$ page of the print job which pull print is once terminated.

After the pull print system 10a generates the displaying image data as the raster image data based on the print data at the print server 30a at Step S132a, the pull print system 10a executes the preview based on this displaying image data at the MFP 40a (Step S157a or Step S160a), thus ensuring the execution of the preview at the MFP 40a when executing the page-designated pull print to improve convenience of the page-designated pull print.

Since the RIP process executed at the print server 30a is identical to the RIP process executed at the MFP 40a, the pull print system 10a downloads the print data as the job data of the print job from the print server 30a to the MFP 40a at Step S174a to ensure the execution of the accurate preview even when the pull print system 10a generates the raster image data based on this print data at the MFP 40a at Step S175a to print it at Step S176a.

The pull print system 10a may ensure the page-designated pull print without executing the preview.

In the pull print system 10a according to the embodiment, the page is designated by selecting one by one by the check box 71ax (see FIG. 32). However, in the pull print system 10a, the page may be designated in other way. For example, in the pull print system 10a, the page may be designated by numeral and sign such as "1, 3, 7, 8." Here, in the pull print system 10a, the page may be designated in a range such as "1-4."

As illustrated in FIG. 27, the pull print system 10a includes the identification information of the page of each page print data in the print data itself. This configuration is easily ensured compare with a configuration that includes information for controlling the page of each page print data separately from the print data.

In the embodiment, when receiving the print data from outside, the print server 30a executes the RIP process based on the print data received from outside to generate the displaying image data 34f. However, the print server 30a may generate the displaying image data 34f until when the displaying image data 34f is transmitted outside. For example, the print server 30a may generate the displaying image data 34f when receiving the request at Step S155a.

In the embodiment, the print server 30a transmits the transmitting print data constituted of the print data 34d of the page requested from the MFP 40a to the MFP 40a at Step S174a. However, after the RIP module 34b executes the RIP process based on the print data constituted of the print data 34d of the page requested from the MFP 40a to generate the printing image data as the raster image data, the print server 30a may transmit this printing image data as the transmitting job data to the MFP 40a. Here, the printing image data is a printable file that does not cause the print apparatus to execute the RIP process, such as a PCLm file, a PWG raster file, and a URF file. When after the pull print system 10a generates the printing image data as the raster image data not at the MFP 40a, but at the print server 30a based on the print data, the pull print system 10a prints at the MFP 40a based on this printing image data, it is not necessary to generate the raster image data at the MFP 40a based on the print data when executing the pull print, thus ensuring reduction of burden on the MFP 40a. Accordingly, the pull print system 10a can complete the pull print at high speed. Especially, since the RIP process executed at the print server 30a is identical to the RIP process executed at the MFP 40a, even when the raster image data is generated at the print server 30a based on the print data to be printed at the MFP 40a, the pull print system 10a can obtain a printed matter with a quality identical to a quality when the raster image data is generated at the MFP 40a based on the print data to be printed.

Fourth Embodiment

The following describes a fourth embodiment of the disclosure with reference to drawings.

First, a description will be given of a configuration of an image output system according to the embodiment.

Figure 37:
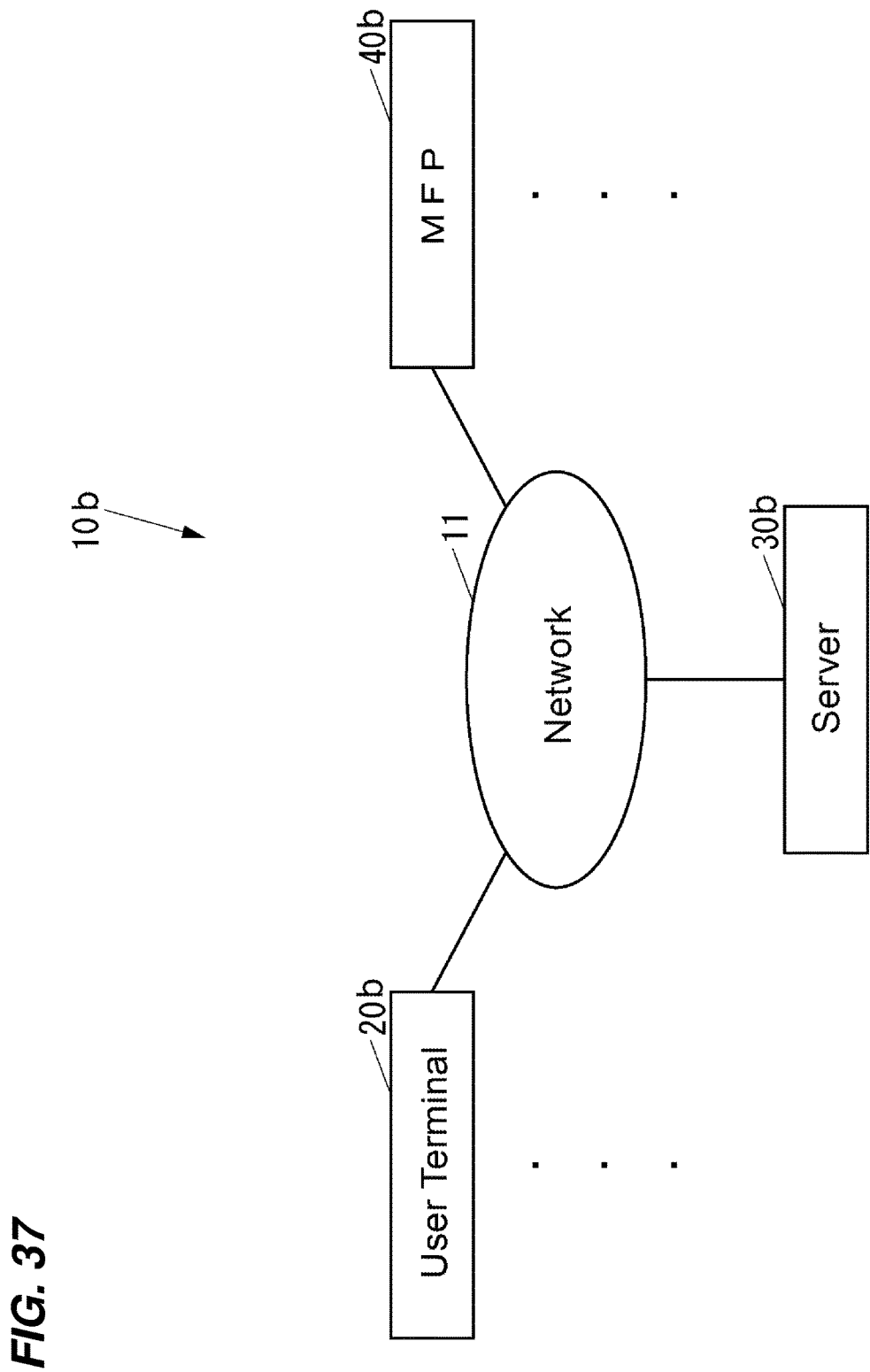
FIG. 37 illustrates an image output system according to a fourth embodiment of the disclosure.

FIG. 37 illustrates an image output system 10b according to the embodiment.

As illustrated in FIG. 37, the image output system 10b includes a user terminal 20b, a server 30b, and a multifunction peripheral (MFP) 40b. The user terminal 20b is an electronic device that generates print data. The MFP 40b is a print apparatus that prints based on job data as data of a print job. The user terminal 20b, the server 30b, and the MFP 40b are communicative one another via a network 11 such as a local area network (LAN) and the Internet.

The print data generated by the user terminal 20b is data described in page description language (PDL) such as Printer Command Language (PCL) and Kyocera Page Description Language (KPDL).

The server 30b is higher-performance than the MFP 40b for specifications of the machines. The server 30b has a high data processing capacity.

The image output system 10b can include a plurality of user terminals similar to the user terminal 20b. However, the following describes the user terminal 20b as a representative of the user terminals included in the image output system 10b.

Similarly, the image output system 10b can include a plurality of MFPs similar to the MFP 40b. However, the following describes the MFP 40b as a representative of the MFPs included in the image output system 10b.

The user terminal and the MFP included in the image output system 10b constitute the electronic device of the disclosure.

Figure 38:
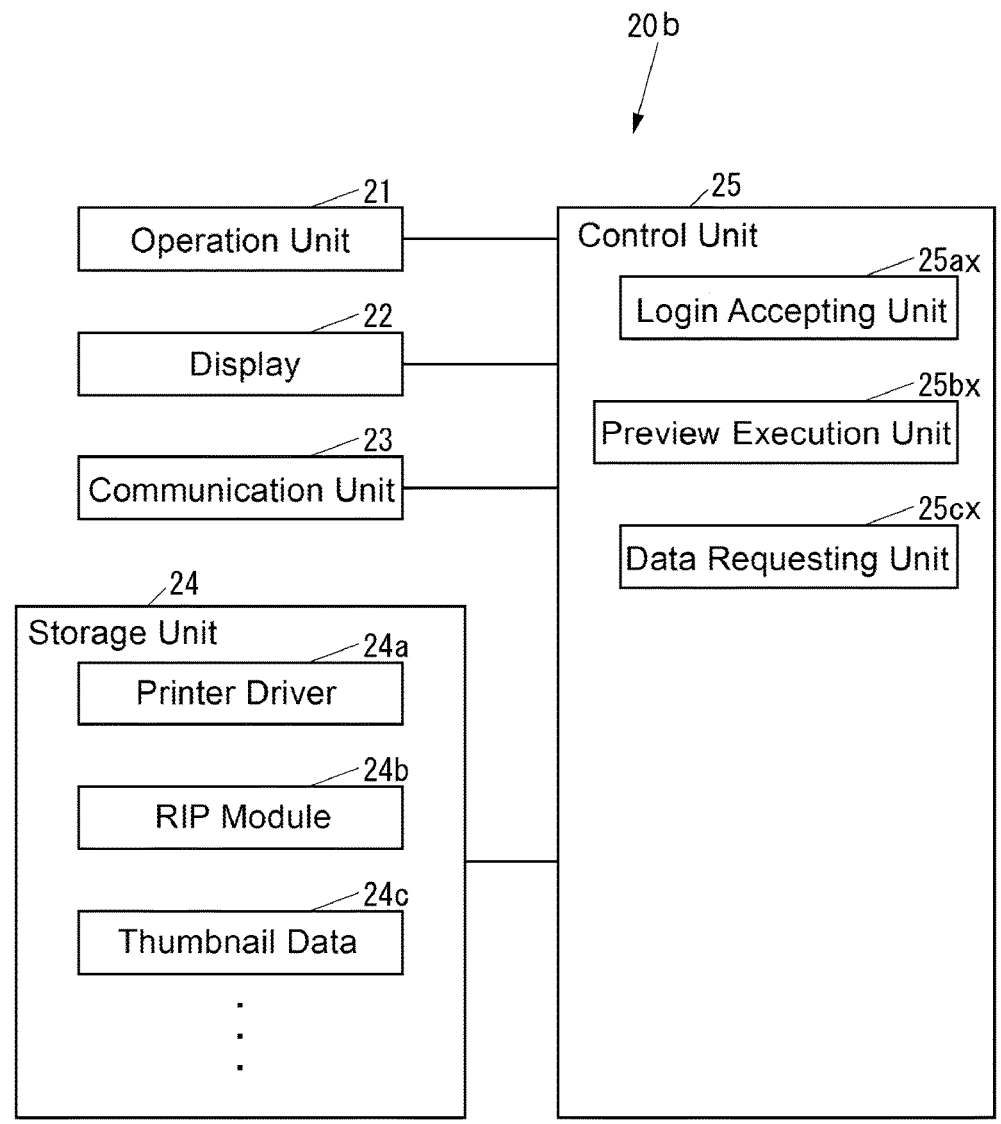
FIG. 38 illustrates a user terminal according to the fourth embodiment.

FIG. 38 illustrates the user terminal 20b.

As illustrated in FIG. 38, the user terminal 20b includes an operation unit 21, a display 22, a communication unit 23, a storage unit 24, and a control unit 25. The operation unit 21 is an input device where various operations by a user are input. The display 22 is a display device such as a liquid crystal display (LCD) that displays various information. The communication unit 23 is a communication device that communicates with an external device via the network 11 (see FIG. 37). The storage unit 24 is a storage device, such as a semiconductor memory and a hard disk drive (HDD), that stores various data. The control unit 25 controls the entire user terminal 20b. The user terminal 20b is configured of a portable terminal such as a smart phone or a computer such as a personal computer (PC).

The storage unit 24 stores a printer driver 24a and a RIP module 24b. The printer driver 24a controls an operation of the print apparatus. The RIP module 24b executes a raster image processor (RIP) process based on the print data to generate raster image data. The printer driver 24a and the RIP module 24b each may be installed in the user terminal 20b at production stage of the user terminal 20b, may be additionally installed in the user terminal 20b from an external storage medium such as a universal serial bus (USB) flash drive, or may be additionally installed in the user terminal 20b from the network 11.

The storage unit 24 can store a plurality of pieces of thumbnail data 24c as thumbnail data transmitted from the server 30b (see FIG. 37).

The control unit 25, for example, includes a central processing unit (CPU), a read only memory (ROM), which stores programs and various data, and a random access memory (RAM), which is used as a work area of the CPU. The CPU executes programs stored in the ROM or the storage unit 24.

The control unit 25 executes the program stored in the ROM or the storage unit 24 to function as a login accepting unit 25ax, a preview execution unit 25bx, and a data requesting unit 25cx. The login accepting unit 25ax accepts a login of the user. The preview execution unit 25bx executes the preview of an output image. The data requesting unit 25cx requests data for outputting the image which preview has been executed by the preview execution unit 25bx.

Figure 39:
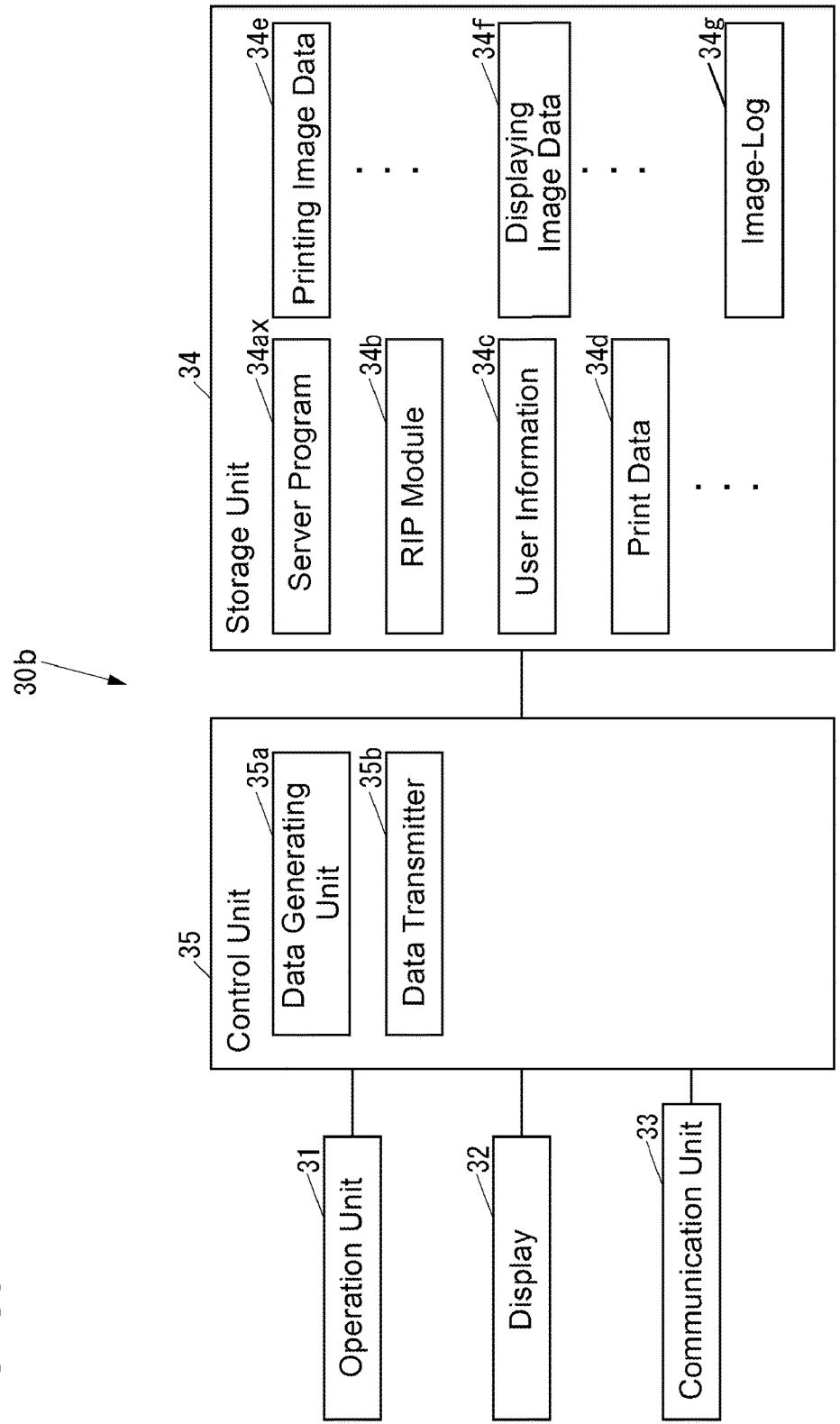
FIG. 39 illustrates a server according to the fourth embodiment.

FIG. 39 illustrates the server 30b.

As illustrated in FIG. 39, the server 30b includes an operation unit 31, a display 32, a communication unit 33, a storage unit 34, and a control unit 35. The operation unit 31 is an input device such as a computer mouse and a keyboard where various operations by the user are input. The display 32 is a display device such as an LCD that displays various information. The communication unit 33 is a communication device that communicates with an external device via the network 11 (see FIG. 37). The storage unit 34 is a storage device, such as a semiconductor memory and an HDD, that stores various data. The control unit 35 controls the entire server 30b. The server 30b is configured of a computer such as a PC.

The storage unit 34 stores a server program 34ax and a RIP module 34b. The server program 34ax controls an operation of the server 30b. The RIP module 34b executes the RIP process based on the print data to generate raster image data. The server program 34ax and the RIP module 34b each may be installed in the server 30b at production stage of the server 30b, may be additionally installed in the server 30b from an external storage medium such as a USB flash drive, or may be additionally installed in the server 30b from the network 11.

The storage unit 34 stores user information 34c. The user information 34c includes various information for each user, such as user identification information and user password.

The storage unit 34 can store a plurality of pieces of print data 34d. The storage unit 34 stores the print data 34d each associated with the user identification information.

The storage unit 34 can store a plurality of pieces of printing image data 34e as printing raster image data. The printing image data 34e is a printable file that does not cause the print apparatus to execute the RIP process, such as a printer command language mobile (PCLm) file, a printer working group (PWG) raster file, and a universal raster format (URF) file. The storage unit 34 stores the printing image data 34e each associated with the corresponding print data 34d.

The storage unit 34 can store a plurality of pieces of displaying image data 34f as displaying raster image data. The displaying image data 34f is a file previewable at the PC and the print apparatus, such as a portable network graphics (PNG) file. The displaying image data 34f includes original data and thumbnail data. The original data is original image data generated such that the RIP module 34b executes the RIP process based on the print data 34d. The thumbnail data is data having a reduced thumbnail data size in a reduced image size compared with its original image. The storage unit 34 stores the displaying image data 34f each associated with the corresponding print data 34d. When the printing image data 34e is used as the original data, the displaying image data 34f may include only the thumbnail data among the original data and the thumbnail data.

The storage unit 34 stores an image-log 34g. The image-log 34g includes the displaying image data 34f of the job data obtained by the MFP 40b. The image-log 34g is information that stores a printing log including the user, time, and contents of the image. The image-log 34g may include only any one of the original data and the thumbnail data of the displaying image data 34f.

The control unit 35, for example, includes a CPU, a ROM, which stores programs and various data, and a RAM, which is used as a work area of the CPU. The CPU executes programs stored in the ROM or the storage unit 34.

The control unit 35 executes the server program 34ax stored in the storage unit 34 to function as a data generating unit 35a and a data transmitter 35b. The data generating unit 35a generates data. The data transmitter 35b transmits the data.

Figure 40:
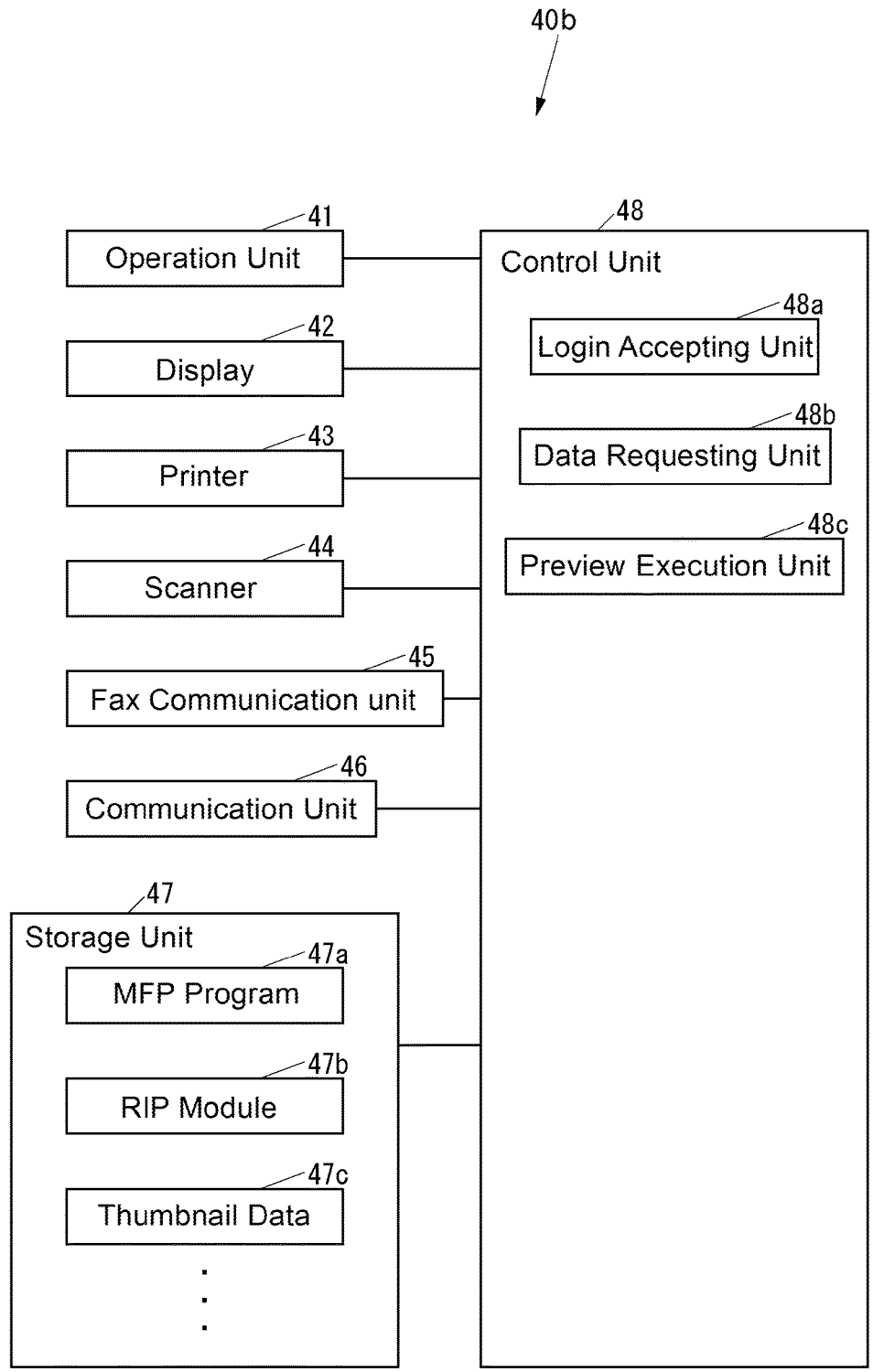
FIG. 40 illustrates an MFP according to the fourth embodiment.

FIG. 40 illustrates the MFP 40b.

As illustrated in FIG. 40, the MFP 40b includes an operation unit 41, a display 42, a printer 43, a scanner 44, a fax communication unit 45, a communication unit 46, a storage unit 47, and a control unit 48. The operation unit 41 is an input device such as a button where various operations by the user are input. The display 42 is a display device such as an LCD that displays various information. The printer 43 is a print device that prints on a recording medium such as a paper sheet. The scanner 44 is a reading device that reads image data from an original document. The fax communication unit 45 is a fax device that executes fax communication via a communication line such as a dial-up line with an external facsimile device (not illustrated). The communication unit 46 is a network communication device that communicates with an external device via the network 11 (see FIG. 37). The storage unit 47 is a storage device, such as a semiconductor memory and an HDD, that stores various data. The control unit 48 controls the entire MFP 40b.

The storage unit 47 stores an MFP program 47a and a RIP module 47b. The MFP program 47a controls an operation of the MFP 40b. The RIP module 47b executes the RIP process based on the print data to generate raster image data. The MFP program 47a and the RIP module 47b each may be installed in the MFP 40b at production stage of the MFP 40b, may be additionally installed in the MFP 40b from an external storage medium such as a USB flash drive, or may be additionally installed in the MFP 40b from the network 11.

The storage unit 47 can store a plurality of pieces of thumbnail data 47c transmitted from the server 30b (see FIG. 37).

The control unit 48, for example, includes a CPU, a ROM, which stores programs and various data, and a RAM, which is used as a work area of the CPU. The CPU executes programs stored in the ROM or the storage unit 47.

The control unit 48 executes the MFP program 47a stored in the storage unit 47 to function as a login accepting unit 48a, a data requesting unit 48b, and a preview execution unit 48c. The login accepting unit 48a accepts a login of the user. The data requesting unit 48b requests the data for outputting the image which preview has been executed by the preview execution unit 48c. The preview execution unit 48c executes the preview of the output image.

The following describes an operation of the image output system 10b.

First, a description will be given of the operation of the image output system 10b when the user logs in the server 30b from the user terminal 20b.

Figure 41:
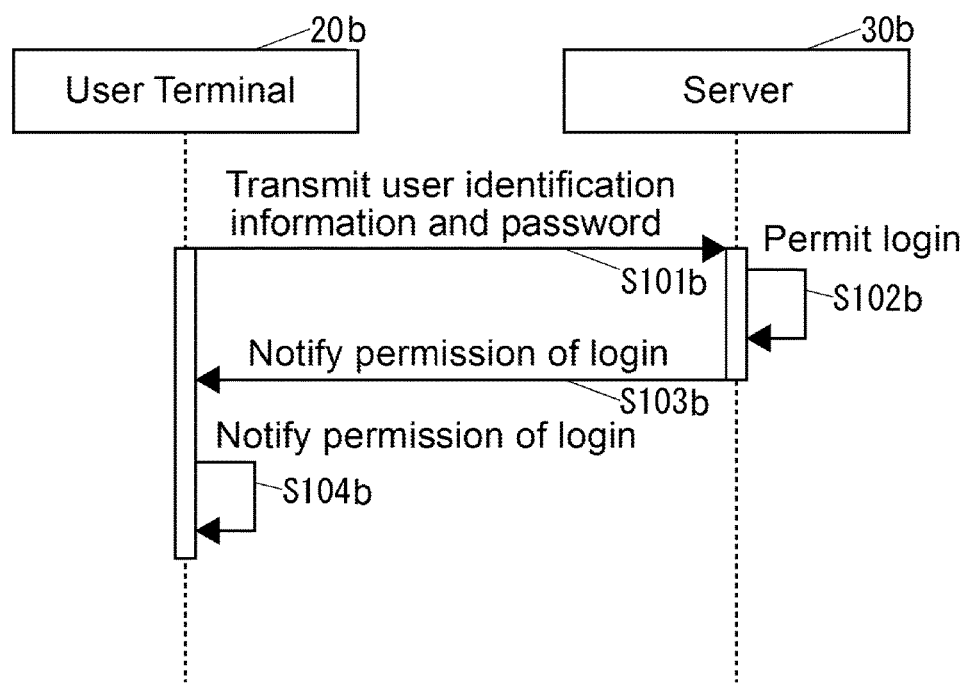
FIG. 41 illustrates an operation of the image output system according to the fourth embodiment when the user logs in the server from the user terminal.

FIG. 41 illustrates the operation of the image output system 10b when the user logs in the server 30b from the user terminal 20b.

The user can log in the server 30b via the operation unit 21 of the user terminal 20b.

As illustrated in FIG. 41, after a login instruction is input via the operation unit 21, the login accepting unit 25ax of the user terminal 20b transmits a combination of user identification information and password input via the operation unit 21 to the server 30 (Step S101b).

Then, when the combination of the user identification information and password transmitted from the user terminal 20b is included in the user information 34c, the control unit 35 of the server 30b permits the user to log in (Step S102b) to notify the user terminal 20b of this (Step S103b).

After the server 30b notifies the login accepting unit 25ax of the user terminal 20b that the user login has been permitted, the login accepting unit 25ax notifies the user that the user login has been permitted via the display 22 (Step S104b) to terminate the operation illustrated in FIG. 41.

The following describes an operation of the user terminal 20b when executing the preview based on the print data.

The user can instruct the user terminal 20b via the operation unit 21 of the user terminal 20b to execute the preview based on the print data to be transmitted by the user terminal 20b. The instruction of executing the preview causes the control unit 25 of the user terminal 20b to execute the printer driver 24a to execute the operation illustrated in FIG. 42.

Figure 42:
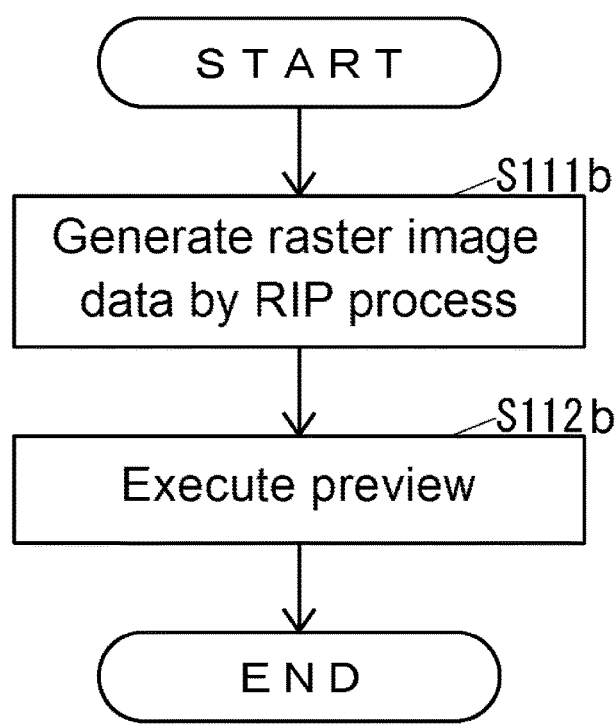
FIG. 42 illustrates an operation of the user terminal according to the fourth embodiment when executing a preview based on print data.

FIG. 42 illustrates the operation of the user terminal 20b when executing the preview based on the print data.

As illustrated in FIG. 42, after the RIP module 24b executes the RIP process based on the print data to generate the raster image data such as a PNG file (Step S111b), the preview execution unit 25bx of the user terminal 20b executes the preview on the display 22 based on the generated raster image data (Step S112b) to terminate the operation illustrated in FIG. 42.

The following describes the operation of the user terminal 20b when transmitting the print data.

After the user determines the transmission of the print data by the user terminal 20b by, for example, confirming the preview executed on the display 22, the user can instruct the user terminal 20b via the operation unit 21 of the user terminal 20b to transmit the print data by the user terminal 20b itself. After the control unit 25 of the user terminal 20b is instructed to transmit the print data, the control unit 25 executes the printer driver 24a to execute the operation illustrated in FIG. 43.

Figure 43:
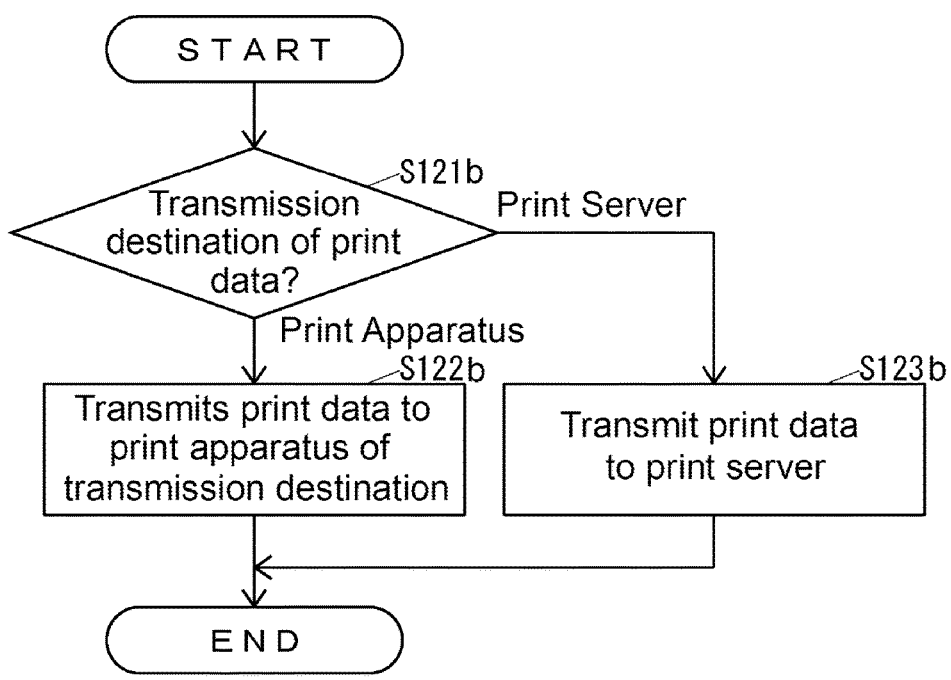
FIG. 43 illustrates an operation of the user terminal according to the fourth embodiment when transmitting the print data.

FIG. 43 illustrates the operation of the user terminal 20b when transmitting the print data.

As illustrated in FIG. 43, the control unit 25 determines a transmission destination of the print data (Step S121b). Here, the user can set the transmission destination of the print data in advance in the printer driver 24a via the operation unit 21. As the transmission destination of the print data, a specific print apparatus such as the MFP 40b, and the server 30b are settable.

When the control unit 25 determines at Step S121b that the set transmission destination is the print apparatus, the control unit 25 transmits the print data via the communication unit 23 to the print apparatus set as the transmission destination (Step S122b) to terminate the operation illustrated in FIG. 43.

When the control unit 25 determines at Step S121b that the set transmission destination is the server 30b, the control unit 25 transmits the print data to the server 30b via the communication unit 23 (Step S123b) to terminate the operation illustrated in FIG. 43. Here, when transmitting the print data to the server 30b, the control unit 25 transmits the identification information of the logged-in user in addition to the print data.

The following describes the operation of the MFP 40b when printing based on the print data directly received from the user terminal 20b.

Figure 44:
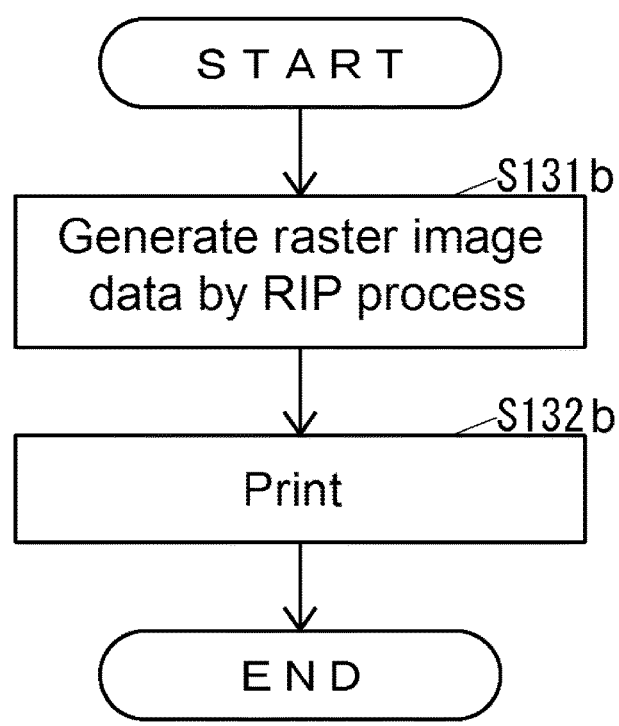
FIG. 44 illustrates an operation of the MFP according to the fourth embodiment when printing based on the print data directly received from the user terminal.

The control unit 48 of the MFP 40b receives the print data as the job data from the user terminal 20b to execute the operation illustrated in FIG. 44.

FIG. 44 illustrates the operation of the MFP 40b when printing based on the print data directly received from the user terminal 20b.

As illustrated in FIG. 44, after the RIP module 47b executes the RIP process based on the received print data to generate the raster image data such as a PCLm file, a PWG raster file, and a URF file (Step S131b), the control unit 48 causes the printer 43 to print based on the generated raster image data (Step S132b) to terminate the operation illustrated in FIG. 44.

The following describes the operation of the server 30b when receiving the print data from the user terminal 20b.

Figure 45:
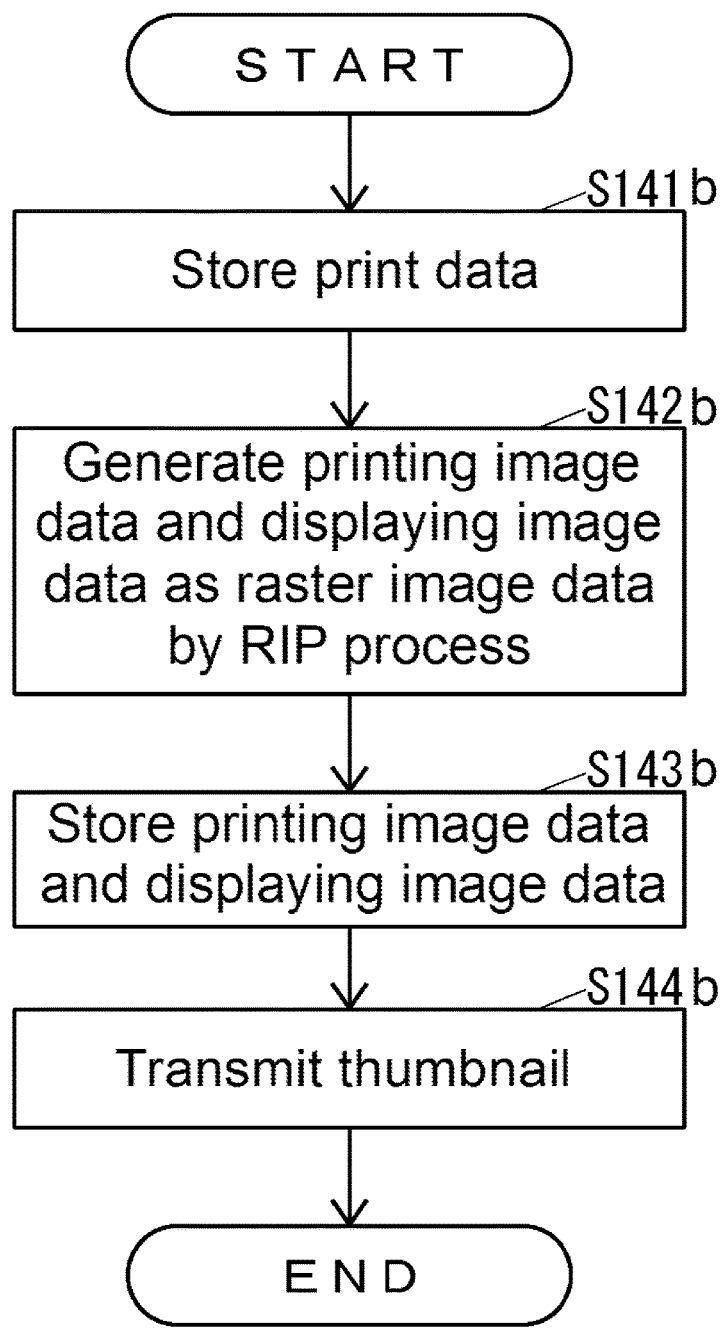
FIG. 45 illustrates an operation of the server according to the fourth embodiment when receiving the print data from the user terminal.

The control unit 35 of the server 30b receives the print data from the user terminal 20b to execute the operation illustrated in FIG. 45.

FIG. 45 illustrates the operation of the server 30b when receiving the print data from the user terminal 20b.

As illustrated in FIG. 45, the data generating unit 35a of the control unit 35 stores the received print data as the print data 34d in the storage unit 34 (Step S141b). Here, the data generating unit 35a stores the print data 34d being associated with the user identification information added to the received print data.

Next, after the RIP module 34b executes the RIP process based on the print data 34d stored in the storage unit 34 at Step S141b to generate printing image data such as a PCLm file, a PWG raster file, and a URF file, and displaying image data such as a PNG file, as the raster image data (Step S142b), the data generating unit 35a stores the generated printing image data and displaying image data as the printing image data 34e and the displaying image data 34f respectively in the storage unit 34 (Step S143b). Here, the data generating unit 35a stores the printing image data 34e and the displaying image data 34f being associated with the print data 34d stored at Step S141b.

Next, the data transmitter 35b transmits the thumbnail data in the displaying image data 34f stored at Step S143b being associated with the identification information of the user associated with the print data 34d where this displaying image data 34f is associated, to an external electronic device (Step S144b) to terminate the operation illustrated in FIG. 45. Here, the transmission destination of the thumbnail data may be all the electronic devices in the LAN where the server 30b belongs, or may be the transmission destination designated in the print data that the server 30b has received from the user terminal 20b. The user can designate the transmission destination of the thumbnail data when generating the print data at the user terminal 20b. When the external electronic device is the MFP 40b, the MFP 40b stores the thumbnail data transmitted at Step S144b as the thumbnail data 47c in the storage unit 47. Similarly, when the external electronic device is the user terminal, the user terminal stores the thumbnail data transmitted at Step S144b in the storage unit. When the thumbnail data is stored in the external electronic device, the identification information of the user associated with the thumbnail data transmitted from the server 30b is also associated with the thumbnail data in the external electronic device. This association is ensured such that the thumbnail data is entered in a folder associated with the user identification information.

The following describes the operation of the image output system 10b when the user logs in the server 30b from the MFP 40b.

Figure 46:
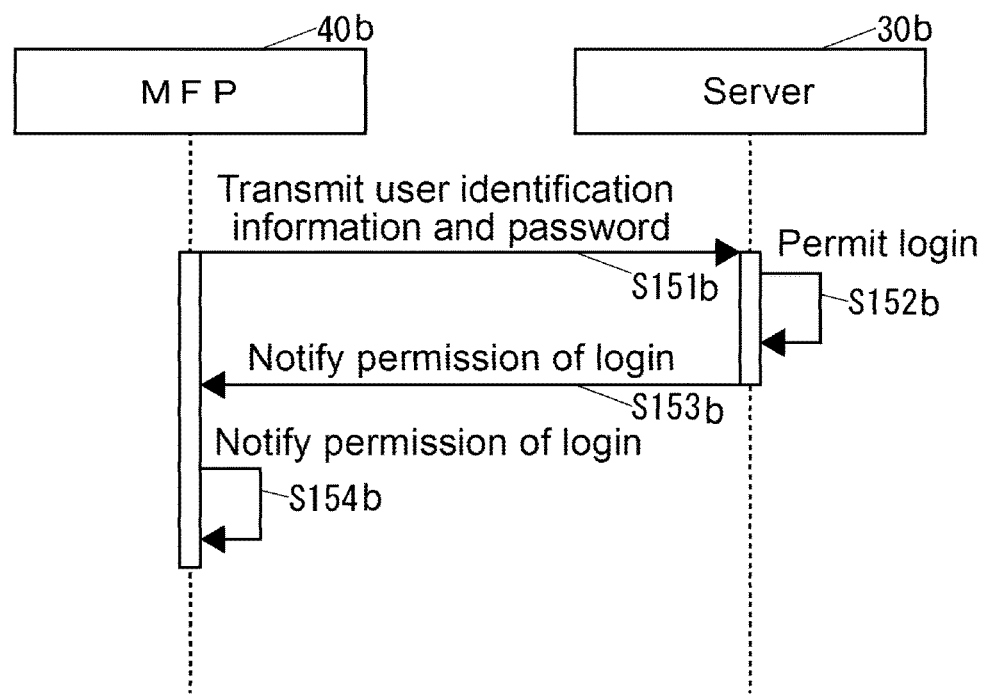
FIG. 46 illustrates an operation of the image output system according to the fourth embodiment when the user logs in the server from the MFP.

FIG. 46 illustrates the operation of the image output system 10b when the user logs in the server 30b from the MFP 40b.

The user can log in the server 30b via the operation unit 41 of the MFP 40b.

As illustrated in FIG. 46, after the login instruction is input to the login accepting unit 48a of the MFP 40b via the operation unit 41, the login accepting unit 48a transmits the combination of the user identification information and password input via the operation unit 41 to the server 30b (Step S151b).

Then, when the combination of the user identification information and password transmitted from the MFP 40b is included in the user information 34c, the control unit 35 of the server 30b permits the user login (Step S152b) to notify the MFP 40b of this (Step S153b).

After the server 30b notifies the login accepting unit 48a of the MFP 40b that the user login has been permitted, the login accepting unit 48a notifies the user via the display 42 that the user login has been permitted (Step S154b) to terminate the operation illustrated in FIG. 46.

The following describes the operation of the image output system 10b when executing the preview of the print job for a pull print at the MFP 40b.

Figure 47:
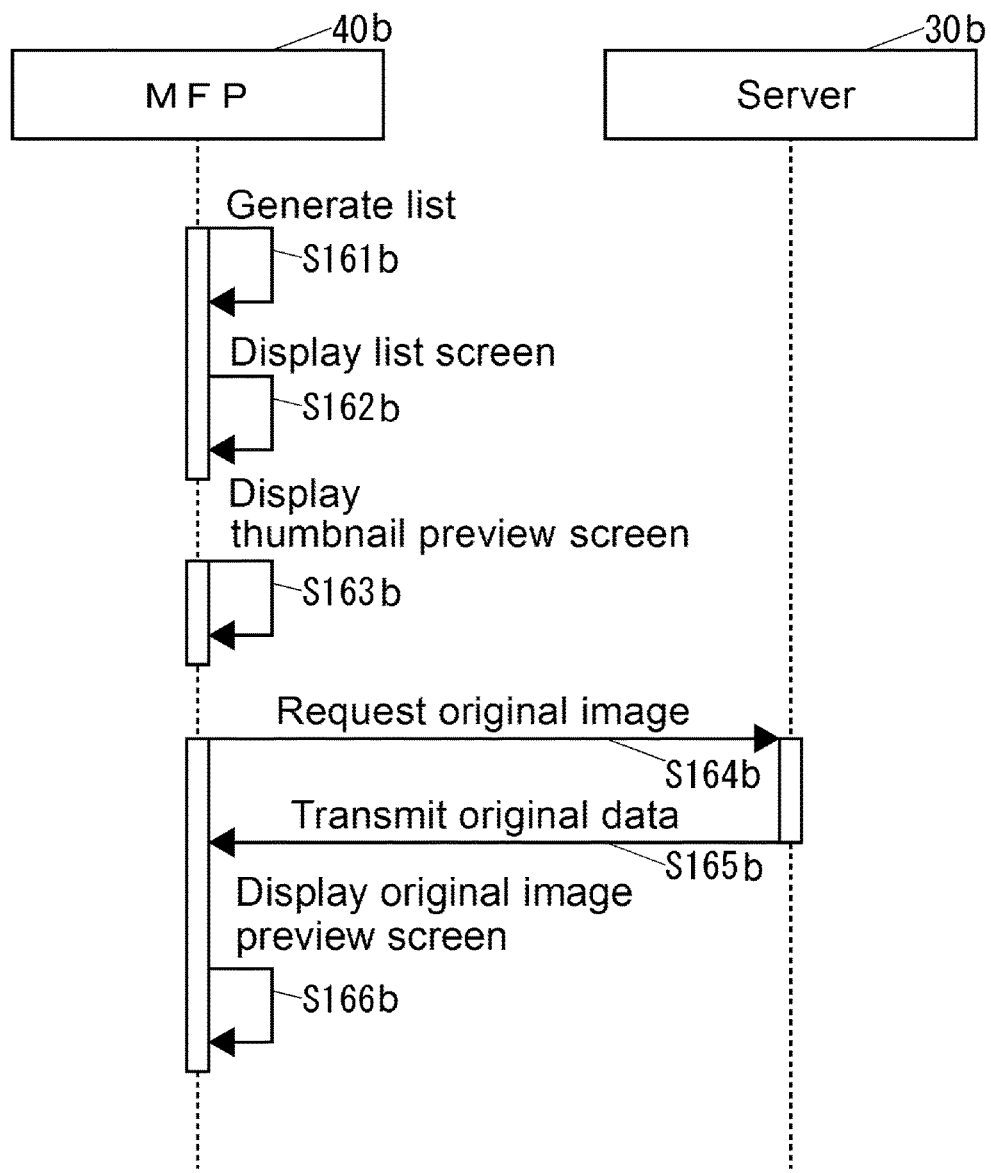
FIG. 47 illustrates an operation of the image output system according to the fourth embodiment when executing the preview of a print job for a pull print at the MFP.

FIG. 47 illustrates the operation of the image output system 10b when executing the preview of the print job for the pull print at the MFP 40b.

The user can instruct the MFP 40b via the operation unit 41 of the MFP 40b to confirm the print job for the pull print.

As illustrated in FIG. 47, after the confirmation instruction of the print job for the pull print is input via the operation unit 41, the preview execution unit 48c of the MFP 40b generates a list of the print job for the pull print of the logged-in user, that is, a list of the thumbnail data 47c associated with the identification information of the logged-in user (Step S161b) to display a list screen that displays this list on the display 42 (Step S162b).

Figure 48:
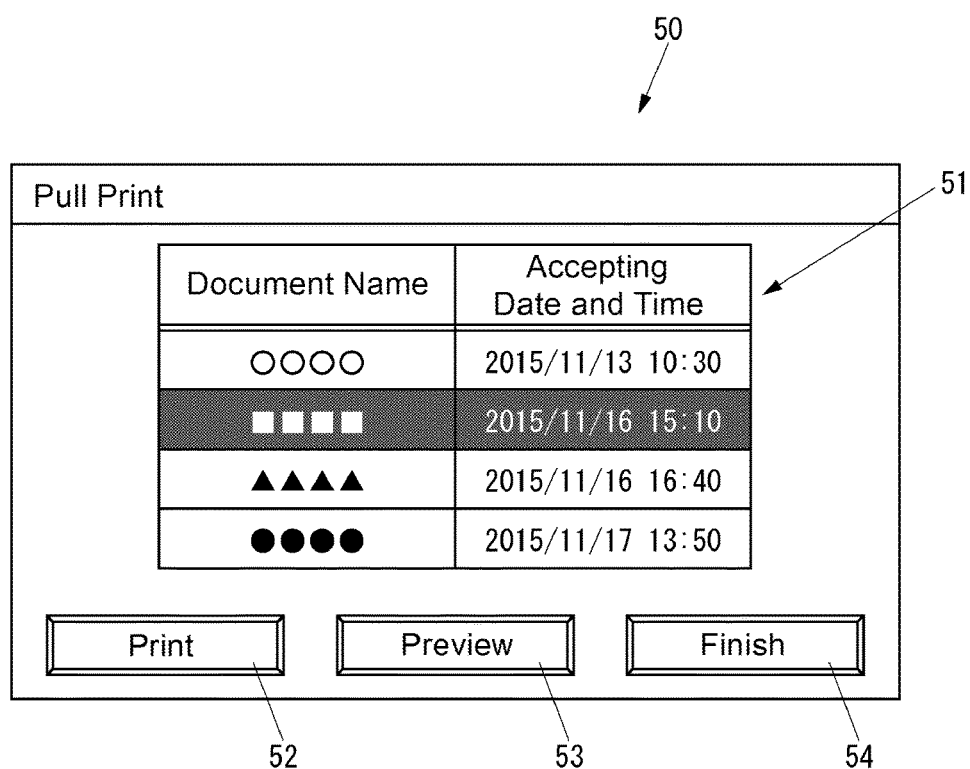
FIG. 48 illustrates an exemplary list screen displayed in an operation according to the fourth embodiment.

FIG. 48 illustrates an exemplary list screen 50 displayed at Step S162b.

The list screen 50 illustrated in FIG. 48 includes a list display area 51, a print button 52, a preview button 53, and a finish button 54. The list display area 51 displays the list of the print job for the pull print of the logged-in user. The print button 52 is a button for instructing the execution of the print job selected on the list display area 51. The preview button 53 is a button for instructing the execution of the preview of the print job selected on the list display area 51. The finish button 54 is a button for terminating the operation illustrated in FIG. 47.

The list display area 51 can display all the print jobs for the pull print of the logged-in user. When all the print jobs for the pull print of the logged-in user cannot be simultaneously displayed on the list display area 51, they can be displayed by scrolling. On the list display area 51, any one print job or the plurality of print jobs can be selected. The selected print job is displayed on the list display area 51 in a state where its color is inverted.

The print button 52 and the preview button 53 are operable only when any print job is selected on the list display area 51.

After the user presses the preview button 53 via the operation unit 41 of the MFP 40b, the preview execution unit 48c of the MFP 40b, as illustrated in FIG. 47, displays a thumbnail preview screen that displays the thumbnail based on the thumbnail data 47c of the print job selected on the list display area 51 when the preview button 53 is pressed, on the display 42 (Step S163b).

Figure 49:
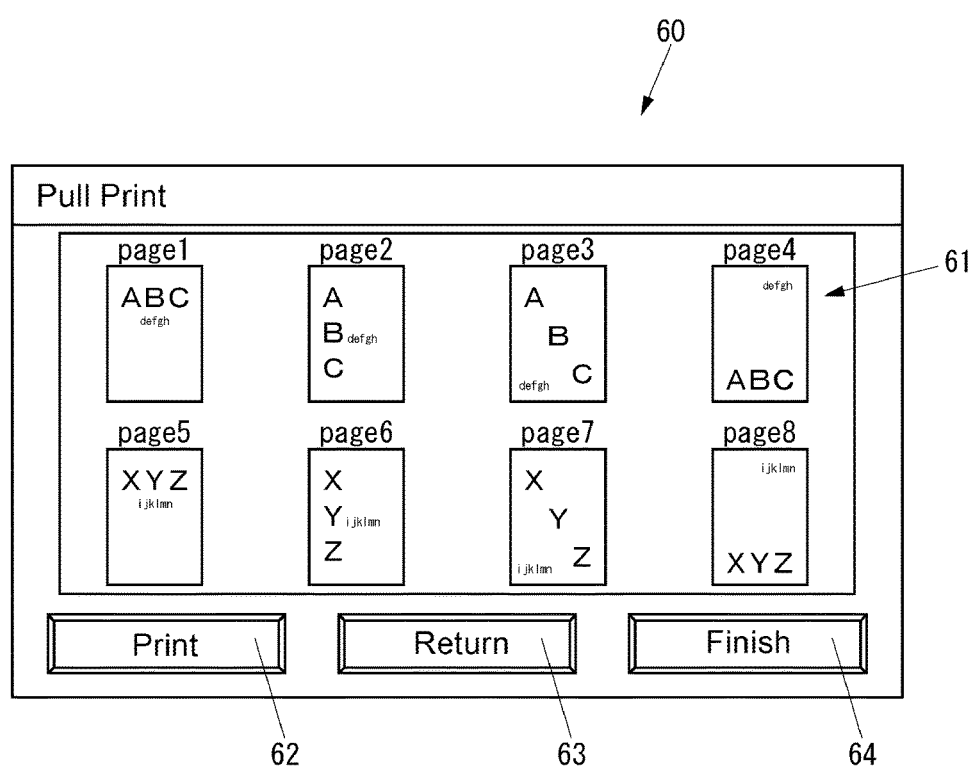
FIG. 49 illustrates an exemplary thumbnail preview screen displayed in the operation according to the fourth embodiment.

FIG. 49 illustrates an exemplary thumbnail preview screen 60 displayed at Step S163b.

The thumbnail preview screen 60 illustrated in FIG. 49 includes a thumbnail area 61, a print button 62, a return button 63, and a finish button 64. The thumbnail area 61 displays the thumbnails of respective pages of a target print job. The print button 62 is a button for instructing the execution of the target print job. The return button 63 is a button for returning to the list screen 50 (see FIG. 48). The finish button 64 is a button for terminating the operation illustrated in FIG. 47.

The thumbnail area 61 can display the thumbnails of all the pages of the target print job. When the thumbnails of all the pages of the target print job cannot be simultaneously displayed on the thumbnail area 61, they can be displayed by scrolling.

After the user selects any thumbnail on the thumbnail area 61 via the operation unit 41 of the MFP 40b, the preview execution unit 48c of the MFP 40b, as illustrated in FIG. 47, requests the original image of the selected thumbnail from the server 30b (Step S164b).

After receiving the request at Step S164b, the data transmitter 35b of the server 30b transmits the original data of the original image requested at Step S164b in the displaying image data 34f to the MFP 40b (Step S165b).

After receiving the original data from the server 30b, the preview execution unit 48c of the MFP 40b displays an original image preview screen that displays the original image based on the received original data on the display 42 (Step S166*b*).

Figure 50:
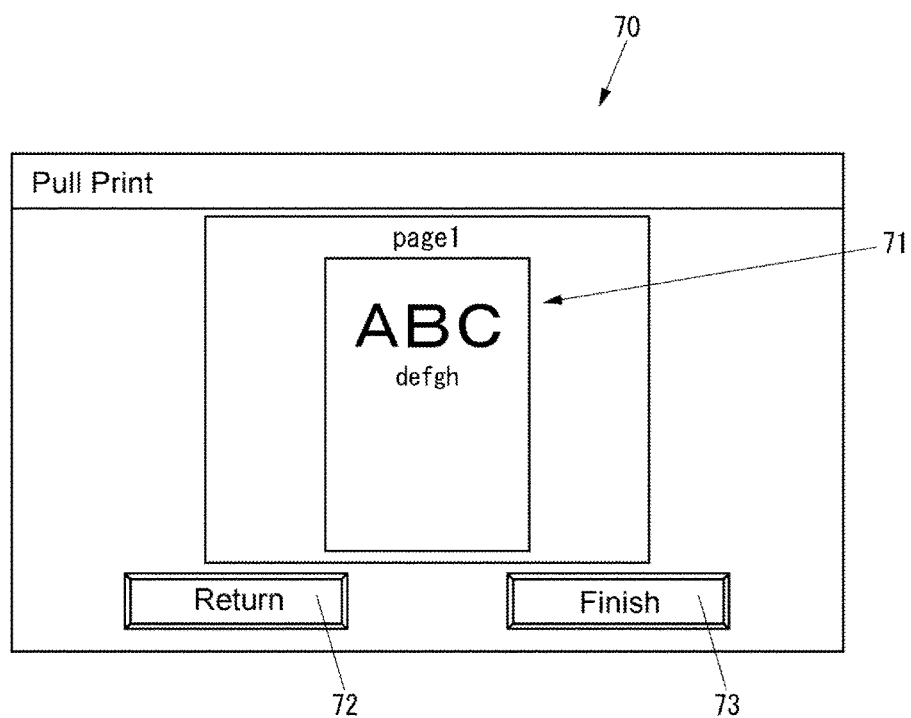
FIG. 50 illustrates an exemplary original image preview screen displayed in the operation according to the fourth embodiment.

FIG. 50 illustrates an exemplary original image preview screen 70 displayed at Step S166*b*.

The original image preview screen 70 illustrated in FIG. 50 includes a preview area 71, a return button 72, and a finish button 73. The preview area 71 displays the original image. The return button 72 is a button for returning to the thumbnail preview screen 60 (see FIG. 49). The finish button 73 is a button for terminating the operation illustrated in FIG. 47.

The image displayed on the preview area 71 can be enlarged corresponding to the operation via the operation unit 41 to be displayed.

In the above, the preview execution unit 48*c* requests the original image page by page. However, the preview execution unit 48*c* may request the original images of all the pages at once.

The following describes the operation of the image output system 10*b* when executing the print job for the pull print at the MFP 40*b* if the RIP module 34*b* of the server 30*b* and the RIP module 47*b* of the MFP 40*b* are modules having identical content, that is, if the RIP module 34*b* of the server 30*b* and the RIP module 47*b* of the MFP 40*b* execute the identical RIP process.

The user can press the print button 52 (see FIG. 48) of the list screen 50 (see FIG. 48), or the print button 62 (see FIG. 49) of the thumbnail preview screen 60 (see FIG. 49) via the operation unit 41 of the MFP 40*b* to instruct the MFP 40*b* to execute the target print job. Here, the target print job is the print job selected on the list display area 51 (see FIG. 48) when the print button 52 is pressed, or the target print job of the thumbnail preview screen 60.

Figure 51:
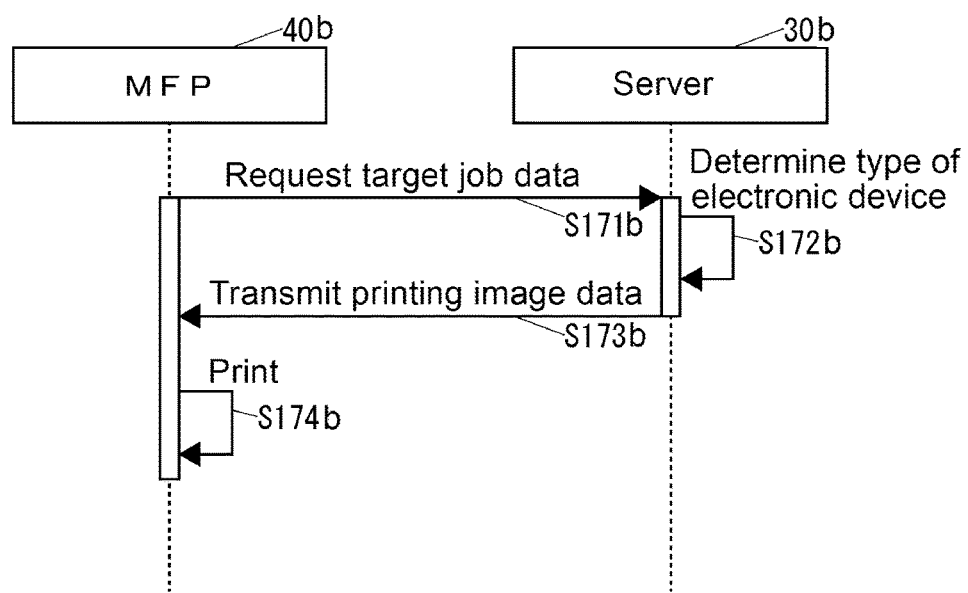
FIG. 51 illustrates an operation of the image output system according to the fourth embodiment when executing the print job for the pull print at the MFP if a RIP module of the server and a RIP module of the MFP according to the fourth embodiment are modules having identical contents.

FIG. 51 illustrates the operation of the image output system 10*b* when executing the print job for the pull print at the MFP 40*b* if the RIP module 34*b* of the server 30*b* and the RIP module 47*b* of the MFP 40*b* are the modules having identical content.

After the user presses the print button 52 of the list screen 50, or the print button 62 of the thumbnail preview screen 60 via the operation unit 41 of the MFP 40*b*, the data requesting unit 48*b* of the MFP 40*b*, as illustrated in FIG. 51, requests the job data of the target print job from the server 30*b* (Step S171*b*).

Next, the data transmitter 35*b* of the server 30*b* determines a type of the MFP 40*b* that has requested the job data at Step S171*b* (Step S172*b*). Here, the data transmitter 35*b* queries the MFP 40*b* that has requested the job data at Step S171*b* to determine. The data transmitter 35*b* can determine whether or not the MFP 40*b* is an electronic device that includes the RIP module which content is identical to that of the RIP module 34*b* of the server 30*b*, from information such as a model name of the MFP 40*b*.

When the data transmitter 35*b* determines that the MFP 40*b* is the electronic device that includes the RIP module which content is identical to that of the RIP module 34*b* of the server 30*b* at Step S172*b*, the data transmitter 35*b* transmits the printing image data 34*e* as the requested job data to the MFP 40*b* (Step S173*b*).

After receiving the printing image data from the server 30*b*, the control unit 48 of the MFP 40*b* causes the printer 43 to print based on the received printing image data (Step S174*b*) to terminate the operation illustrated in FIG. 51.

The following describes the operation of the image output system 10*b* when executing the print job for the pull print at the MFP 40*b* if the RIP module 34*b* of the server 30*b* and the RIP module 47*b* of the MFP 40*b* are modules having different contents one another, that is, if the RIP module 34*b* of the server 30*b* and the RIP module 47*b* of the MFP 40*b* execute different RIP processes.

Figure 52:
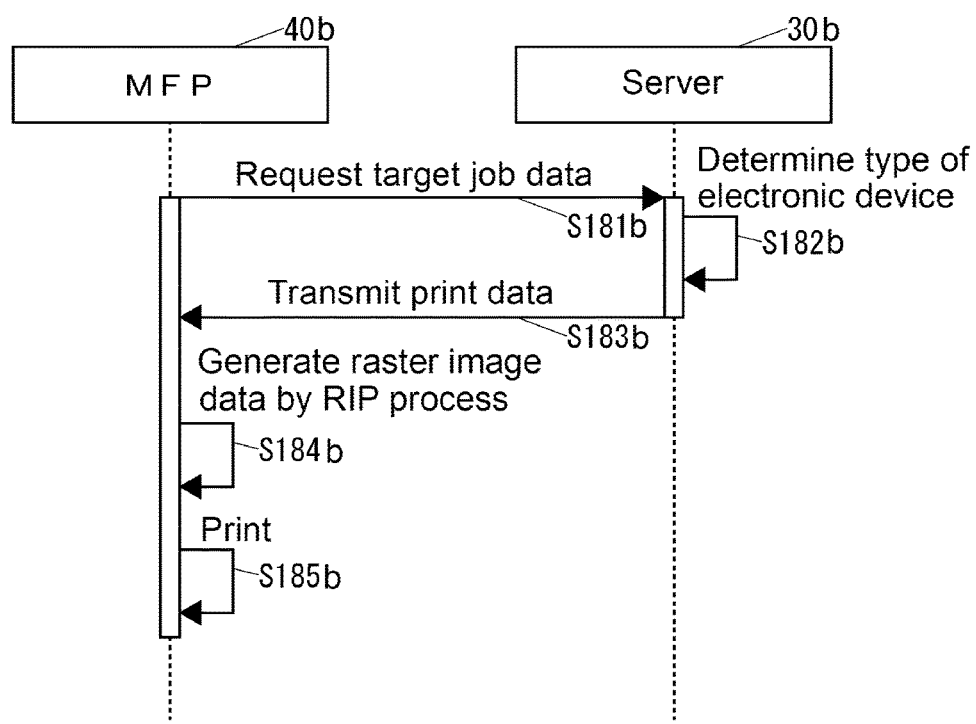
FIG. 52 illustrates an operation of the image output system according to the fourth embodiment when executing the print job for the pull print at the MFP if the RIP module of the server and the RIP module of the MFP according to the fourth embodiment are modules having mutually different contents.

FIG. 52 illustrates the operation of the image output system 10*b* when executing the print job for the pull print at the MFP 40*b* if the RIP module 34*b* of the server 30*b* and the RIP module 47*b* of the MFP 40*b* are the modules having different contents one another.

After the user presses the print button 52 of the list screen 50, or the print button 62 of the thumbnail preview screen 60 via the operation unit 41 of the MFP 40*b*, the data requesting unit 48*b* of the MFP 40*b*, as illustrated in FIG. 52, requests the job data of the target print job from the server 30*b* (Step S181*b*).

Next, the data transmitter 35*b* of the server 30*b* determines the type of the MFP 40*b* that has requested the job data at Step S181*b* (Step S182*b*). Here, the data transmitter 35*b* queries the MFP 40*b* that has requested the job data at Step S181*b* to determine. The data transmitter 35*b* can determine whether or not the MFP 40*b* is an electronic device that includes the RIP module having the content identical to that of the RIP module 34*b* of the server 30*b*, from information such as the model name of the MFP 40*b*.

When the data transmitter 35*b* determines that the MFP 40*b* is the electronic device that does not include the RIP module having the content identical to that of the RIP module 34*b* of the server 30*b* at Step S182*b*, the data transmitter 35*b* transmits the print data 34*d* as the requested job data to the MFP 40*b* (Step S183*b*).

After receiving the print data from the server 30*b*, the RIP module 47*b* executes the RIP process based on the received print data to generate the raster image data such as a PCLm file, a PWG raster file, and a URF file (Step S184*b*). Then, the control unit 48 of the MFP 40*b* causes the printer 43 to print based on the generated raster image data (Step S185*b*) to terminate the operation illustrated in FIG. 52.

The following describes the operation of the user terminal when executing the preview of the print job for the pull print at a user terminal.

Figure 53:
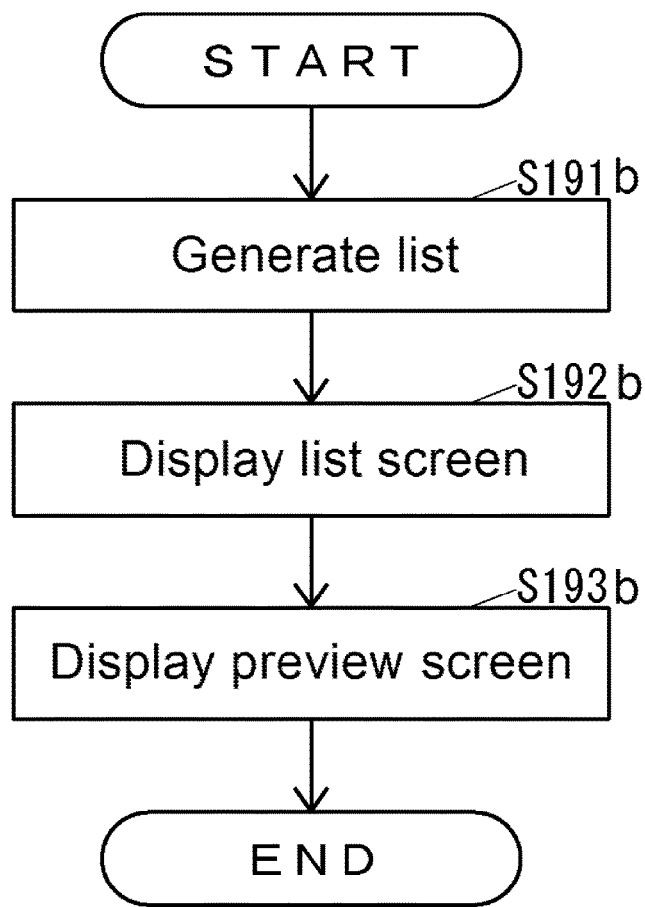
FIG. 53 illustrates an operation of the user terminal according to the fourth embodiment when executing the preview of the print job for the pull print at the user terminal.

FIG. 53 illustrates the operation of the user terminal when executing the preview of the print job for the pull print at the user terminal.

The user can instruct the user terminal to confirm the print job for the pull print via an operation unit of the user terminal.

As illustrated in FIG. 53, after the confirmation instruction of the print job for the pull print is input via the operation unit, a preview execution unit of the user terminal generates a list of the print job for the pull print of the logged-in user, that is, a list of the thumbnail data associated with the identification information of the logged-in user in the thumbnail data stored in a storage unit (Step S191*b*) to display a list screen that displays this list on the display 42 (Step S192*b*).

Figure 54:
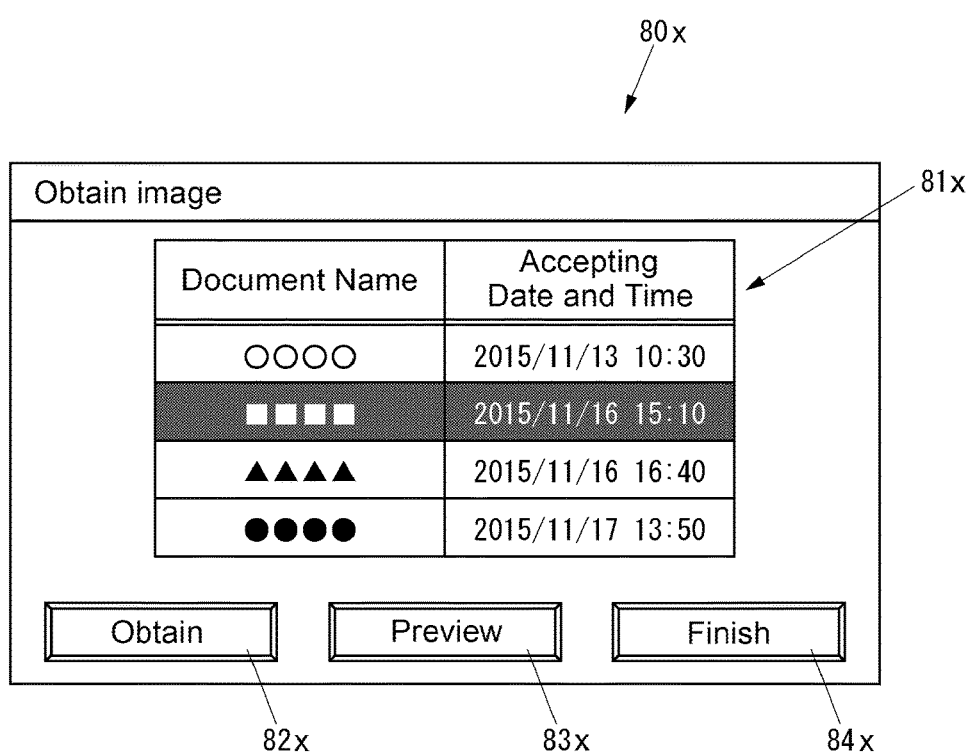
FIG. 54 illustrates an exemplary list screen displayed in the operation according to the fourth embodiment.

FIG. 54 illustrates an exemplary list screen 80*x* displayed at Step S192*b*.

The list screen 80*x* illustrated in FIG. 54 includes a list display area 81*x*, an obtain button 82*x*, a preview button 83*x*, and a finish button 84*x*. The list display area 81*x* displays the list of the print job for the pull print of the logged-in user. The obtain button 82*x* is a button for obtaining an original image of the print job selected on the list display area 81*x*. The preview button 83*x* is a button for instructing the execution of the preview of the print job selected on the list display area 81*x*. The finish button 84*x* is a button for terminating the operation illustrated in FIG. 53.

The list display area 81*x* can display all the print jobs for the pull print of the logged-in user. When all the print jobs for the pull print of the logged-in user cannot be simultaneously displayed on the list display area 81*x*, they can be displayed by scrolling. On the list display area 81*x*, any one print job or the plurality of print jobs can be selected. The selected print job is displayed on the list display area 81*x* in a state where its color is inverted.

The obtain button 82*x* and the preview button 83*x* are operable only when any print job is selected on the list display area 81*x*.

After the user presses the preview button 83*x* via the operation unit of the user terminal, the preview execution unit of the user terminal, as illustrated in FIG. 53, displays a preview screen that displays the thumbnail based on the thumbnail data of the print job selected on the list display area 81*x* when the preview button 83*x* is pressed on the display 42 (Step S193*b*).

Figure 55:
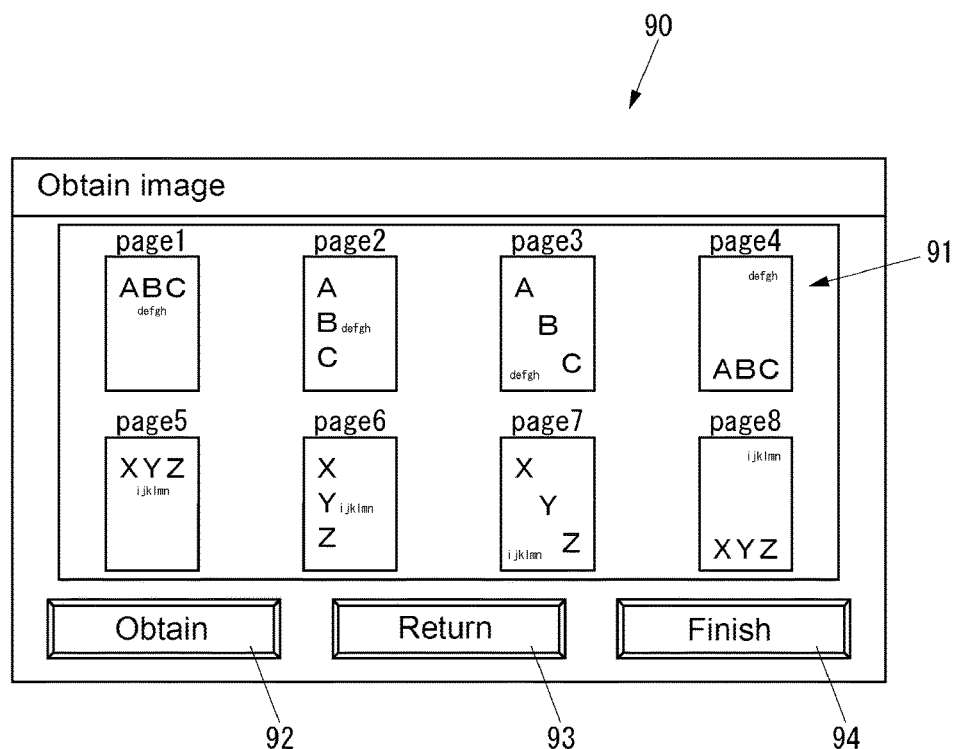
FIG. 55 illustrates an exemplary preview screen displayed in the operation according to the fourth embodiment.

FIG. 55 illustrates an exemplary preview screen 90 displayed at Step S193*b*.

The preview screen 90 illustrated in FIG. 55 includes a thumbnail area 91, an obtain button 92, a return button 93, and a finish button 94. The thumbnail area 91 displays the thumbnails of respective pages of a target print job. The obtain button 92 is a button for obtaining the original image of the target print job. The return button 93 is a button for returning to the list screen 80*x* (see FIG. 54). The finish button 94 is a button for terminating the operation illustrated in FIG. 53.

The thumbnail area 91 can display the thumbnails of all the pages of the target print job. When the thumbnails of all the pages of the target print job cannot be simultaneously displayed on the thumbnail area 91, they can be displayed by scrolling.

The following describes the operation of the image output system 10*b* when obtaining the original image of the print job for the pull print at the user terminal.

The user can press the obtain button 82*x* (see FIG. 54) of the list screen 80*x* (see FIG. 54), or the obtain button 92 (see FIG. 55) of the preview screen 90 (see FIG. 55) via the operation unit of the user terminal to instruct the user terminal to obtain the original image of the target print job. Here, the target print job is the print job selected on the list display area 81*x* (see FIG. 54) when the obtain button 82*x* is pressed, or the target print job of the preview screen 90.

Figure 56:
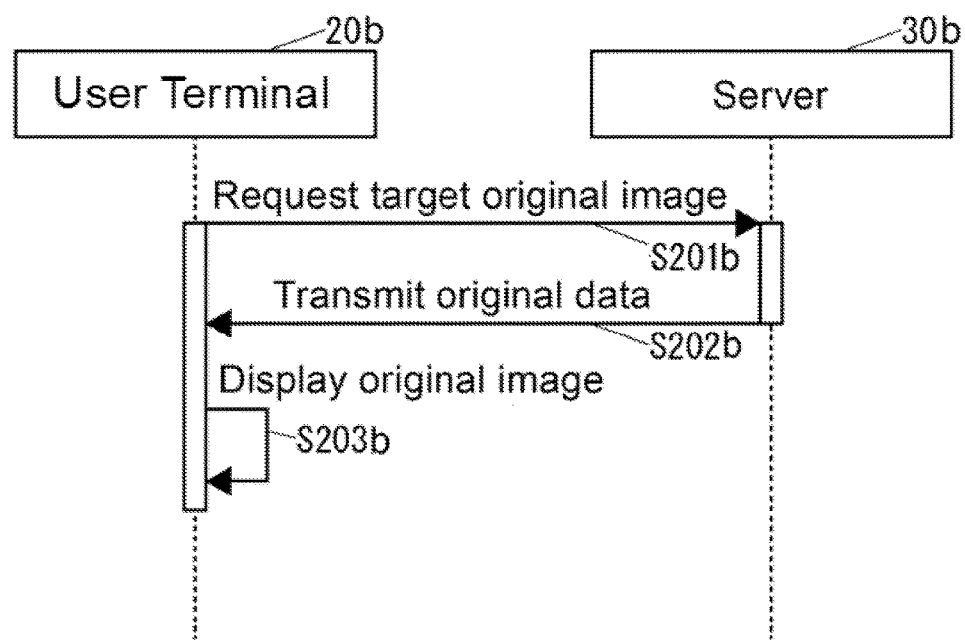
FIG. 56 illustrates an operation of the image output system according to the fourth embodiment when obtaining an original image of the print job for the pull print at the user terminal.

FIG. 56 illustrates the operation of the image output system 10*b* when obtaining the original image of the print job for the pull print at the user terminal.

After the user presses the obtain button 82*x* of the list screen 80*x*, or the obtain button 92 of the preview screen 90 via the operation unit of the user terminal, a data requesting unit of the user terminal, as illustrated in FIG. 56, requests the original image of the target print job from the server 30*b* (Step S201*b*).

Next, the data transmitter 35*b* of the server 30*b* transmits original data of the original image requested at Step S201*b* to the user terminal (Step S202*b*).

After receiving the original data from the server 30*b*, the control unit of the user terminal displays the original image based on the received original data on the display (Step S203*b*) to terminate the operation illustrated in FIG. 56.

The following describes the operation of the server 30*b* when updating the image-log 34*g*.

After the server 30*b* transmits the job data to the MFP 40*b* at Step S173*b* in the operation illustrated in FIG. 51 or Step S183*b* in the operation illustrated in FIG. 52, the control unit 35 of the server 30*b* adds a combination of the displaying image data 34*f* corresponding to this job data, the identification information of the user that has requested this job data, and the date and time when this job data is transmitted to the MFP 40*b*, as a log to the image-log 34*g*.

After the server 30*b* transmits the original data to the user terminal at Step S202*b* in the operation illustrated in FIG. 56, the control unit 35 of the server 30*b* adds a combination of the displaying image data 34*f* corresponding to this original data, the identification information of the user that has requested this original data, and the date and time when this original data is transmitted to the user terminal, as a log to the image-log 34*g*.

As described above, the image output system 10*b* generates the displaying image data as the raster image data based on the print data at the server 30*b* at Step S142*b* to execute the preview based on this displaying image data at the MFP 40*b* or the user terminal (Step S163*b*, Step S166*b*, or Step S193*b*). Accordingly, the image output system 10*b* can execute the preview at the MFP 40*b* or the user terminal when the image output system 10*b* downloads data for outputting the image from the server 30*b* to the MFP 40*b* or the user terminal to output the image at the MFP 40*b* or the user terminal. Accordingly, the user can confirm the preview to determine whether the operation that downloads the data for outputting the image from a server to an electronic device to output the image at the electronic device is executed or aborted.

Especially, the server 30*b* transmits the displaying image data to the MFP 40*b* and the user terminal even if the MFP 40*b* and the user terminal do not request (Step S144*b*). Accordingly, the image output system 10*b* can execute the preview at the MFP 40*b* and the user terminal without communication between the server 30*b*, and the MFP 40*b* or the user terminal, insofar as the MFP 40*b* and the user terminal have already received the displaying image data from the server 30*b*.

When the RIP process executed at the server 30*b* is identical to the RIP process executed at the MFP 40*b*, the image output system 10*b* ensures the execution of the accurate preview even if the image output system 10*b* downloads the print data from the server 30*b* to the MFP 40*b* to generate the raster image data based on this print data at the MFP 40*b* to print.

After the image output system 10*b* generates the printing image data as the raster image data not at the MFP 40*b*, but at the server 30*b* based on the print data at Step S142*b*, the image output system 10*b* prints at the MFP 40*b* based on this printing image data (Step S174*b*). Accordingly, it is not necessary to generate the raster image data at the MFP 40*b* based on the print data when executing the pull print, thus ensuring reduction of burden on the MFP 40*b*. Accordingly, the image output system 10*b* can complete the pull print at high speed.

The image output system 10*b* stores the printing log including the user, time, and contents of the image in the image-log 34*g*, thus ensuring improvement of security performance.

In the embodiment, when receiving the print data from outside, the server 30*b* executes the RIP process based on the print data received from outside to generate the printing image data 34*e* and the displaying image data 34*f*. However, the server 30*b* may generate the printing image data 34*e* until when the printing image data 34*e* is transmitted outside, and may generate the displaying image data 34*f* until when the displaying image data 34*f* is transmitted outside. For example, the server 30*b* may generate the printing image data 34e when receiving the request at Step S171b, and may generate the displaying image data 34f when receiving the request at Step S164b.

In the embodiment, when receiving the print data from outside, the server 30b executes the RIP process based on the print data received from outside. However, the server 30b may be configured whether or not to execute the RIP process based on the print data received from outside. For example, the server 30b may be configured to constantly execute the RIP process similar to the embodiment when receiving the print data from outside, may be configured to execute the RIP process when the burden of the RIP process execution is expected to be equal to or less than a specific degree, or may be configured not to execute the RIP process. When not executing the RIP process, the server 30b transmits the print data as the job data to the MFP 40b if the job data is requested from the MFP 40b.

The print apparatus of the disclosure is the MFP according to the embodiments. However, the print apparatus of the disclosure may be a print apparatus such as a printer-only machine, other than the MFP.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A pull print system comprising:
a terminal;
a print server; and
a print apparatus;
the terminal including
as a first storage device either a semiconductor memory or a hard disk drive (HDD), the first storage device including a printer driver program, and
a first central processing unit (CPU) that executes the printer driver program to function as a print-data generating unit and a print data transmitter, wherein
the print-data generating unit generates one or more pages of per-page print data that constitutes data for a print job, each of the one or more pages of per-page print data being described in a page description language including a first printer job language (PJL) command that indicates a job name of the print job, and a second PJL command that indicates that the print job can be divided on a per-page basis, and
the print data transmitter transmits to the print server user identification information in addition to the one or more pages of per-page print data generated by the print-data generating unit;
the print server including
as a second storage device either the semiconductor memory or the HDD, the second storage device including a print server program, and
a second CPU that executes the print server program to function as a data generating unit, and
a data transmitter that transmits the data, wherein
the data generating unit (i) stores in the second storage device the one or more pages of per-page print data in association with the user identification information from the terminal, (ii) performs a raster-image processor (RIP) process based on the one or more pages of per-page print data to generate displaying image data as raster image data that includes a portable network graphics file, and (iii) stores in the second storage device the displaying image data in association with the print data, the RIP process performed by the data generating unit being same as the RIP process performed by the print apparatus, and the displaying image data including thumbnail data;
the print apparatus including
a display,
as a third storage device either the semiconductor memory or the HDD, third storage device including an MFP program, and
a third CPU that executes the MFP program to function as a login accepting unit that accepts login of the user, a data requesting unit that requests data of the print server, a preview execution unit, and a page designation accepting unit; wherein
the data requesting unit transmits to the print server a request for a pull-print print job list for the user whose login is accepted by the login accepting unit, and for the user identification information for the user;
the data transmitter of the print server, after receiving the request, determines that if the one or more pages of per-page print data have an identical job name, then the one or more pages of per-page print data are included in an identical print job, and generates the pull-print print job list associated with the user identification information, to transmit the list to the print apparatus;
the print apparatus job-selectably displays the pull-print print job list on the display;
the data requesting unit of the print apparatus requests of the print server thumbnails for a print job selected on the pull-print print job list displayed on the print apparatus display;
the data transmitter of the print server transmits to the print apparatus the thumbnail data in the displaying image data for the requested thumbnails;
the preview execution unit of the print apparatus displays on the print apparatus display a thumbnail preview screen that displays the requested thumbnails based on the received thumbnail data, the thumbnail preview screen including thumbnails of all the pages of the print job selected on the pull-print print job list, and check areas for selecting the thumbnails of respective pages of the print job;
the page designation accepting unit of the print apparatus accepts pages whose check areas for selecting the thumbnails of the respective pages of the print job have been checked;
the data requesting unit of the print apparatus requests of the print server the one or more pages of per-page print data accepted by the page designation accepting unit;
the data generating unit of the print server synthesizes the one or more pages of per-page print data accepted by the page designation accepting unit, to generate transmitting print data; and
the data transmitter of the print server transmits to the print apparatus the transmitting print data.

* * * * *